United States Patent
Conrad et al.

(10) Patent No.: US 10,729,294 B2
(45) Date of Patent: Aug. 4, 2020

(54) HAND CARRYABLE SURFACE CLEANING APPARATUS

(71) Applicant: Omachron Intellectual Property Inc., Hampton (CA)

(72) Inventors: Wayne Ernest Conrad, Hampton (CA); Nina Conrad, Hampton (CA); Dave Petersen, Bowmanville (CA)

(73) Assignee: Omachron Intellectual Property Inc., Hampton, Ontario (CA)

(*) Notice: Subject to any disclaimer, the term of this patent is extended or adjusted under 35 U.S.C. 154(b) by 250 days.

(21) Appl. No.: 15/644,407

(22) Filed: Jul. 7, 2017

(65) Prior Publication Data

US 2017/0303754 A1   Oct. 26, 2017
US 2019/0298121 A9   Oct. 3, 2019

Related U.S. Application Data

(63) Continuation-in-part of application No. 15/143,697, filed on May 2, 2016, now Pat. No. 9,962,047, and a
(Continued)

(51) Int. Cl.
*A47L 5/24*   (2006.01)
*A47L 5/22*   (2006.01)
(Continued)

(52) U.S. Cl.
CPC .......... *A47L 5/24* (2013.01); *A47L 5/225* (2013.01); *A47L 5/28* (2013.01); *A47L 7/0085* (2013.01);
(Continued)

(58) Field of Classification Search
CPC ..... A47L 9/1608; A47L 9/1625; A47L 9/1616
See application file for complete search history.

(56) References Cited

U.S. PATENT DOCUMENTS 4,920,606 A   5/1990   Gerke, Jr. et al.
4,945,604 A   8/1990   Miner et al.
(Continued)

FOREIGN PATENT DOCUMENTS

AU   2008200579 A1   8/2008
AU   2008201597 A1   11/2008
(Continued)

OTHER PUBLICATIONS

International Search Report in connection to International Patent Application No. PCT/CA2017/050014, dated Apr. 5, 2017.
(Continued)

*Primary Examiner* — Andrew A Horton
(74) *Attorney, Agent, or Firm* — Philip C. Mendes da Costa; Bereskin & Parr LLP/S.E.N.C.R.L., s.r.l.

(57) ABSTRACT

A surface cleaning apparatus has a cyclone chamber provided in an air flow path. The cyclone chamber has a screen assembly with an outlet section, a longitudinally spaced apart distal section and a longitudinally extending porous section. The outlet section includes a non-porous member extending longitudinally inwardly an outlet section length from an outlet end of the outlet section to a longitudinally inwardly positioned inlet end of the outlet section. The outlet end of the outlet section overlies a cyclone air outlet. The porous section extends longitudinally inwardly from an outlet end of the porous section that is located at the inlet end of the outlet section. The distal section has a distal section length in the longitudinal direction that is greater than the cyclone outlet port length.

18 Claims, 47 Drawing Sheets

Related U.S. Application Data continuation-in-part of application No. 15/616,705, filed on Jun. 7, 2017, which is a continuation of application No. 13/781,559, filed on Feb. 28, 2013, now abandoned, application No. 15/644,407, which is a continuation-in-part of application No. 13/780,428, filed on Feb. 28, 2013.

(60) Provisional application No. 62/276,510, filed on Jan. 8, 2016.

(51) Int. Cl.
*A47L 9/04* (2006.01)
*A47L 9/28* (2006.01)
*A47L 9/16* (2006.01)
*A47L 9/32* (2006.01)
*A47L 9/12* (2006.01)
*A47L 9/22* (2006.01)
*A47L 7/00* (2006.01)
*A47L 5/28* (2006.01)
*H02J 7/00* (2006.01)

(52) U.S. Cl.
CPC ........... *A47L 7/0095* (2013.01); *A47L 9/0466* (2013.01); *A47L 9/122* (2013.01); *A47L 9/127* (2013.01); *A47L 9/165* (2013.01); *A47L 9/1608* (2013.01); *A47L 9/1625* (2013.01); *A47L 9/1641* (2013.01); *A47L 9/1683* (2013.01); *A47L 9/22* (2013.01); *A47L 9/2857* (2013.01); *A47L 9/2873* (2013.01); *A47L 9/2884* (2013.01); *A47L 9/2889* (2013.01); *A47L 9/322* (2013.01); *H02J 7/0027* (2013.01); *H02J 7/0045* (2013.01)

(56) References Cited

U.S. PATENT DOCUMENTS

| | | |
|---|---|---|
| 5,267,371 A | 12/1993 | Soler et al. |
| 6,434,785 B1 | 8/2002 | Vandenbelt et al. |
| 6,484,350 B2 | 11/2002 | Yung |
| 6,497,001 B2 | 12/2002 | Di Nunzio et al. |
| 6,502,278 B2 | 1/2003 | Oh et al. |
| 6,514,131 B1 | 2/2003 | Reich et al. |
| 6,810,558 B2 | 11/2004 | Lee |
| 7,247,181 B2 | 7/2007 | Hansen et al. |
| 7,370,387 B2 | 5/2008 | Walker et al. |
| 7,640,624 B2 | 1/2010 | Crouch et al. |
| 7,686,861 B2 | 3/2010 | Oh |
| 7,691,161 B2 | 4/2010 | Oh et al. |
| 7,708,789 B2 | 5/2010 | Fester |
| 7,717,973 B2 | 5/2010 | Oh et al. |
| 7,780,753 B2 | 8/2010 | Lang |
| 7,882,593 B2 | 2/2011 | Beskow et al. |
| 7,922,794 B2 | 4/2011 | Morphey |
| 7,931,716 B2 | 4/2011 | Oakham |
| 7,958,598 B2 | 6/2011 | Yun et al. |
| 7,996,956 B2 | 8/2011 | Wood et al. |
| 8,028,373 B2 | 10/2011 | Rowntree |
| 8,048,180 B2 | 11/2011 | Oh et al. |
| 8,100,999 B2 | 1/2012 | Ashbee et al. |
| 8,101,001 B2 | 1/2012 | Qian |
| 8,117,712 B2 | 2/2012 | Dyson et al. |
| 8,146,201 B2 | 4/2012 | Conrad |
| 8,150,907 B2 | 4/2012 | Otsuka et al. |
| 8,151,407 B2 | 4/2012 | Conrad |
| 8,156,609 B2 | 4/2012 | Milne et al. |
| 8,347,455 B2 | 1/2013 | Dyson et al. |
| 8,444,731 B2 | 5/2013 | Gomiciaga-Pereda et al. |
| 8,549,703 B2 | 10/2013 | Smith |
| 8,578,555 B2 | 11/2013 | Conrad |
| 8,595,895 B2 | 12/2013 | Smith |
| 8,657,904 B2 | 2/2014 | Smith |
| 8,813,305 B2 | 8/2014 | Conrad |
| 8,869,345 B2 | 10/2014 | Conrad |
| 8,918,952 B2 | 12/2014 | Rowntree |
| 8,945,258 B2 | 2/2015 | Smith |
| 8,979,960 B2 | 3/2015 | Smith |
| 9,005,324 B2 | 4/2015 | Smith |
| 9,144,358 B2 | 9/2015 | Smith |
| 9,204,773 B2 | 12/2015 | Conrad |
| 9,516,979 B2 | 12/2016 | Gidwell |
| 9,711,986 B2 | 7/2017 | Sunderland et al. |
| 2006/0090290 A1 | 5/2006 | Lau |
| 2006/0156508 A1 | 7/2006 | Khalil |
| 2006/0277711 A1 | 12/2006 | Hong et al. |
| 2007/0033765 A1 | 2/2007 | Walker et al. |
| 2007/0271724 A1 | 11/2007 | Hakan et al. |
| 2008/0040883 A1 | 2/2008 | Beskow et al. |
| 2008/0178416 A1 | 7/2008 | Conrad |
| 2008/0190080 A1* | 8/2008 | Oh ................. A47L 9/1625 55/343 |
| 2008/0256744 A1 | 10/2008 | Rowntreer et al. |
| 2009/0019663 A1 | 1/2009 | Rowntree |
| 2009/0282639 A1 | 11/2009 | Dyson et al. |
| 2009/0305862 A1 | 12/2009 | Yoo |
| 2009/0307864 A1 | 12/2009 | Dyson |
| 2010/0045215 A1 | 2/2010 | Hawker et al. |
| 2010/0192314 A1 | 8/2010 | Otsuka et al. |
| 2010/0229322 A1 | 9/2010 | Conrad |
| 2010/0229328 A1 | 9/2010 | Conrad |
| 2011/0219570 A1 | 9/2011 | Conrad |
| 2011/0308038 A1 | 12/2011 | Rowntree |
| 2012/0304417 A1 | 12/2012 | Riley |
| 2013/0091654 A1 | 4/2013 | Smith |
| 2013/0091656 A1 | 4/2013 | Smith |
| 2013/0091657 A1 | 4/2013 | Smith |
| 2013/0091658 A1 | 4/2013 | Smith |
| 2013/0091810 A1 | 4/2013 | Smith |
| 2013/0091812 A1 | 4/2013 | Smith |
| 2013/0091814 A1 | 4/2013 | Smith |
| 2013/0139348 A1 | 6/2013 | Otsuka et al. |
| 2013/0227813 A1 | 9/2013 | Conrad |
| 2013/0232722 A1 | 9/2013 | Conrad |
| 2014/0237768 A1* | 8/2014 | Conrad ................. A47L 5/365 15/353 |
| 2014/0237964 A1 | 8/2014 | Conrad |
| 2014/0237965 A1* | 8/2014 | Conrad ................. B04C 3/00 55/459.1 |
| 2016/0015230 A1 | 1/2016 | Conrad et al. |
| 2016/0051109 A1 | 2/2016 | Hwang et al. |
| 2016/0128527 A1 | 5/2016 | Grey et al. |
| 2016/0367094 A1 | 12/2016 | Conrad |
| 2017/0071426 A1 | 3/2017 | Krebs et al. |
| 2017/0079489 A1 | 3/2017 | Dimbylow |
| 2017/0290479 A1 | 10/2017 | Conrad |

FOREIGN PATENT DOCUMENTS

| | | |
|---|---|---|
| AU | 2008200579 B2 | 10/2011 |
| AU | 2008201597 B2 | 10/2011 |
| AU | 2011211368 B2 | 9/2012 |
| CA | 2620703 A1 | 8/2008 |
| CA | 2628573 A1 | 10/2008 |
| CA | 2731525 A1 | 10/2008 |
| CA | 2658014 A1 | 9/2010 |
| CA | 2730437 A1 | 9/2011 |
| CA | 2593950 C | 1/2013 |
| CA | 2628573 C | 8/2013 |
| CA | 2620703 C | 9/2013 |
| CA | 2731525 C | 1/2014 |
| CN | 1434688 A | 8/2003 |
| CN | 1626025 A | 6/2005 |
| CN | 1875846 A | 12/2006 |
| CN | 1875855 A | 12/2006 |
| CN | 1981688 A | 6/2007 |
| CN | 101061932 A | 10/2007 |
| CN | 101073480 A | 11/2007 |
| CN | 101095604 B | 1/2008 |
| CN | 101108081 A | 1/2008 |
| CN | 101288572 A | 10/2008 |
| CN | 101448447 A | 6/2009 |

(56) References Cited

FOREIGN PATENT DOCUMENTS

| | | |
|---|---|---|
| CN | 101489453 A | 7/2009 |
| CN | 101489455 A | 7/2009 |
| CN | 101489457 A | 7/2009 |
| CN | 101489461 A | 7/2009 |
| CN | 201290642 Y | 8/2009 |
| CN | 101700180 A | 5/2010 |
| CN | 101822506 A | 9/2010 |
| CN | 101108081 B | 10/2010 |
| CN | 201683850 U | 12/2010 |
| CN | 1911151 B | 4/2011 |
| CN | 101243959 B | 6/2011 |
| CN | 101700180 B | 8/2011 |
| CN | 102188208 A | 9/2011 |
| CN | 102256523 A | 11/2011 |
| CN | 202173358 U | 3/2012 |
| CN | 101489455 B | 6/2012 |
| CN | 101489457 B | 6/2012 |
| CN | 1981688 B | 7/2012 |
| CN | 101288572 B | 7/2012 |
| CN | 103169420 A | 6/2013 |
| CN | 101073480 B | 5/2014 |
| CN | 203724037 U | 7/2014 |
| CN | 101897558 B | 9/2014 |
| CN | 102256523 B | 11/2014 |
| CN | 104822301 A | 8/2015 |
| CN | 1895148 A | 3/2016 |
| DE | 10110581 C2 | 11/2003 |
| DE | 60116336 T2 | 8/2006 |
| DE | 102004028677 B4 | 1/2008 |
| DE | 602006000726 T2 | 4/2008 |
| DE | 112007003039 T5 | 10/2009 |
| DE | 112007003052 T5 | 1/2010 |
| DE | 112010001135 T5 | 8/2012 |
| DE | 112012000251 T5 | 10/2013 |
| DE | 102012211246 A1 | 1/2014 |
| EP | 1955631 A1 | 8/2008 |
| EP | 1955630 A3 | 10/2009 |
| EP | 2012641 B1 | 8/2010 |
| EP | 2223644 A2 | 9/2010 |
| EP | 1955631 B1 | 11/2010 |
| EP | 2223644 A3 | 3/2013 |
| EP | 2581013 A1 | 4/2013 |
| EP | 2220986 B1 | 3/2014 |
| EP | 2223644 B1 | 3/2014 |
| GB | 1436403 | 5/1976 |
| GB | 2035787 B | 10/1982 |
| GB | 2440111 A | 1/2008 |
| GB | 2465781 A | 6/2010 |
| JP | 2003135335 A | 5/2003 |
| JP | 2005040246 A | 2/2005 |
| JP | 2006102034 A | 4/2006 |
| JP | 2009261501 A | 11/2009 |
| JP | 2013086228 A | 5/2013 |
| KR | 1020010024752 A | 3/2001 |
| KR | 1020020067489 A | 8/2002 |
| KR | 1020040050174 A | 6/2004 |
| KR | 1020040088978 A | 10/2004 |
| KR | 1020050013696 A | 2/2005 |
| KR | 1020050054551 A | 6/2005 |
| KR | 1020050091829 A | 9/2005 |
| KR | 1020050091830 A | 9/2005 |
| KR | 1020050091833 A | 9/2005 |
| KR | 1020050091834 A | 9/2005 |
| KR | 1020050091835 A | 9/2005 |
| KR | 1020050091836 A | 9/2005 |
| KR | 1020050091837 A | 9/2005 |
| KR | 1020050091838 A | 9/2005 |
| KR | 1020050103343 A | 10/2005 |
| KR | 1020050108623 A | 11/2005 |
| KR | 1020060112420 A | 11/2006 |
| KR | 1020060118800 A | 11/2006 |
| KR | 1020060118801 A | 11/2006 |
| KR | 1020060119587 A | 11/2006 |
| KR | 1020060122249 A | 11/2006 |
| KR | 1020100084127 A | 7/2010 |
| KR | 1020110021554 A | 3/2011 |
| NL | 10681 C | 3/2005 |
| NZ | 565800 A | 5/2009 |
| NZ | 567297 A | 7/2009 |
| WO | 2004069021 A1 | 8/2004 |
| WO | 2005084511 A1 | 9/2005 |
| WO | 2006076363 A2 | 7/2006 |
| WO | 2008009883 A1 | 1/2008 |
| WO | 2008009888 A1 | 1/2008 |
| WO | 2008009890 A1 | 1/2008 |
| WO | 2008035032 A3 | 6/2008 |
| WO | 2008070973 A1 | 6/2008 |
| WO | 2010102396 A1 | 9/2010 |
| WO | 2010147247 A1 | 12/2010 |
| WO | 2014131105 A1 | 9/2014 |
| WO | 2017046557 A1 | 3/2017 |
| WO | 2017046559 A1 | 3/2017 |
| WO | 2017046560 A1 | 3/2017 |

OTHER PUBLICATIONS

English machine translation of JP2013086228, as published on May 13, 2013.
English machine translation of JP2006102034A, as published on Apr. 20, 2006.
English machine translation of CN101061932A, as published on Oct. 31, 2007.
English machine translation of CN101243959, as published on Jun. 15, 2011.
English machine translation of CN101288572, as published on Jul. 4, 2012.
English machine translation of CN101897558, as published on Sep. 17, 2014.
English machine translation of CN104822301, as published on Aug. 5, 2015.
English machine translation of KR1020110021554, as published on Mar. 4, 2011.
English machine translation of KR1020100084127, as published on Jul. 23, 2010.
English machine translation of KR1020060122249, as published on Nov. 30, 2006.
English machine translation of KR1020060119587, as published on Nov. 24, 2006.
English machine translation of KR1020060118801, as published on Nov. 24, 2006.
English machine translation of KR1020060118800, as published on Nov. 24, 2006.
English machine translation of KR1020060112420, as published on Nov. 1, 2006.
English machine translation of KR1020050108623, as published on Nov. 17, 2005.
English machine translation of KR1020050103343, as published on Oct. 31, 2005.
English machine translation of KR1020050091838, as published on Sep. 15, 2005.
English machine translation of KR1020050091837, as published on Sep. 15, 2005.
English machine translation of KR1020050091836, as published on Sep. 15, 2005.
English machine translation of KR1020050091835, as published on Sep. 15, 2005.
English machine translation of KR1020050091834, as published on Sep. 15, 2005.
English machine translation of KR1020050091833, as published on Sep. 15, 2005.
English machine translation of KR1020050091830, as published on Sep. 15, 2005.
English machine translation of KR1020050091829, as published on Sep. 15, 2005.
English machine translation of KR1020050054551, as published on Jun. 10, 2005.
English machine translation of KR1020050013696, as published on Feb. 5, 2005.

(56) References Cited

OTHER PUBLICATIONS

English machine translation of KR1020040088978, as publilshed on Oct. 20, 2004.
English machine translation of KR1020040050174, as published on Jun. 16, 2004.
English machine translation of KR1020020067489, as published on Aug. 22, 2002.
English machine translation of KR1020010024752, as published on Mar. 26, 2001.
English machine translation of DE602006000726, as published on Apr. 30, 2008.
English machine translation of DE112012000251T5, as published on Oct. 17, 2013.
English machine translation of DE112010001135T5, as published on Aug. 2, 2012.
English machine translation of DE112007003052, as published on Jan. 14, 2010.
English machine translation of DE112007003039, as published on Oct. 29, 2009.
English machine translation of DE102012211246, as published on Jan. 2, 2014.
English machine translation o DE102004028677, as published on Jan. 20, 2008.
English machine translation of CN1434688, as published on Aug. 6, 2003.
English machine translation of NL10681C, as published on Mar. 31, 2005.
English machine translation of WO2010147247, as published on Dec. 23, 2010.
English machine translation of JP2009261501, as published on Nov. 12, 2009.
English machine translation of CN1626025, as published on Jun. 15, 2005.
English machine translation of JP2005040246, as published on Feb. 17, 2005.
English machine translation of JP2003135335, as published on May 13, 2003.
English machine translation of CN203724037U, as published on Jul. 23, 2014.
English machine translation of CN202173358, as published on Mar. 28, 2012.
English machine translation of CN201683850, as published on Dec. 29, 2009.
English machine translation of CN201290642, as published on Aug. 19, 2009.
English machine translation of CN103169420, as published on Jun. 26, 2013.
English machine translation of CN102256523B, as published on Nov. 5, 2014.
English machine translation of CN1875846, as published on Dec. 13, 2006.
English machine translation of CN102188208, as published on Sep. 21, 2011.
English machine translation of CN1875855A, as published on Dec. 13, 2006.
English machine translation of CN1895148A, as published on Jan. 17, 2007.
U.S. Appl. No. 15/143,697.
U.S. Appl. No. 15/143,785.
U.S. Appl. No. 15/143,863.
U.S. Appl. No. 15/144,061.
U.S. Appl. No. 15/144,232.
U.S. Appl. No. 15/143,695.
U.S. Appl. No. 15/143,804.
U.S. Appl. No. 15/143,920.
U.S. Appl. No. 15/144,020.
U.S. Appl. No. 15/144,231.
U.S. Appl. No. 15/410,452.
U.S. Appl. No. 15/482,184.
U.S. Appl. No. 15/492,742.
U.S. Appl. No. 15/492,792.
U.S. Appl. No. 15/492,819.
U.S. Appl. No. 15/644,362.
U.S. Appl. No. 15/644,459.
English machine translation of CN101822506, as published on Sep. 8, 2009.
English machine translation of CN101700180A, as published on May 5, 2010.
English machine translation of CN101700180B, as published on Aug. 24, 2011.
English machine translation of CN101489461A, as published on Jul. 22, 2009.
English machine translation of CN101489457A, as published on Jul. 22, 2009.
English machine translation of CN101489457B, as published on Jun. 27, 2012.
English machine translation of CN101489455, as published on Jul. 22, 2009.
English machine translation of CN101489455, as published on Jun. 27, 2012.
English machine translation of CN101489453, as published on Jul. 22, 2009.
English machine translation of CN101448447, as published on Jun. 3, 2009.
English machine translation of CN101288572, as published on Oct. 22, 2008.
English machine translation of CN101108081A, as published on Jan. 23, 2008.
English machine translation of CN101108081B, as published on Jan. 2, 2008.
English machine translation of CN101073480A, as published on Nov. 21, 2007.
English machine translation of CN101073480B, as published on May 14, 2014.
English machine translation of DE60116336T2, as published on Aug. 31, 2006.
English machine translation of DE10110581C2, as published on Nov. 13, 2003.
English machine translation of CN1981688B, as published on Jul. 4, 2012.
English machine translation of CN1981688A, as publsihed on Jun. 20, 2007.
English machine translation of CN1911151, as published on Apr. 13, 2011.
English machine translation of CN101095604B, as published on Jan. 2, 2008.
English machine translation of CN102256523A, as published on Nov. 23, 2011.

\* cited by examiner

HAND CARRYABLE SURFACE CLEANING APPARATUS

CROSS REFERENCE TO RELATED APPLICATIONS

This application is a continuation in part of U.S. patent application Ser. No. 15/143,697, filed May 2, 2016, now U.S. Pat. No. 9,962,047, entitled Hand Carryable Surface Cleaning Apparatus, which itself claims the benefit of the filing date of U.S. Provisional Application Ser. No. 62/276,510, filed on Jan. 8, 2016; and is a continuation in part of U.S. patent application Ser. No. 15/616,705, filed on Jun. 7, 2017, which itself is a continuation of U.S. patent application Ser. No. 13/781,559, filed on Feb. 28, 2013, now abandoned; and is a continuation in part of U.S. patent application Ser. No. 13/780,428, filed on Feb. 28, 2013, currently pending. The entirety of these applications is incorporated herein by reference.

FIELD

The present subject matter of the teachings described herein relates generally to hand carryable surface cleaning apparatus. In a preferred embodiment, the hand carryable surface cleaning apparatus comprises a portable surface cleaning apparatus, such as a hand vacuum cleaner.

BACKGROUND

The following is not an admission that anything discussed below is part of the prior art or part of the common general knowledge of a person skilled in the art.

Various types of surface cleaning apparatus are known. Surface cleaning apparatus include vacuum cleaners. Currently, a vacuum cleaner typically uses at least one cyclonic cleaning stage. More recently, cyclonic hand vacuum cleaners have been developed. See for example, U.S. Pat. No. 7,931,716 and US 2010/0229328. Each of these discloses a hand vacuum cleaner which includes a cyclonic cleaning stage. U.S. Pat. No. 7,931,716 discloses a cyclonic cleaning stage utilizing two cyclonic cleaning stages wherein both cyclonic stages have cyclone axis of rotation that extends vertically. US 2010/0229328 discloses a cyclonic hand vacuum cleaner wherein the cyclone axis of rotation extends horizontally and is co-axial with the suction motor. In addition, hand carriable cyclonic vacuum cleaners are also known (see U.S. Pat. Nos. 8,146,201 and 8,549,703).

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one broad aspect of the teachings described herein, which may be used alone or in combination with any other aspect, a hand vacuum cleaner is provided wherein the inlet axis of the dirty air inlet intersects the suction motor. The inlet axis may be parallel to the suction motor axis of rotation and/or the inlet axis may be positioned above an axis of rotation of a cyclone chamber wherein the cyclone chamber axis of rotation may be generally parallel to the inlet axis and/or the suction motor axis of rotation.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided a hand vacuum cleaner that may include an air inlet conduit having an inlet conduit axis, a suction motor and fan assembly having a suction motor axis of rotation, and a cyclone unit comprising a cyclone chamber having a cyclone axis of rotation. The inlet conduit axis may be generally parallel to the cyclone axis and when the inlet conduit axis is horizontally disposed, the inlet conduit axis may be positioned above the cyclone axis. A projection of the inlet conduit axis may intersect the suction motor.

The cyclone axis may be positioned below the suction motor axis when the inlet conduit axis is horizontally disposed.

The cyclone axis may be positioned below the suction motor when the inlet conduit axis is horizontally disposed.

The inlet conduit axis may be positioned above the cyclone chamber when the inlet conduit axis is horizontally disposed.

The suction motor may be positioned above at least a portion of the cyclone chamber when the inlet conduit axis is horizontally disposed.

The suction motor axis of rotation may be generally parallel to the inlet conduit axis.

The suction motor axis of rotation may be generally parallel to the inlet conduit axis.

The suction motor axis of rotation may be generally orthogonal to the inlet conduit axis.

The hand vacuum may include a pre-motor filter. The suction motor may be positioned above the pre-motor filter when the inlet conduit axis is horizontally disposed.

The suction motor may be positioned rearward of the cyclone chamber.

The suction motor may be positioned forward of a pre-motor filter.

The hand vacuum cleaner may include a handle having a hand grip portion that extends upwardly and forwardly when the inlet conduit axis is horizontally disposed.

The inlet conduit axis may be above the hand grip portion when the inlet conduit axis is horizontally disposed.

The handle may be positioned rearward of the suction motor.

The handle may be positioned rearward of the suction motor and, when the inlet conduit axis is horizontally disposed, the handle may have a lower portion and an upper portion.

The lower end of the handle may be positioned at an elevation of a pre-motor filter and the upper portion of the handle is positioned at an elevation of the suction motor.

The lower end of the handle may be attached to a pre-motor filter housing and the upper portion of the handle may be attached to a suction motor housing.

The cyclone unit may have an openable door provided at a front end of the cyclone unit.

The handle may house at least one energy storage member and the handle may be removably mounted to the hand vacuum cleaner.

The handle may house at least one energy storage member in a lower portion thereof.

In accordance with another broad aspect of the teachings described herein, which may be used alone or in combination with any other aspect, a hand vacuum cleaner is provided wherein the suction motor is positioned forwardly. For example, the suction motor may be positioned forward of a hand grip portion of the handle, forward of the handle or forward of or axially aligned with a pre-motor filter.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided a hand vacuum cleaner having a front end and a rear end may include an air inlet conduit having an inlet conduit axis and a suction motor and fan assembly having a suction motor axis of rotation. An air treatment member may have a front end and a rear end and a central longitudinal axis extending between the front and rear ends. A handle may be provided at the rear end of the hand vacuum cleaner. The handle may have a hand grip portion that extends upwardly and forwardly, and the suction motor may be positioned forward of the hand grip portion.

The suction motor may be positioned forward of the handle.

The inlet conduit axis may be above the hand grip portion when the hand grip portion is oriented upwardly and forwardly.

A lower end of the handle may be positioned at an elevation of a pre-motor filter and an upper portion of the handle is positioned at an elevation of the suction motor.

The lower end of the may be attached to a pre-motor filter housing and the upper portion of the handle may be attached to a suction motor housing.

The air treatment member may be forward of the handle.

The hand vacuum cleaner may include a pre-motor filter and the air treatment member and the pre-motor filter may be forward of the hand grip.

The air treatment member may include a cyclone and the central longitudinal axis is a cyclone axis.

The inlet conduit may have an inlet conduit axis that may be generally parallel to the central longitudinal axis.

The hand grip portion may be oriented upwardly and forwardly, the inlet conduit axis may be positioned above the central longitudinal axis and a projection of the inlet conduit axis may intersect the suction motor.

The central longitudinal axis may be positioned below the suction motor axis when the hand grip portion is oriented upwardly and forwardly.

The central longitudinal axis may be positioned below the suction motor when the hand grip portion is oriented upwardly and forwardly.

The inlet conduit axis may be above the air treatment member when the hand grip portion is oriented upwardly and forwardly.

The suction motor may be positioned above at least a portion of the air treatment member when the hand grip portion is oriented upwardly and forwardly.

The suction motor axis of rotation may be generally parallel to the inlet conduit axis.

The suction motor axis of rotation may be generally parallel to the inlet conduit axis.

The suction motor axis of rotation may be generally orthogonal to the inlet conduit axis.

The hand vacuum cleaner may include pre-motor filter and the suction motor may be positioned above the pre-motor filter when the hand grip portion is oriented upwardly and forwardly.

The suction motor may be rearward of the air treatment member.

The hand vacuum cleaner may have a front end, a rear end and a pre-motor filter and the suction motor may be positioned forward of the pre-motor filter.

The hand vacuum cleaner may include an energy storage member that is positioned below the suction motor when the hand grip portion is oriented upwardly and forwardly, such as in the handle of the hand vacuum cleaner.

The hand vacuum cleaner may include an energy storage member that is positioned rearward of the suction motor when hand grip portion is oriented upwardly and forwardly.

The handle may house at least one energy storage member and the handle may be removably mounted to the hand vacuum cleaner.

The handle may house at least one energy storage member in a lower portion thereof.

In accordance with another broad aspect of the teachings described herein, which may be used alone or in combination with any other aspect, a hand vacuum cleaner is provided with a hollow longitudinally extending porous filter media wherein air after exiting an air treatment member, such as a cyclone chamber, may enter the porous filter media from the outer surface thereof and travel inwardly into a hollow interior. The filtered air may then travel upwardly to a suction motor, such may be located at an upper end or, and may overly, the longitudinally extending porous filter media.

An advantage of this design is that a filter having a large upstream filter surface may be provided. Accordingly, the duration during which the hand vacuum cleaner may be used without a significant reduction in air flow due to a pre-motor filer becoming clogged may be increased. A further advantage is that the hollow interior of the filter material may function as a conduit to convey filtered air upwardly to a suction motor thereby avoiding the need for a separate plastic conduit.

In accordance with this aspect, there is provided a hand vacuum cleaner having an upper end and a lower end may include a suction motor and fan assembly having a suction motor axis of rotation, and an air treatment member having a front end and a rear end and a central longitudinal axis extending between the front and rear ends. A pre-motor filter may include a longitudinally extending filter media having an open interior, an outer upstream wall, an inner wall and a filter longitudinal axis. The longitudinal axis may extend upwardly in a direction from the lower end to the upper end.

The air may exit the pre-motor filter in the direction of the filter longitudinal axis.

The air may travel upwardly from the pre-motor filter to an inlet of the suction motor.

The suction motor may be positioned above the pre-motor filter when the longitudinal axis is oriented to extend upwardly.

The suction motor axis of rotation may extend upwardly when the longitudinal axis is oriented to extend upwardly.

The suction motor may be positioned above the pre-motor filter when the longitudinal axis is oriented to extend upwardly.

The suction motor axis of rotation may extend generally vertically when the longitudinal axis is oriented to extend upwardly.

The suction motor may be positioned above the pre-motor filter when the longitudinal axis is oriented to extend upwardly.

The suction motor may be positioned above the pre-motor filter when the longitudinal axis is oriented to extend upwardly.

The suction motor may be positioned forward of the pre-motor filter when the longitudinal axis is oriented to extend upwardly.

The suction motor axis of rotation may extend generally horizontally when the longitudinal axis is oriented to extend upwardly.

The suction motor axis of rotation may extend generally horizontally when the longitudinal axis is oriented to extend upwardly.

The central longitudinal axis may extend generally horizontally when the longitudinal axis is oriented to extend upwardly.

The air treatment member may include a cyclone and the central longitudinal axis may be a cyclone axis.

The central longitudinal axis may intersect the filter media twice.

The outer wall may include an upstream filter wall and the inner wall may include a downstream filter wall.

The filter media may be generally annular in transverse section.

The hand vacuum cleaner may include an inlet conduit extending from a dirty air inlet to the air treatment member and the inlet conduit may have a passage having an inlet conduit axis that is positioned above the pre-motor filter.

The inlet conduit axis may intersect the suction motor.

The hand vacuum cleaner may include inlet conduit extending from a dirty air inlet to the air treatment member and having a passage having an inlet conduit axis that intersects the suction motor.

A handle may house at least one energy storage member, wherein the handle is removably mounted to the hand vacuum cleaner.

The handle may house the at least one energy storage member in a lower portion thereof.

In accordance with another broad aspect of the teachings described herein, which may be used alone or in combination with any other aspect, a hand vacuum cleaner has an air treatment member that extends generally horizontally when the hand vacuum cleaner is oriented with its upper end above its lower end and the suction motor axis of rotation is oriented generally vertically.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided a hand vacuum cleaner having an upper end and a lower end may include a suction motor and fan assembly having a suction motor axis of rotation and an air treatment member having a front end and a rear end and a central longitudinal axis extending between the front and rear ends. When the hand vacuum cleaner is oriented with the upper end above the lower end, the central longitudinal axis may extend generally horizontally and the suction motor axis of rotation may be oriented vertically ±20°, ±15°, ±10°, or ±5°.

When the hand vacuum cleaner is oriented with the upper end above the lower end, the suction motor axis of rotation may be oriented vertically ±5°.

The hand vacuum cleaner may include an inlet conduit having an inlet conduit axis that is generally parallel to the central longitudinal axis.

The inlet conduit axis may be positioned above the central longitudinal axis.

The inlet conduit axis may be positioned above the air treatment member.

The air treatment member may include a cyclone and the central longitudinal axis may be a cyclone axis.

The hand vacuum cleaner may have an inlet conduit having an inlet conduit axis and the inlet conduit axis may be generally parallel to the cyclone axis.

The inlet conduit axis may be positioned above the cyclone axis.

The inlet conduit axis may be positioned above the cyclone.

The hand vacuum may include a handle having a hand grip portion wherein the hand grip portion extends upwardly and forwardly when the hand vacuum cleaner is oriented with the upper end above the lower end.

An upper end of the suction motor may be positioned above an upper wall of the air treatment member when the hand vacuum cleaner is oriented with the upper end above the lower end.

The suction motor may overlie a portion of the air treatment member.

The hand vacuum cleaner may include a pre-motor filter and the suction motor may be positioned forward of the pre-motor filter.

A lower end of the suction motor may be positioned below an upper wall of the air treatment member when the hand vacuum cleaner is oriented with the upper end above the lower end.

The hand vacuum cleaner may include a pre-motor filter and the suction motor may be positioned above the pre-motor filter.

The pre-motor filter may be positioned in a pre-motor filter chamber and the suction motor axis of rotation may extend through the suction motor chamber.

The hand vacuum cleaner may include a handle having a hand grip portion that extends upwardly and forwardly when the hand vacuum cleaner is oriented with the upper end above the lower end. The suction motor axis of rotation may be positioned between the air treatment member and the hand grip portion.

The hand vacuum cleaner may include a pre-motor filter having a longitudinally extending filter media having an open interior, an outer wall, an inner wall and a filter longitudinal axis. The longitudinal axis may extend upwardly when the hand vacuum cleaner is oriented with the upper end above the lower end.

Air may exit the pre-motor filter in the direction of the filter longitudinal axis.

Air may travel upwardly from the pre-motor filter to an inlet of the suction motor.

A handle may house at least one energy storage member, wherein the handle is removably mounted to the hand vacuum cleaner.

The handle may house the at least one energy storage member in a lower portion thereof.

In accordance with another broad aspect of the teachings described herein, which may be used alone or in combination with any other aspect, a hand vacuum cleaner is provided with a porous pre-motor filter media wherein after being treated in an air treatment member, air travels to a rear side of the porous pre-motor filter media and then travels forwardly to a front side of the porous pre-motor filter media. The suction motor may be provided forward of the rear side of the porous pre-motor filter media and may be positioned forward of the front side of the porous pre-motor filter media. Alternately or in addition, the suction motor may be provided towards an upper end of the hand vacuum cleaner, such as above and optionally overlying the air treatment member and/or the pre-motor filter.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided a hand vacuum cleaner having an upper end and a lower end may include a suction motor and fan assembly having a front end, a rear end and a suction motor axis of rotation and an air treatment member having a front end and a rear end and a central longitudinal axis extending between the front and rear ends. A pre-motor filter media may have a front side and a rear side and air exiting the air treatment member may travel in a rearward direction to the rear side of the pre-motor filter media and the air may then travel in a forward direction to the front side of the pre-motor filter media.

The hand vacuum cleaner may include a pre-motor filter conduit extending through the pre-motor filter media. The front side may be an upstream side of the pre-motor filter media and the rear side may be a downstream side of the pre-motor filter media. Air exiting the air treatment member may travel in a rearward direction through the pre-motor filter media and the air may then travel in a forward direction through the pre-motor filter conduit.

The pre-motor filter may be positioned in a pre-motor filter housing having a front openable door and, when the openable door is opened, an upstream side of the pre-motor filter may be visible.

The air treatment member may be removable from the hand vacuum cleaner and the front openable door may be openable when the air treatment member is removed.

The hand vacuum cleaner may include a pre-motor filter conduit extending through the pre-motor filter media. The front side may be a downstream side of the pre-motor filter media and the rear side may be an upstream side of the pre-motor filter media. Air exiting the air treatment may member travel in a rearward direction through the pre-motor filter conduit and the air then may then travel in a forward direction through the pre-motor filter media.

The pre-motor filter may be positioned in a pre-motor filter housing having a front openable door. When the openable door is opened an upstream side of the pre-motor filter may be visible.

The hand vacuum cleaner may include a handle that is provided on the openable door.

The pre-motor filter may be positioned in a pre-motor filter housing having an openable door. When the openable door is opened an upstream side of the pre-motor filter may be visible.

The central longitudinal axis may extend generally horizontally when the hand vacuum cleaner is oriented with the upper end above the lower end.

The air treatment member may have a height in a direction orthogonal to the central longitudinal axis and the pre-motor filter media has a height in the direction orthogonal to the central longitudinal axis that is greater than the height of the air treatment member.

The air treatment member may include a cyclone and the central longitudinal axis may be a cyclone axis.

The suction motor may be positioned above an upper wall of the air treatment member when the hand vacuum cleaner is oriented with the upper end above the lower end.

The suction motor may overlie at least a portion of the air treatment member when the hand vacuum cleaner is oriented with the upper end above the lower end.

The suction motor axis of rotation may be generally parallel to the central longitudinal axis.

The hand vacuum cleaner may have a handle that houses at least one energy storage member in a lower portion thereof. The handle may be removable from the hand vacuum cleaner.

In accordance with this aspect, there is also provided a hand vacuum cleaner having an upper end and a lower end may include a suction motor and fan assembly having a front end, a rear end and a suction motor axis of rotation, and an air treatment member having a front end and a rear end and a central longitudinal axis extending between the front and rear ends. A pre-motor filter media may be positioned so that the front end of the suction motor is forward of the pre-motor filter media.

The hand vacuum cleaner may include a pre-motor filter conduit extending through the pre-motor filter media. The front side may be an upstream side of the pre-motor filter media and the rear side may be a downstream side of the pre-motor filter media. Air exiting the air treatment member may travel in a rearward direction through the pre-motor filter media and the air may then travel in a forward direction through the pre-motor filter conduit.

The pre-motor filter may be positioned in a pre-motor filter housing having a front openable door and, when the openable door is opened, an upstream side of the pre-motor filter may be visible.

The air treatment member may be removable from the hand vacuum cleaner and the front openable door may be openable when the air treatment member is removed.

The hand vacuum cleaner may include a pre-motor filter conduit extending through the pre-motor filter media. A front side may be a downstream side of the pre-motor filter media and the rear side may be an upstream side of the pre-motor filter media. Air exiting the air treatment member may travel in a rearward direction through the pre-motor filter conduit and the air may then travel in a forward direction through the pre-motor filter media.

The pre-motor filter may be positioned in a pre-motor filter housing having a front openable door and, when the openable door is opened, an upstream side of the pre-motor filter may be visible.

The hand vacuum cleaner may include a handle that is provided on the openable door.

The pre-motor filter may be positioned in a pre-motor filter housing having an openable door and, when the openable door is opened, an upstream side of the pre-motor filter may be visible.

The central longitudinal axis may extend generally horizontally when the hand vacuum cleaner is oriented with the upper end above the lower end.

The air treatment member may have a height in a direction orthogonal to the central longitudinal axis and the pre-motor filter media may have a height in the direction orthogonal to the central longitudinal axis that is greater than the height of the air treatment member.

The air treatment member may include a cyclone and the central longitudinal axis may be a cyclone axis.

The suction motor may be positioned above an upper wall of the air treatment member when the hand vacuum cleaner is oriented with the upper end above the lower end.

The suction motor may overlie at least a portion of the air treatment member when the hand vacuum cleaner is oriented with the upper end above the lower end.

The suction motor axis of rotation may be generally parallel to the central longitudinal axis.

The hand vacuum cleaner may have a handle that houses at least one energy storage member in a lower portion thereof. The handle may be removable from the hand vacuum cleaner.

In accordance with another broad aspect of the teachings described herein, which may be used alone or in combination with any other aspect, a hand vacuum cleaner has a suction motor whose axis of rotation is generally parallel to a central longitudinal axis of an air treatment member (e.g., ±20°, ±15°, ±10°, or ±5°) and when the hand vacuum cleaner is oriented with the upper end above the lower end, the suction motor axis of rotation is positioned above the central longitudinal axis. Accordingly, the suction motor may be positioned above at least the lower half of and may be positioned above or substantially above the air treatment member and may extend generally in the same direction as the air treatment member.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided a hand vacuum cleaner having an upper end and a lower end may include a suction motor and fan assembly having a suction motor axis of rotation, and an air treatment member having a front end, a rear end and a central longitudinal axis extending between the front and rear ends. The suction motor axis of rotation may be generally parallel to the central longitudinal axis and when the hand vacuum cleaner is oriented with the upper end above the lower end, the suction motor axis of rotation may be positioned above the central longitudinal axis.

The hand vacuum cleaner may include an air inlet conduit having an inlet conduit axis that is positioned above the central longitudinal axis.

The inlet conduit axis may be generally parallel to the central longitudinal axis.

A projection of the inlet conduit axis may intersect the suction motor.

The hand vacuum cleaner may include an air inlet conduit having an inlet conduit axis that is generally parallel to the central longitudinal axis.

A projection of the inlet conduit axis may intersect the suction motor.

The air treatment member may include a cyclone.

The inlet conduit axis may be above the air treatment member when the hand vacuum cleaner is oriented with the upper end above the lower end.

The suction motor may be positioned above at least a portion of the air treatment member when the hand vacuum cleaner is oriented with the upper end above the lower end.

The suction motor may overlie at least a portion of the air treatment member when the hand vacuum cleaner is oriented with the upper end above the lower end.

The hand vacuum cleaner may include a pre-motor filter. The suction motor may be positioned forward of the pre-motor filter when the hand vacuum cleaner is oriented with the upper end above the lower end.

The hand vacuum cleaner may include a handle having a hand grip portion that extends upwardly and forwardly when the central longitudinal axis is oriented horizontally.

The handle may be positioned rearward of the suction motor.

When the hand vacuum cleaner is oriented with the upper end above the lower end, the handle may have a lower portion and an upper portion and the lower end of the handle may be positioned at an elevation of a pre-motor filter and the upper portion of the handle may be positioned at an elevation of the suction motor.

The handle may house at least one energy storage member in a lower portion thereof.

In accordance with another broad aspect of the teachings described herein, which may be used alone or in combination with any other aspect, a hand vacuum cleaner has a suction motor whose axis of rotation is generally parallel to a central longitudinal axis of an air treatment member (e.g., ±20°, ±15°, ±10°, or ±5°) and when the hand vacuum cleaner is oriented with the upper end above the lower end, the suction motor axis is positioned forwardly, e.g., in front of the rearward side of a porous pre-motor filter media.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided, a hand vacuum cleaner having an upper end and a lower end may include a suction motor and fan assembly having a forward end, a rearward end and suction motor axis of rotation, and an air treatment member having a front end, a rear end and a central longitudinal axis extending between the front and rear ends. A pre-motor filter media may have a forward portion and a rearward portion and the rear end of the suction motor may be positioned forward of the rearward portion of the pre-motor filter media. The suction motor axis of rotation and the central longitudinal axis may be generally horizontal when the hand vacuum cleaner is positioned on a horizontal surface.

The air treatment member has a height in a direction orthogonal to the central longitudinal axis and the pre-motor filter media has a height in the direction orthogonal to the central longitudinal axis that may be greater than the height of the air treatment member.

The air treatment member may include a cyclone and the central longitudinal axis may be a cyclone axis. The cyclone may have a height in a direction orthogonal to the cyclone axis and the pre-motor filter media may have a height in the direction orthogonal to the cyclone axis that is greater than the height of the cyclone.

In accordance with another broad aspect of the teachings described herein, when the hand vacuum cleaner is oriented with the upper end above the lower end, the suction motor axis is positioned forwardly, e.g., in front of the rearward side of a porous pre-motor filter media whereby the air inlet end of the suction motor is a rearward end of the suction motor. The suction motor may be provided in an upper portion of the hand vacuum cleaner, e.g., above a central axis of the air treatment member or higher.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

In accordance with this aspect, there is provided a hand vacuum cleaner having an upper end and a lower end may include a suction motor and fan assembly having a forward end, a rearward end and suction motor axis of rotation and an air treatment member having a front end, a rear end and a central longitudinal axis extending between the front and rear ends. A pre-motor filter media may have a forward portion and a rearward portion and the rear end of the suction motor may be an air inlet end of the suction motor.

The air treatment member may have a height in a direction orthogonal to the central longitudinal axis and the pre-motor filter media may have a height in the direction orthogonal to the central longitudinal axis that may be greater than the height of the air treatment member.

The air treatment member may include a cyclone and the central longitudinal axis may be a cyclone axis. The cyclone may have a height in a direction orthogonal to the cyclone axis and the pre-motor filter media may have a height in the direction orthogonal to the cyclone axis that is greater than the height of the cyclone.

In accordance with another broad aspect of the teachings described herein, which may be used alone or in combination with any other aspect, a hand vacuum cleaner is provided with a pre-motor filter that is accessible while the air treatment member, e.g., a cyclone chamber, is provided on a main body of the hand vacuum cleaner. Accordingly, the air treatment member may be in an "in use" position when an access door to a pre-motor filter chamber is opened (e.g., pivoted opened or removed) so that a porous pre-motor filter media may be removed for cleaning or replacement.

An advantage of this design is that the pre-motor filter may be accessed without having to remove the air treatment member.

In accordance with this aspect, there is provided a hand vacuum cleaner having an upper end and a lower end, may include a suction motor and fan assembly having a front end, a rear end and a suction motor axis of rotation and an air treatment member having a front end and a rear end and a central longitudinal axis extending between the front and rear ends. The central longitudinal axis may extend generally horizontally when the hand vacuum cleaner is oriented with the upper end above the lower end. A pre-motor filter housing may have a front end, a rear end, an upper end, a lower end, spaced apart opposed lateral sides extending between the front end and the rear end and an openable door. A pre-motor filter media may be provided in the pre-motor housing and may be removable when the door is opened. The pre-motor filter media may have a front side and a rear side. The openable door may be openable while the air treatment member is provided on the hand vacuum cleaner.

The openable door may be provided on the lower end of the pre-motor filter housing.

The openable door may include a base of the hand vacuum cleaner when the hand vacuum cleaner is oriented with the upper end above the lower end.

The pre-motor filter may include a longitudinally extending filter media having a hollow interior and a longitudinal filter axis.

The longitudinal filter axis may be generally orthogonal to the central longitudinal axis.

The openable door may be provided on the rear end of the pre-motor filter housing.

The hand vacuum cleaner may include a handle mounted to the rear end of the pre-motor filter housing and the door may be openable with the handle mounted thereto.

The hand vacuum cleaner may include a handle that is removably mounted to the rear end of the pre-motor filter housing and the door may be openable with the handle mounted thereto.

The handle may house at least one energy storage member.

The handle may include a hand grip portion that extends upwardly and forwardly when the hand vacuum cleaner is oriented with the upper end above the lower end and the central longitudinal axis may intersect the handle.

The openable door may overlie a side of the pre-motor filter media that extends in a direction of airflow through the pre-motor filter media.

The openable door may be provided on one of the lateral sides of the pre-motor filter housing.

The air treatment member may include a cyclone and the central longitudinal axis may be a cyclone axis.

In accordance with this aspect, there is also provided a hand vacuum cleaner may include a suction motor and fan assembly having a front end, a rear end and a suction motor axis of rotation and an air treatment member having a front end and a rear end and a central longitudinal axis extending between the front and rear ends. A pre-motor filter housing may have an upper end and a lower end and the lower end may include a bottom openable door. A pre-motor filter media may be provided in the pre-motor housing and may be removable when the door is opened. The pre-motor filter media may have a front side and a rear side.

The openable door may include a base of the hand vacuum cleaner when the hand vacuum cleaner is oriented with the upper end above the lower end.

The pre-motor filter may include a longitudinally extending filter media having a hollow interior and a longitudinal filter axis.

The longitudinal filter axis may be generally orthogonal to the central longitudinal axis.

The air treatment member may include a cyclone and the central longitudinal axis may be a cyclone axis.

In accordance with this aspect, there is also provided, a hand vacuum cleaner may include a suction motor and fan assembly having a front end, a rear end and a suction motor axis of rotation and an air treatment member having a front end and a rear end and a central longitudinal axis extending between the front and rear ends. A pre-motor filter housing may have a front end and a rear end that includes an openable door. A pre-motor filter media may be provided in the pre-motor housing and may be removable when the door is opened. The pre-motor filter media may have a front side and a rear side. The openable door may be openable while the air treatment member is provided on the hand vacuum cleaner.

The hand vacuum cleaner may include a handle mounted to the rear end of the pre-motor filter housing and the door may be openable with the handle mounted thereto.

The handle may include a hand grip portion that extends upwardly and forwardly when the hand vacuum cleaner is oriented with the upper end above the lower end and the central longitudinal axis may intersect the handle.

The air treatment member may include a cyclone and the central longitudinal axis may be a cyclone axis.

In accordance with another broad aspect of the teachings described herein, which may be used alone or in combination with any other aspect, a hand vacuum cleaner has a front openable door for emptying a dirt collection area wherein an axis of the air treatment member extends rearwardly to intersect an upwardly extending hand grip of a handle.

In accordance with this aspect, there is provided a hand vacuum cleaner having an upper end and a lower end may include a suction motor and fan assembly having a suction motor axis of rotation and an air treatment member having a front end, a rear end, an openable door and a central longitudinal axis extending between the front and rear ends. A handle may have a having a hand grip portion that extends upwardly and forwardly when the hand vacuum cleaner is oriented with the upper end above the lower end. The central longitudinal axis may intersect the openable door and the hand grip portion.

In some embodiments, the hand vacuum cleaner may be powered by an on board energy storage member, such as one or more batteries. Some or all of the batteries may be provided in the handle of the hand vacuum cleaner and, optionally, at least in a lower portion of the handle.

An advantage of this configuration is that a hand vacuum cleaner with improved ergonomics may be provided. As such, the hand vacuum cleaner may have an improved hand feel when used by a person.

The openable door may be provided at the front end of the air treatment member.

The openable door may extend in a plane that is generally orthogonal to the central longitudinal axis.

The hand vacuum cleaner may include a pre-motor filter and the central longitudinal axis may also intersect the pre-motor filter.

The hand vacuum cleaner may include a pre-motor filter provided in a pre-motor filter chamber. The pre-motor filter chamber may have a pre-motor filter chamber inlet that is located below a pre-motor filter chamber outlet when the hand vacuum cleaner is oriented with the upper end above the lower end.

The suction motor may be vertically spaced from the central longitudinal axis.

The suction motor may be positioned above the central longitudinal axis when the hand vacuum cleaner is oriented with the upper end above the lower end.

An air outlet of the suction motor may be positioned above the central longitudinal axis when the hand vacuum cleaner is oriented with the upper end above the lower end.

The hand vacuum cleaner may include a pre-motor filter and air may travel upwardly from the pre-motor filter to the suction motor.

The hand vacuum cleaner may include a pre-motor filter and air may travel forwardly from the pre-motor filter to the suction motor.

The air treatment member may include a cyclone and the central longitudinal axis is a cyclone axis.

The hand vacuum cleaner may include a dirt collection chamber external to the cyclone and the dirt collection chamber may be vertically spaced from the central longitudinal axis.

The openable door may extend in a plane that is generally orthogonal to the central longitudinal axis.

The openable door may include a forward most wall of the air treatment member.

An upper end of the hand grip portion may be positioned closer to the suction motor than a lower end of the hand grip portion.

The hand vacuum cleaner may include a dirty air inlet that is positioned above the air treatment member.

The hand vacuum cleaner may include an air inlet conduit having an inlet conduit axis that intersects the suction motor.

The hand vacuum cleaner may include an inlet conduit having an inlet conduit axis that is generally parallel to the central longitudinal axis.

The inlet conduit axis may be positioned above the air treatment member.

The handle may be removable mounted to the hand vacuum cleaner, e.g., a main body thereof, and may house at least one energy storage member.

In accordance with another broad aspects of the teachings described herein, which may be used alone or in combination with any other aspect, an assembly is removably mounted to the hand vacuum cleaner (e.g., a main body thereof) wherein the assembly houses an air treatment member and a porous pre-motor filter media, and may also include the suction motor.

An advantage of this design is that the main body may have an air inlet that is removably mounted to, e.g., a rigid air flow conduit that is drivingly connected to a surface cleaning head. As the air inlet is part of the main body, e.g., it may be a one piece assembly therewith or may be integrally formed therewith, the main body and the air inlet provide a structural component that may withstand stresses imposed when the hand vacuum cleaner handle is used to propel the surface cleaning head.

In accordance with this aspect, there is provided a hand vacuum cleaner may have a main body having an upper end, a lower end and a handle. The upper end may have a dirty air inlet and a handle. The handle may have a hand grip portion that extends upwardly and forwardly. A suction motor and fan assembly may have a suction motor axis of rotation. An assembly may be removably mounted to the main body and may include the air treatment member and a pre-motor filter media.

The air treatment member may have a front end, a rear end, and a central longitudinal axis extending between the front and rear ends. The central longitudinal axis may extend generally horizontally when the hand grip portion is oriented upwardly and forwardly.

Air may travel upwardly from the assembly to the main body.

An assembly air inlet and an assembly air outlet may be provided in an upper surface of the assembly.

The assembly air inlet may be positioned forward of the assembly air outlet.

An assembly air inlet may be provided in upper surface of the assembly and an assembly air outlet may be provided in the rear end of the assembly.

The air treatment member may have a front end, a rear end, and a central longitudinal axis extending between the front and rear ends may intersect the hand grip portion.

An upper end of the hand grip portion may be positioned closer to the suction motor than a lower end of the hand grip portion.

The lower end of the handle may house at least one energy storage member.

The air treatment member may have an air inlet that is located in an upper portion of the air treatment member.

The hand vacuum cleaner may include an air inlet conduit and air may travel downwardly from the inlet conduit to the air treatment member.

The hand vacuum cleaner may include a pre-motor filter chamber having an openable door. The pre-motor filter may be positioned in the pre-motor filter chamber and the pre-motor filter door may be accessible when the assembly is attached to the main body.

The pre-motor filter door may be openable when the assembly is mounted to the main body with an airflow passage from the assembly to the main body sealed.

The suction motor may be provided in the main body.

The assembly may include the suction motor.

The central longitudinal axis may be positioned below the suction motor when the hand grip portion may be oriented upwardly and forwardly.

The air treatment member may include a cyclone.

The dirty air inlet may be positioned above the air treatment member.

The handle may be removably mounted to the hand vacuum cleaner.

The handle may house at least one energy storage member.

In accordance with another broad aspects of the teachings described herein, which may be used alone or in combination with any other aspect, a surface cleaning apparatus has a removable assembly which includes a dirt collection area and a door that is openable to allow the dirt collection area to be emptied. When the assembly is removed, a user may operate a first actuator (e.g., press a button) to move a lock to an unlocked position so that the door may be opened. When the assembly is attached to the remainder of the surface cleaning apparatus (e.g., in an "in use" position), the first actuator may be concealed. The user may then operate a second actuator (e.g., press a different button) to open the door. The second actuator is operatively, e.g., drivingly, connected to the lock, e.g., top the first actuator, so as to unlock the door when actuated.

An advantage of this design is that a user will nor perceive two unlock button when assembly is attached to the remainder of the surface cleaning apparatus and therefore provide a better consumer interface.

In accordance with this aspect, there is provided a hand vacuum cleaner may include a main body having a main body actuator operable between an open position and a closed position and an assembly removably mounted to the main body. The assembly may include an air treatment member having an openable door and an assembly door lock. The assembly door lock may include an actuation portion operable between an open position and a closed position and lock portion operable between an engaged position in which the door is secured in a closed position and a disengaged position in which the door is openable. When the assembly is mounted to the main body, the main body actuator may be operative connected to the actuation portion of the assembly door lock whereby when the main body actuator is moved from the closed position to the open position, the actuation portion is moved to the open position and the lock portion is moved to the disengaged position.

The actuation portion of the assembly door lock may be inaccessible when the assembly is mounted to the main body.

The actuation portion of the assembly door lock may be accessible when the assembly is removed from the main body.

The main body actuator may be a mechanical member.

The main body actuator may include an actuation portion provided on an outer surface of the surface cleaning apparatus and a driven end. The driven end may be drivingly engageable with the actuation portion of the assembly door lock when the main body actuator is moved from the closed position to the open position.

The main body actuator may include a longitudinally extending member having the actuation portion of the main body actuator provided at one end and the driven end of the main body actuator provided at an opposed end.

The longitudinally extending member may have a fixed length.

The assembly door lock may be a mechanical member.

The assembly door lock may be pivotally mounted wherein the actuation portion of the assembly door lock is provided on one side of a pivot mount and the lock portion of the assembly door lock is provided on an opposed side of the pivot mount.

The assembly door lock may be biased to the engaged position.

The main body actuator may extend in a first direction and the assembly door lock may extend in a second direction different to the first direction.

The first direction may be orthogonal the second direction.

When the main body actuator is moved from the open position and the closed position, the lock portion may be moved in a different direction to the main body actuator.

The lock portion may be moved in an opposite direction to the main body actuator.

The main body actuator may include an actuation portion and a driven end. When the main body actuator is moved from the open position and the closed position, the lock portion is moved in a different direction to the driven end.

The lock portion may be moved in an opposite direction to the main body actuator.

The surface cleaning apparatus may include a hand vacuum cleaner and the openable door may be a front door of the air treatment member.

A handle that is removably mounted to a rear end of the surface cleaning apparatus may be provided.

The handle may house at least one energy storage member.

In accordance with another broad aspect of the teachings described herein, which may be used alone or in combination with any other aspect, a hand vacuum cleaner may be provided with a removable handle. The removable handle may house one or more energy storage members. The handle may be connectable to other appliances so as to power that appliance.

In accordance with this aspect, there is provided a handle with an integrated rechargeable battery pack may include a grip portion having top and bottom ends and being configured to be gripped by a hand of a user between the top and bottom ends. At least one rechargeable battery may be coupled to at least one of the top and bottom ends of the grip portion. At least one mechanical attachment may be coupled to at least one of the top and bottom ends of the grip portion for mechanically engaging and attaching to a powered device. At least one electrical connector may be coupled to at least one of the top and bottom ends of the grip portion for electrically connecting the at least one rechargeable battery to the powered device.

The at least one rechargeable battery may include top and bottom rechargeable batteries coupled to the top and bottom ends of the grip portion, respectively.

The top and bottom rechargeable batteries may be substantially the same mass.

The handle may include top and bottom battery housings integral with the top and bottom ends of the grip portion, respectively, and wherein the top and bottom rechargeable batteries are located in the top and bottom battery housings, respectively.

The electrical connector may extend from one of the top and bottom housings. The mechanical attachment may be located on one of the top and bottom housings.

The electrical connector may extend from the top housing and the mechanical attachment may be located on the top housing.

The at least one mechanical attachment may be coupled to the top end of the grip portion. The at least one electrical connector may be attached to the top end of the grip portion.

The handle may include at least one control button on one of the housings or on the grip portion.

The control button may control power to the powered device from the rechargeable battery.

The handle may include electronics located inside the grip.

The handle may include at least one control button electrically connected to the internal electronics and configured to control at least a power on and off function.

The internal electronics may include control button circuitry configured to receive an identification of the powered device when the removable handle is attached and configured to provide a control signal to circuitry in the powered device in response to activation of the control button.

The control button may activate different functions in different powered devices.

The handle may include a display coupled to the control button circuitry and configured to display at least a function of the control button.

The electronics may include charge management circuitry electrically connected to the rechargeable battery.

The charge management circuitry may be configured to store different power profiles corresponding to different powered devices and is configured to activate a power profile in response to detecting the powered device when the handle is connected.

The rechargeable battery may be a Li-ion battery.

At least the grip portion may define an air flow path, and the air flow path may be fluidly coupled to an air exhaust when connected to a vacuum cleaner device.

The grip portion, the top battery housing and the bottom battery housing may define an air flow path allowing air flow along the batteries to provide heat transfer to or from the batteries. The air flow path may be fluidly coupled to an air exhaust when connected to a vacuum cleaner device.

The handle may include a trigger on the grip portion for powering on and off.

In accordance with this aspect, a vacuum cleaning apparatus may include a vacuum unit including at least a suction source and a dirt collection chamber, and a removable handle with an integrated rechargeable battery pack configured to be removably attached to at least one end of the vacuum unit.

The vacuum cleaning apparatus may also include a removable wand configured to be removably attached to at least another end of the vacuum unit.

The removable wand may be configured to be coupled between the vacuum unit and the removable handle.

A center of gravity of the removable handle with integrated battery pack may be proximate a twist axis of the vacuum unit that extends generally along the removable wand when coupled to the vacuum unit.

The suction source may be a suction motor and a center of gravity of the suction motor may be proximate the twist axis of the vacuum unit.

At least a top end of the removable handle may be configured to be coupled to the vacuum unit and the removable wand.

The vacuum unit may exhaust into the removable handle when attached.

In accordance with this aspect, a vacuum cleaning apparatus may include a vacuum unit having a back end and a front end and including at a least suction motor and a dirt collection chamber between the back end and the front end. A handle may be proximate the back end of the vacuum unit. The handle may include a grip portion, a top rechargeable battery at a top end of the grip portion, and a bottom rechargeable battery at a bottom end of the grip portion. The top and bottom rechargeable batteries may be arranged such that a center of gravity is proximate a twist axis of the vacuum unit.

The suction motor may be located in front of the handle and is arranged such that a center of gravity of the mot or is proximate the twist axis.

The handle may be removable.

The front end of the vacuum unit may be configured to attach to a vacuum wand, and the twist axis extends along the vacuum wand.

The top and bottom rechargeable batteries have substantially the same mass.

In accordance with this aspect, an air cooled battery charger assembly may include a battery charging unit including an air flow device; and a handle with integrated an rechargeable battery pack configured to be mechanically attached and electrically connected to the battery charging unit for charging. The handle defining an air flow path that is fluidly coupled with the air flow device when the handle is attached to the battery charging unit such that the air flow device causes air to flow through the handle to maintain a temperature of the rechargeable battery pack during charging.

The handle may include a grip portion and top and bottom battery housings at top and bottom ends, respectively, of the grip portion. The rechargeable battery pack may include first and second battery packs connected in series and located in the top and bottom battery housings, respectively.

The air flow path may extend through at least the top and bottom battery housings.

The air flow device may include a fan.

In accordance with another broad aspect of the teachings described herein, which may be used alone or in combination with any other aspect, a surface cleaning apparatus may have a cyclone chamber that includes a screen assembly that extends in a longitudinal direction and has an outlet section, a porous section, and a distal section. In some examples, the screen assembly may have a circumferential 'step-out' or shoulder at a juncture between an inlet end of the outlet section and the outlet end of the porous section.

An advantage of this design is that it may provide a greater radial gap between the expected radial thickness of a rotating air stream in a cyclone chamber and the porous section. Providing an increased radial gap along the porous section may improve separation efficiency of the cyclone (e.g., less mixing of the air exiting the cyclone chamber and the air cycloning in the cyclone chamber) and/or reduce backpressure through the cyclone chamber.

In accordance with this aspect, there is provided a surface cleaning apparatus comprising: an air flow path extending from a dirty air inlet to a clean air outlet; a suction motor provided in the air flow path; and, a cyclone chamber provided in the air flow path, the cyclone chamber having a cyclone air inlet, a cyclone air outlet, an outlet end, a longitudinally spaced apart opposed end and a screen assembly, the cyclone air inlet having an outlet port that extends a cyclone outlet port length in the longitudinal direction, the cyclone air outlet is provided at the outlet end of the cyclone chamber, wherein the screen assembly comprises an outlet section, a longitudinally spaced apart distal section and a longitudinally extending porous section, and wherein the outlet section comprises a non-porous member extending longitudinally inwardly an outlet section length from an outlet end of the outlet section, which is located at the outlet end of the cyclone chamber, to a longitudinally inwardly positioned inlet end of the outlet section, and wherein the outlet end of the outlet section overlies the cyclone air outlet, the porous section extends longitudinally inwardly from an outlet end of the porous section that is located at the inlet end of the outlet section, and wherein the inlet end of the outlet section has a width in a direction transverse to the longitudinal direction that is greater than a width of the outlet end of the porous section in the transverse direction.

In some embodiments, the porous section may extend between the distal section and the outlet section and the distal section may be non-porous.

In some embodiments, the distal section of the screen assembly may be located at the opposed end of the cyclone chamber.

In some embodiments, the cyclone air inlet may be located at the opposed end of the cyclone chamber.

In some embodiments, the distal end may have a distal section length in the longitudinal direction that is greater than the cyclone outlet port length.

In some embodiments, the outlet port may be spaced from and aligned with the distal section.

In some embodiments, the outlet port may have first and second longitudinally spaced apart sides, the second side located inwardly from the opposed end of the cyclone chamber and the first side of the outlet port, and a projection of the second side in a direction transverse to the longitudinal direction may intersect the distal portion.

In some embodiments, the outlet port may have first and second longitudinally spaced apart sides and a projection of each of the first and second sides in the transverse direction may intersect the distal portion.

In some embodiments, the cyclone air inlet may be located at the opposed end of the cyclone chamber.

In some embodiments, the distal section may have a distal section length in the longitudinal direction that is greater than the cyclone outlet port length.

In some embodiments, the distal section of the screen assembly and the cyclone air inlet may each be located spaced from the outlet end of the cyclone chamber, the outlet port may be spaced from and face towards the distal section, the outlet port may have first and second longitudinally spaced apart sides, the second side located inwardly from the opposed end of the cyclone chamber and the first side of the outlet port, and a projection of the second side in a direction transverse to the longitudinal direction may intersect the distal portion.

In some embodiments, the distal section of the screen assembly and the cyclone air inlet may each be located spaced from the outlet end of the cyclone chamber and each may extend longitudinally towards the outlet end of the cyclone chamber wherein the distal section extends further towards the outlet end of the cyclone chamber than the outlet port of the cyclone air inlet.

In some embodiments, the surface cleaning apparatus may further comprise a dirt collection chamber exterior to the cyclone chamber, the cyclone chamber having a dirt outlet in communication with the dirt collection chamber wherein the dirt outlet may be located at the outlet end of the cyclone chamber.

In some embodiments, the dirt outlet may have a dirt outlet length in the longitudinal direction that is less than the outlet section length.

In some embodiments, the distal section of the screen assembly and the cyclone air inlet may each be located spaced from the outlet end of the cyclone chamber and each may extend longitudinally towards the outlet end of the cyclone chamber wherein the distal section may extend further towards the outlet end of the cyclone chamber than the outlet port of the cyclone air inlet.

In some embodiments, the distal section of the screen assembly and the cyclone air inlet may each be located at the opposed end of the cyclone chamber and the outlet section length may be at least as long as the cyclone outlet port length.

In some embodiments, the distal section may have a distal section length in the longitudinal direction that is greater than the cyclone outlet port length.

In some embodiments, the outlet section length may be at least as long as the cyclone outlet port length.

In some embodiments, the distal section of the screen assembly and the cyclone air inlet may each be located at the opposed end of the cyclone chamber and the outlet section length may be at least as long as the cyclone outlet port length.

In accordance with another broad aspect of the teachings described herein, which may be used alone or in combination with any other aspect, a surface cleaning apparatus may have a cyclone chamber that includes a screen assembly that extends in a longitudinal direction and has an outlet section, a porous section, and a distal section. In some examples, the distal section may be configured to inhibit air from flowing into an inlet end of the outlet section via porous section prior to substantially or completely rotating about the cyclone chamber. For example, the distal section may be longer than a cyclone outlet port length.

An advantage of this design is that it may improve airflow efficiency and/or reduce backpressure through the cyclone chamber.

In accordance with this aspect, there is provided a surface cleaning apparatus comprising: an air flow path extending from a dirty air inlet to a clean air outlet; a suction motor provided in the air flow path; and, a cyclone chamber provided in the air flow path, the cyclone chamber having a cyclone air inlet, a cyclone air outlet, an outlet end, a longitudinally spaced apart opposed end and a screen assembly, the cyclone air inlet having an outlet port that extends a cyclone outlet port length in the longitudinal direction, the cyclone air outlet is provided at the outlet end of the cyclone chamber, wherein the screen assembly comprises an outlet section, a longitudinally spaced apart distal section and a longitudinally extending porous section and the distal section is non-porous, and wherein the outlet section comprises a non-porous member extending longitudinally inwardly an outlet section length from an outlet end of the outlet section, which is located at the outlet end of the cyclone chamber, to a longitudinally inwardly positioned inlet end of the outlet section, and wherein the outlet end of the outlet section overlies the cyclone air outlet, the porous section extends longitudinally inwardly from an outlet end of the porous section that is located at the inlet end of the outlet section, and wherein the distal section has a distal section length in the longitudinal direction that is greater than the cyclone outlet port length.

In some embodiments, the porous section may extend between the distal section and the outlet section.

In some embodiments, the distal section of the screen assembly may be located at the opposed end of the cyclone chamber.

In some embodiments, the cyclone air inlet may be located at the opposed end of the cyclone chamber.

In some embodiments, the outlet section length may be at least as long as the cyclone outlet port length.

In some embodiments, the outlet port may be spaced from and aligned with the distal section.

In some embodiments, the outlet port may have first and second longitudinally spaced apart sides, the second side located inwardly from the opposed end of the cyclone chamber and the first side of the outlet port, and a projection of the second side in a direction transverse to the longitudinal direction may intersect the distal portion.

In some embodiments, the outlet port may have first and second longitudinally spaced apart sides and a projection of each of the first and second sides in the transverse direction may intersect the distal portion.

In some embodiments, the cyclone air inlet may be located at the opposed end of the cyclone chamber.

In some embodiments, the distal section of the screen assembly and the cyclone air inlet may each be located spaced from the outlet end of the cyclone chamber, the outlet port may be spaced from and face towards the distal section, the outlet port may have first and second longitudinally spaced apart sides, the second side located inwardly from the opposed end of the cyclone chamber and the first side of the outlet port, and a projection of the second side in a direction transverse to the longitudinal direction may intersect the distal portion.

In some embodiments, the distal section of the screen assembly and the cyclone air inlet may each be located spaced from the outlet end of the cyclone chamber and each may extend longitudinally towards the outlet end of the cyclone chamber wherein the distal section may extend further towards the outlet end of the cyclone chamber than the outlet port of the cyclone air inlet.

In some embodiments, the surface cleaning apparatus may further comprise a dirt collection chamber exterior to the cyclone chamber, the cyclone chamber having a dirt outlet in communication with the dirt collection chamber wherein the dirt outlet may be located at the outlet end of the cyclone chamber.

In some embodiments, the dirt outlet may have a dirt outlet length in the longitudinal direction that is less than the outlet section length.

In some embodiments, the distal section of the screen assembly and the cyclone air inlet may each be located spaced from the outlet end of the cyclone chamber and each may extend longitudinally towards the outlet end of the cyclone chamber wherein the distal section may extend further towards the outlet end of the cyclone chamber than the outlet port of the cyclone air inlet.

In some embodiments, the distal section of the screen assembly and the cyclone air inlet may each be located at the opposed end of the cyclone chamber and the outlet section length may be at least as long as the cyclone outlet port length.

In some embodiments, the distal section length may be greater than the dirt outlet length.

In some embodiments, the outlet section length may be at least as long as the cyclone outlet port length.

In accordance with another broad aspect of the teachings described herein, which may be used alone or in combination with any other aspect, a surface cleaning apparatus may have a cyclone chamber that includes a screen assembly that extends in a longitudinal direction and has an outlet section, a porous section, and a distal section. In some examples, the outlet section may be configured to inhibit air from flowing into an inlet end of the outlet section via porous section prior to substantially or completely rotating about the cyclone chamber. For example, the distal section may be longer than a cyclone outlet port length.

An advantage of this design is that it may improve airflow efficiency and/or reduce backpressure through the cyclone chamber.

In accordance with this aspect, there is provided a surface cleaning apparatus comprising: an air flow path extending from a dirty air inlet to a clean air outlet; a suction motor provided in the air flow path; and, a cyclone chamber provided in the air flow path, the cyclone chamber having a cyclone air inlet, a cyclone air outlet, an outlet end, a longitudinally spaced apart opposed end and a screen assembly, the cyclone air inlet having an outlet port that extends a cyclone outlet port length in the longitudinal direction, the cyclone air outlet is provided at the outlet end of the cyclone chamber, wherein the screen assembly comprises an outlet section, a longitudinally spaced apart distal section and a longitudinally extending porous section and the distal section is non-porous and has a distal section length, and wherein the outlet section comprises a non-porous member extending longitudinally inwardly an outlet section length from an outlet end of the outlet section, which is located at the outlet end of the cyclone chamber, to a longitudinally inwardly positioned inlet end of the outlet section, and wherein the outlet end of the outlet section overlies the cyclone air outlet, the porous section extends longitudinally inwardly from an outlet end of the porous section that is located at the inlet end of the outlet section, and wherein the outlet section length is at least as long as the cyclone outlet port length.

In some embodiments, the porous section may extend between the distal section and the outlet section.

In some embodiments, the distal section of the screen assembly may be located at the opposed end of the cyclone chamber.

In some embodiments, the cyclone air inlet may be located at the opposed end of the cyclone chamber.

In some embodiments, the outlet section length may be longer than the cyclone outlet port length.

In some embodiments, the outlet port may be spaced from and aligned with the distal section.

In some embodiments, the outlet port may have first and second longitudinally spaced apart sides, the second side located inwardly from the opposed end of the cyclone chamber and the first side of the outlet port, and a projection of the second side in a direction transverse to the longitudinal direction may intersect the distal portion.

In some embodiments, the outlet port may have first and second longitudinally spaced apart sides and a projection of each of the first and second sides in the transverse direction may intersect the distal portion.

In some embodiments, the cyclone air inlet may be located at the opposed end of the cyclone chamber.

In some embodiments, the distal section of the screen assembly and the cyclone air inlet may each be located spaced from the outlet end of the cyclone chamber, the outlet port may be spaced from and face towards the distal section, the outlet port may have first and second longitudinally spaced apart sides, the second side located inwardly from the opposed end of the cyclone chamber and the first side of the outlet port, and a projection of the second side in a direction transverse to the longitudinal direction may intersect the distal portion.

In some embodiments, the distal section of the screen assembly and the cyclone air inlet may each be located spaced from the outlet end of the cyclone chamber and each may extend longitudinally towards the outlet end of the cyclone chamber wherein the distal section extends further towards the outlet end of the cyclone chamber than the outlet port of the cyclone air inlet.

In some embodiments, the surface cleaning apparatus may further comprise a dirt collection chamber exterior to the cyclone chamber, the cyclone chamber having a dirt outlet in communication with the dirt collection chamber wherein the dirt outlet may be located at the outlet end of the cyclone chamber.

In some embodiments, the dirt outlet may have a dirt outlet length in the longitudinal direction that is less than the outlet section length.

In some embodiments, the distal section of the screen assembly and the cyclone air inlet may each be located spaced from the outlet end of the cyclone chamber and each may extend longitudinally towards the outlet end of the cyclone chamber wherein the distal section extends further towards the outlet end of the cyclone chamber than the outlet port of the cyclone air inlet.

In some embodiments, the distal section of the screen assembly and the cyclone air inlet may each be located at the opposed end of the cyclone chamber and the outlet section length may be longer than the cyclone outlet port length.

In some embodiments, the distal section length may be greater than the dirt outlet length.

In some embodiments, the outlet section length may be longer than the cyclone outlet port length.

DRAWINGS

The drawings included herewith are for illustrating various examples of articles, methods, and apparatuses of the teaching of the present specification and are not intended to limit the scope of what is taught in any way.

DETAILED DESCRIPTION

Figure 1:
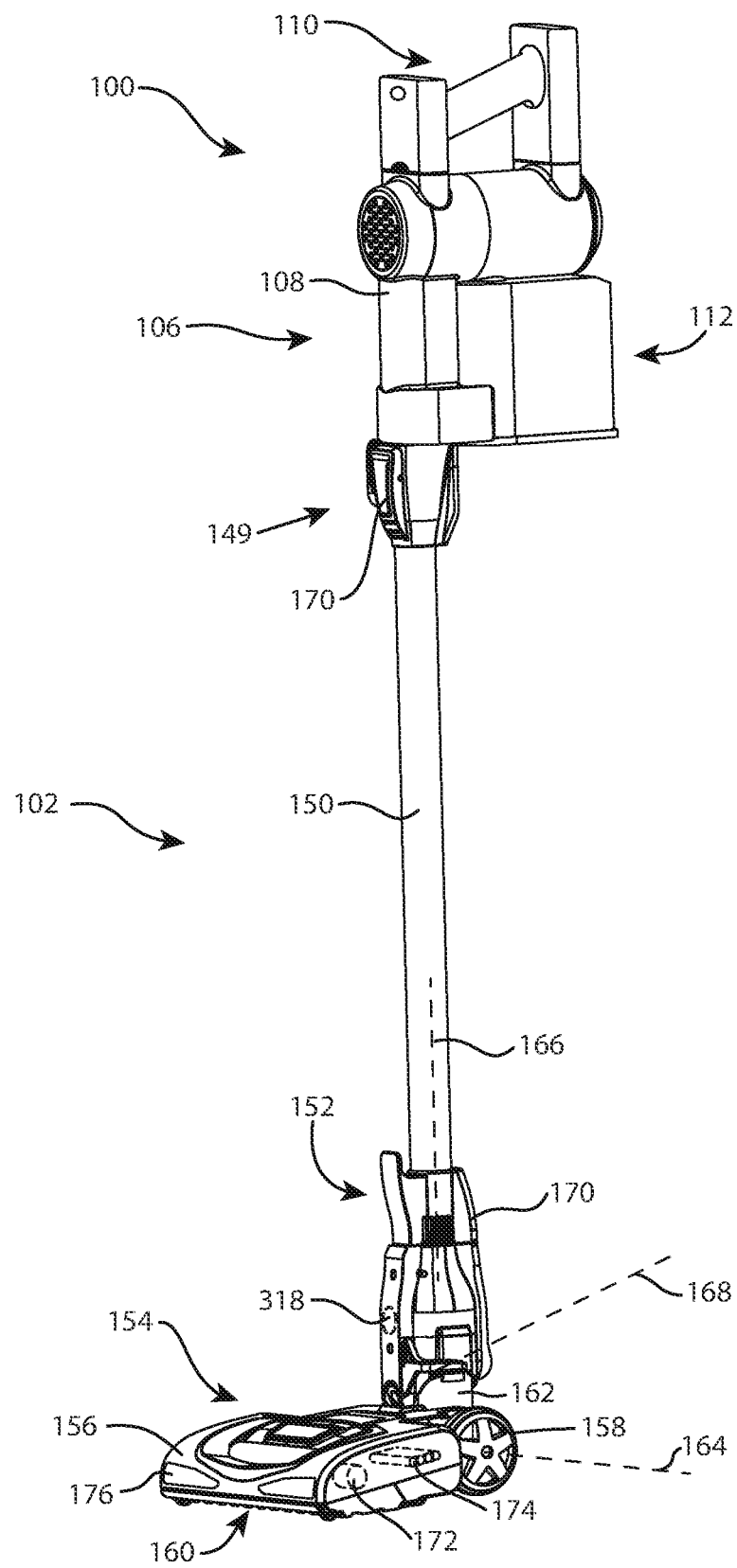
FIG. 1 is a front perspective view of a surface cleaning apparatus in accordance with at least one embodiment and mounted to a rigid air flow conduit (e.g., an above floor cleaning wand) and surface cleaning head in a stickvac configuration.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

General Description of a Vacuum Cleaner

Referring to FIGS. 1 to 8, a first embodiment of a surface cleaning apparatus 100 is shown. The following is a general discussion of this embodiment which provides a basis for understanding several of the features which are discussed herein. As discussed in detail subsequently, each of the features may be used in other embodiments.

In the embodiment illustrated, the surface cleaning apparatus 100 is a hand-held vacuum cleaner, which is commonly referred to as a "hand vacuum cleaner" or a "handvac". As used herein, a hand-held vacuum cleaner or hand vacuum cleaner or handvac is a vacuum cleaner that can be operated generally one-handedly to clean a surface while its weight is held by the same one hand. This is contrasted with upright and canister vacuum cleaners, the weight of which is supported by a surface (e.g. floor below) during use. Optionally, surface cleaning apparatus 100 could be removably mountable on a base so as to form, for example, an upright vacuum cleaner, a canister vacuum cleaner, a stick vac, a wet-dry vacuum cleaner and the like.

Optionally, the hand vacuum 100 can be mounted to a base, such as base 102 in FIG. 1, (either removably or in a fixed manner) so as to form, for example, an upright vacuum cleaner, a canister vacuum cleaner, a stick vac, a wet-dry vacuum cleaner and the like. In the illustrated example, the base of the surface cleaning apparatus includes a surface cleaning head and an elongate wand. In this configuration, the surface cleaning apparatus can be used to clean a floor or other surface in a manner analogous to a conventional upright-style vacuum cleaner.

Power can be supplied to the surface cleaning apparatus 100 by an optional electrical cord 104 (FIG. 2) that can be connected to a standard wall electrical outlet. Alternatively, or in addition, the power source for the surface cleaning apparatus can be one or more onboard energy storage members, including, for example, one or more batteries.

Figure 2:
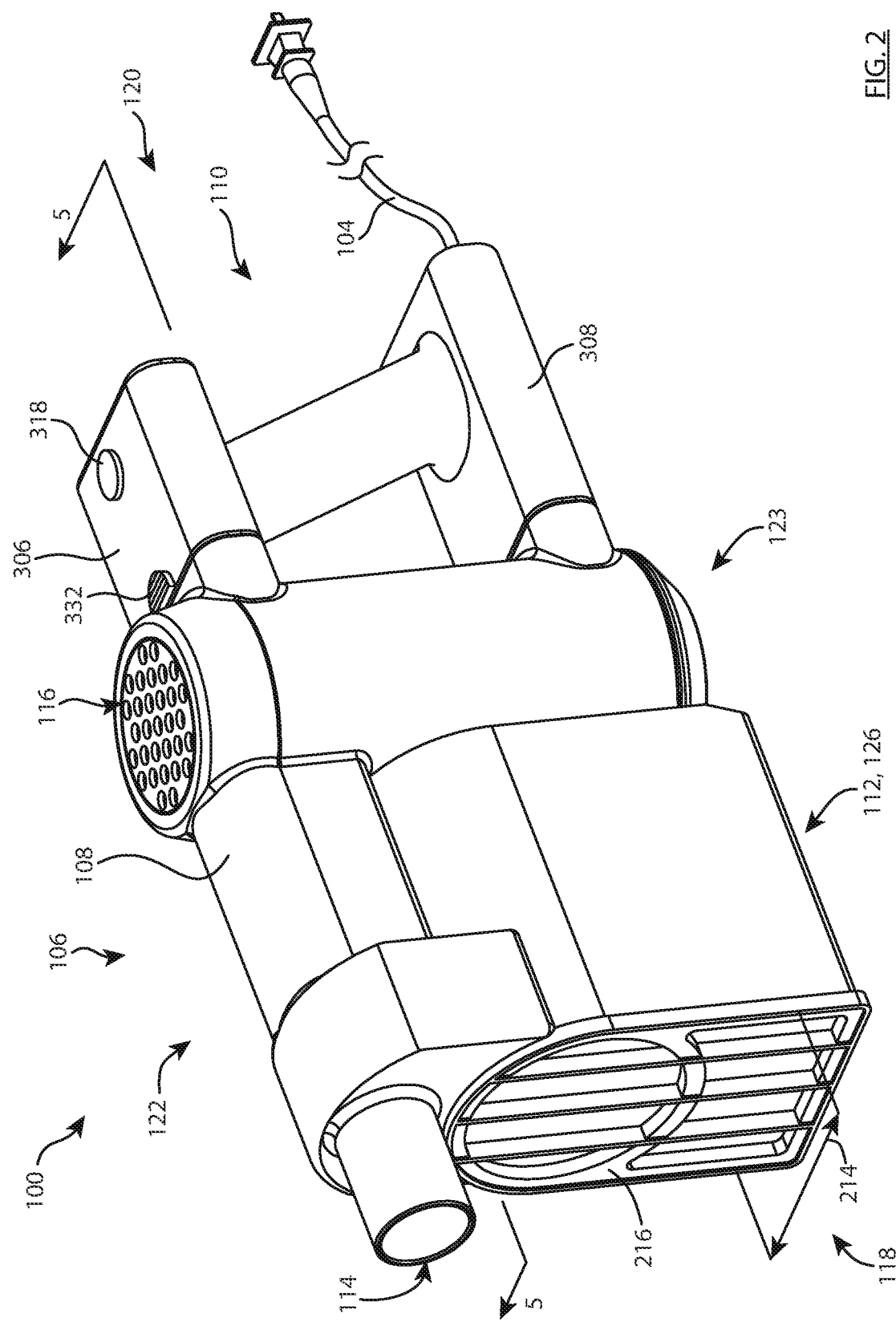
FIG. 2 is a front perspective view of a portion of the surface cleaning apparatus of FIG. 1.
Figure 3:
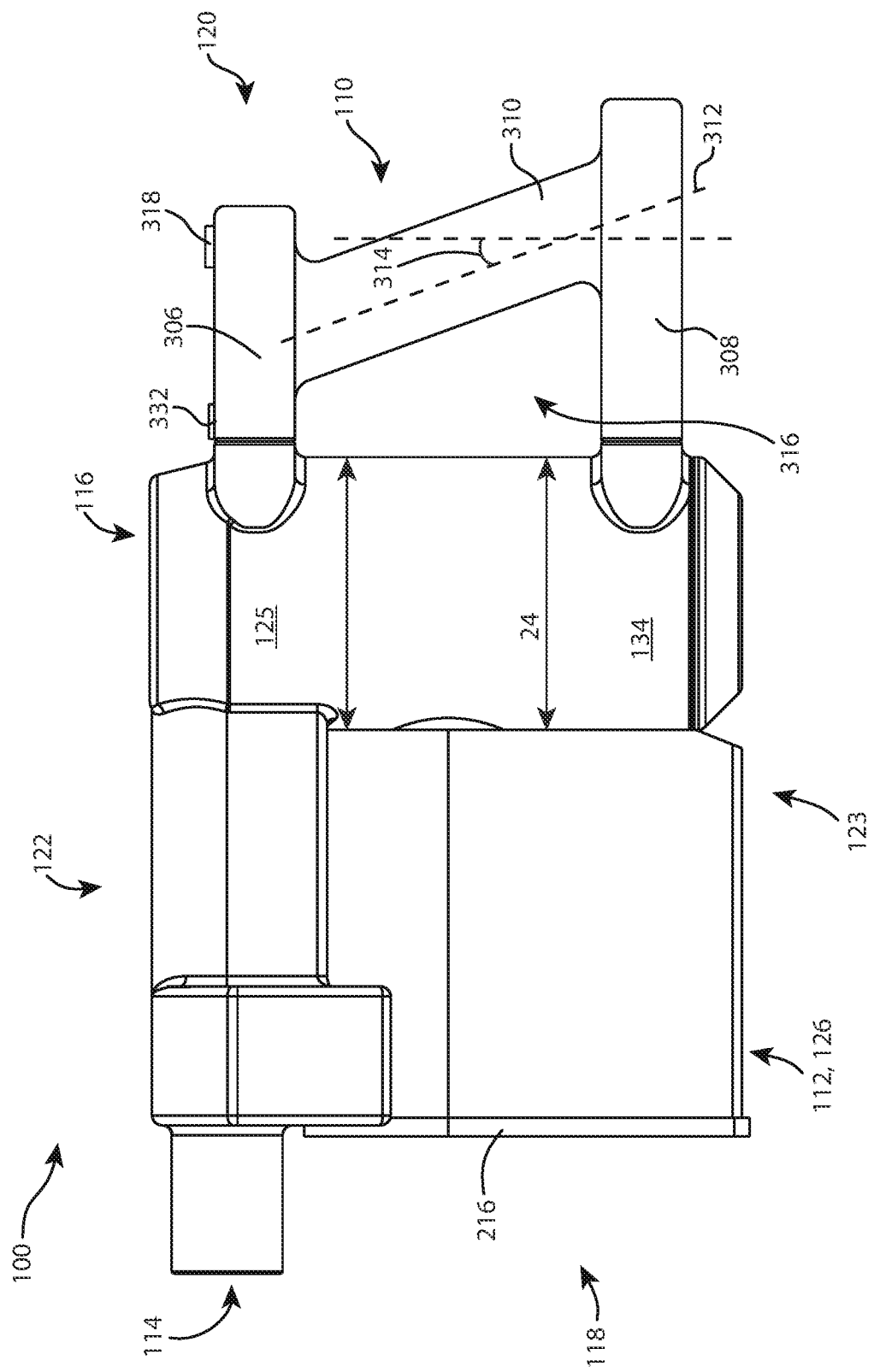
FIG. 3 is a side view of the surface cleaning apparatus of FIG. 2.

As exemplified in FIGS. 1-8 the surface cleaning apparatus 100 may comprise a main body 106 having housing 108 and a handle 110, at least one air treatment member 112 connected to the main body 106, a dirty air inlet 114, a clean air outlet 116, and an air flow path extending between the inlet 114 and outlet 116. Surface cleaning apparatus includes a front end 118, a rear end 120, an upper end 122, and a lower end/bottom 123 (FIGS. 2 and 3). In the embodiment shown, the dirty air inlet 114 is at the front end 118 and the clean air outlet 116 is at the upper end 122. A suction motor 124 (FIG. 5) is provided to generate vacuum suction through the air flow path, and is positioned within a motor housing 125. The suction motor may be upstream or downstream from the air treatment member, and in the illustrated embodiment is downstream.

The at least one at least one air treatment member 112 is configured to treat the air in a desired manner, including, for example, removing dirt particles and other debris from the air flow. The air treatment member 112 may be provided upstream or downstream from the suction motor, and may be any suitable member that can treat the air. Optionally, the air treatment member 112 may include at least one cyclonic cleaning stage, and may in some instances include two or more cyclonic cleaning stages arranged in series with each other. Each cyclonic cleaning stage may include a cyclone unit that has one or more cyclone chambers (arranged in parallel or series with each other) and one or more dirt collection chambers, of any suitable configuration. The dirt collection chambers may be external to the cyclone chambers, or may be internal the cyclone chamber and configured as a dirt collection area or region within the cyclone chamber. Alternatively, the air treatment member need not include a cyclonic cleaning stage, and can incorporate a bag, a porous physical filter media (such as foam or felt) or other air treating means.

Figure 5:
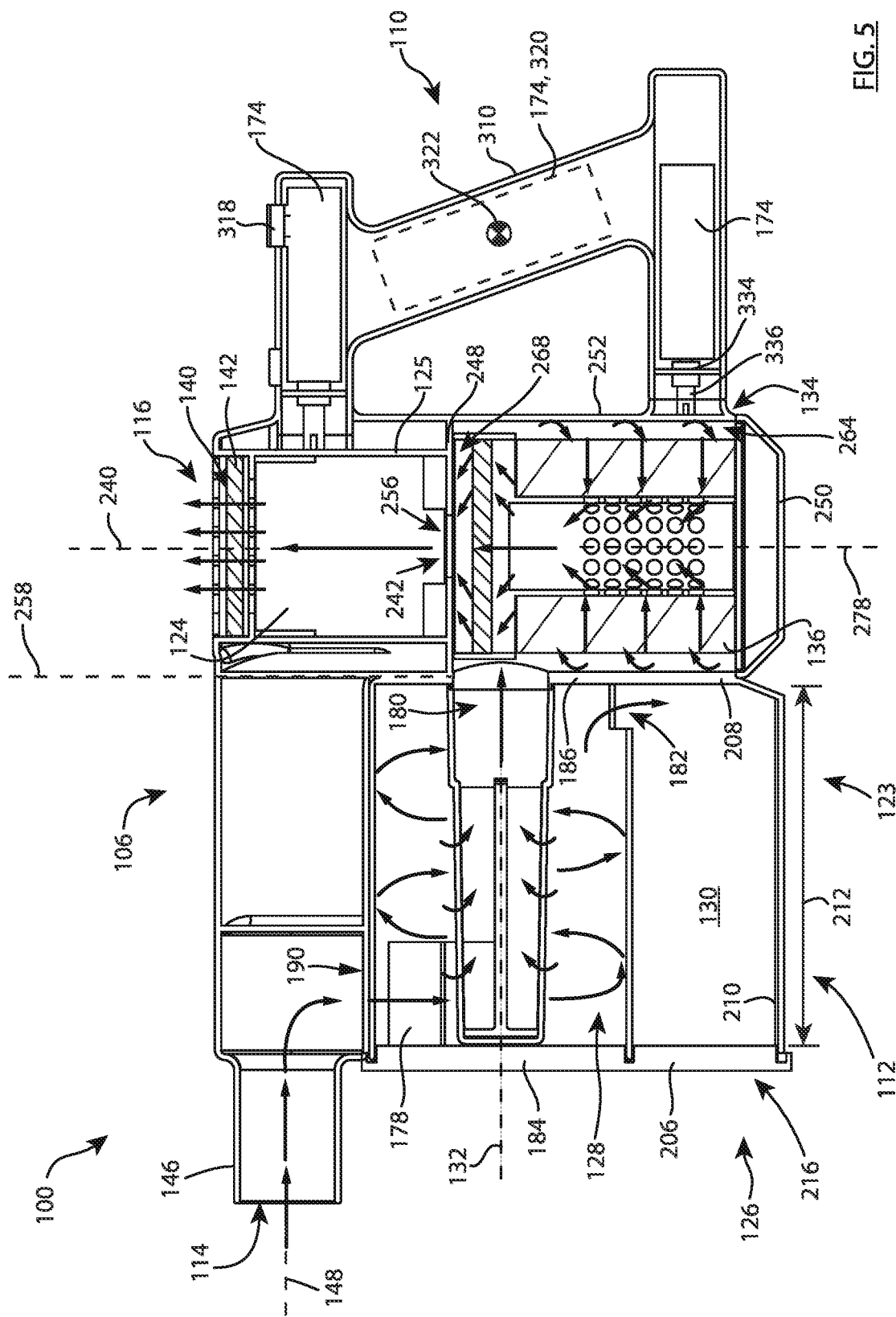
FIG. 5 is a cross-sectional view of the surface cleaning apparatus of FIG. 2, taken along line 5-5.

Referring also to FIG. 5, in the illustrated embodiment the hand vacuum 100 includes an air treatment member 112 in the form of a cyclone unit 126 that is provided upstream from the suction motor 124. The cyclone unit 126 includes a cyclone chamber 128 and an external dirt collection chamber 130. The cyclone chamber 128 and dirt collection chamber 130 may be of any configuration suitable for separating dirt from an air stream and collecting the separated dirt, respectively. The cyclone chamber 128 may be oriented in any direction, including those described in more detail herein. For example, when surface cleaning apparatus is oriented with the upper end 122 above the lower end 123, e.g. positioned with a bottom that is generally planar and is generally parallel to a horizontal surface, a central axis of the air treatment member 112, exemplified as a cyclone axis 132 of rotation in the illustrated embodiments, may be oriented horizontally as exemplified in this embodiment (FIG. 5), vertically (FIG. 38), or at any angle between horizontal and vertical (see FIG. 39).

Optionally, one or more pre-motor filters may be placed in the air flow path between the air treatment member 112 and the suction motor 124. Alternatively, or in addition, one or more post-motor filters may be provided downstream from the suction motor 124.

Figure 6:
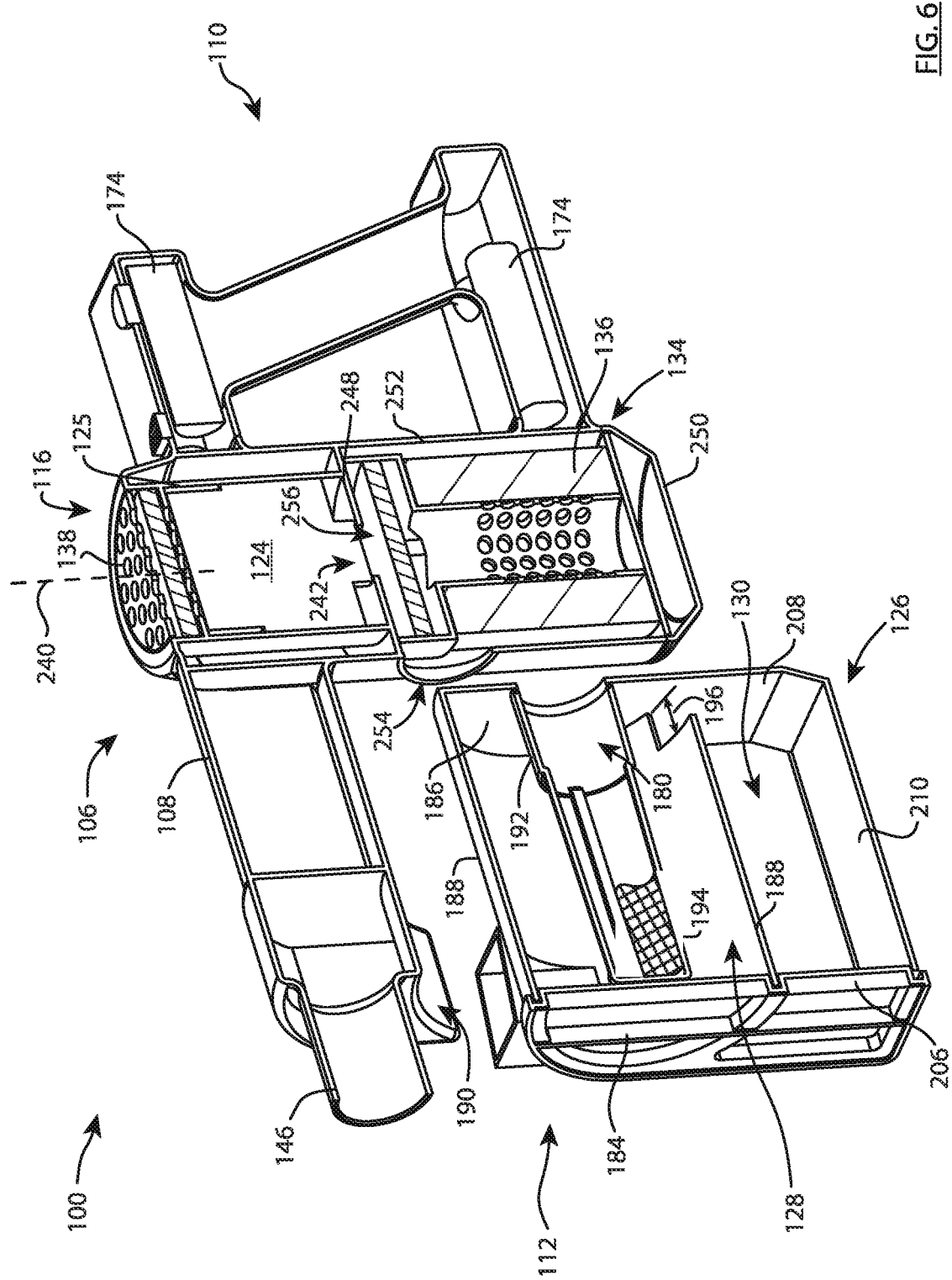
FIG. 6 is a perspective cross-sectional view of the surface cleaning apparatus of FIG. 1, with a portion of the apparatus detached.

As exemplified in FIGS. 5 and 6, the hand vacuum 100 includes a pre-motor filter housing 134 that is positioned in the air flow path downstream of air treatment member 112. Pre-motor filter housing 134 may be of any suitable construction, including any of those exemplified herein. A pre-motor filter 136, formed from any suitable physical, porous filter media and having any suitable shape, is positioned within the pre-motor filter housing 134

In the embodiment of FIGS. 5 and 6, the clean air outlet 116 is provided as part of the main body 106, and includes a grill 138. In this example, the grill 138 is oriented such that air exiting the clear air outlet 116 travels generally upwardly from the upper end 122 of the hand vacuum 100, and it forms part of an optional post-motor filter housing 140. In the illustrated embodiment, a post-motor filter 142 is provided within the housing 140 to help further treat the air passing through the hand vacuum 100. The illustrated post-motor filter 142 is a physical foam media filter, but optionally the post-motor filters may be any suitable type of filter and may include foam filters, felt filters, HEPA filters, other physical filter media, electrostatic filters and the like.

In the embodiment of FIG. 5, the dirty air inlet 114 of the hand vacuum 100 is the inlet end of an inlet conduit 146. Dirty air inlet 114 may be positioned forward of the air treatment member 112 as shown. Optionally, the inlet end of the conduit 146 can be used as a nozzle to directly clean a surface. The air inlet conduit 146 is, in this example, a generally linear member that extends along a conduit axis 148 that is oriented in a longitudinal forward/backward direction and is generally horizontal when the hand vacuum cleaner is oriented with the upper end 122 above the lower end 123. Alternatively, or in addition to functioning as a nozzle, the inlet conduit 146 can be connected or directly connected to the downstream end of any suitable accessory tool such, including as a rigid air flow conduit (e.g., an above floor cleaning wand), crevice tool, mini brush or the like.

For example, FIG. 1 is an exemplary embodiment of a stickvac cleaning apparatus (e.g. a stickvac) that incorporates hand vacuum 100 and is configured so that the inlet conduit 146 is directly connected to the upper end 149 of a rigid cleaning wand 150. The lower end 152 of the cleaning wand 150 is pivotally, and optionally pivotally and steeringly, connected to a surface cleaning head 154. In this arrangement the handle 110 can be used to manipulate the hand vacuum cleaner 100 when the hand vacuum cleaner 100 is detached from the wand 150, and can be used to manipulate the combination of the hand vacuum 100 and the wand 150, or the combination of the hand vacuum 100, wand 150 and surface cleaning head 154 (i.e. the stickvac) depending on the mode in which the surface cleaning apparatus is used.

The surface cleaning head 154 can be of any suitable design, and may include a variety of features, such as rotating brushes, lights and the like. In the illustrated example, the surface cleaning head includes a body 156, a pair of rear wheels 158 connected to the body to rollingly support the surface cleaning head 154 above a surface to be cleaned, and a cleaning head dirty air inlet 160 in the downward facing lower body surface. The surface cleaning head 154 also includes a support member 162 that is pivotally connected to the body 156. The lower end 152 of the wand 150 can be connected to the support member 162, whereby the wand is movable relative to the surface cleaning head, about a pivot axis 164, between a generally upright storage position (FIG. 1), and an inclined use position. In the illustrated example, the support member 162 is provided in the form of an upflow duct that is in fluid communication with the cleaning head dirty air inlet 160. The lower end 152 of the wand 150 is configured to receive the upflow duct 162 (or optionally vice versa) and to fluidly connect the surface cleaning head 154 to the hand vacuum 100.

Optionally, the wand 150 may also be movable in at least one other degree of freedom relative to the surface cleaning head 154 to help facilitate steering of the surface cleaning head 154. For example, the wand 150 may be rotatably connected to the support member so that the wand can rotate about its longitudinal axis 166 relative to the surface cleaning head 154. Alternatively, or in addition, the wand 150 may be pivotable about a different, second pivot axis 168 relative to the surface cleaning head 154. Optionally, the second pivot axis 168 may be generally orthogonal to the pivot axis 164, and may be oriented in a generally forward/backward direction (either generally horizontally or inclined relative to a horizontal plane), as illustrated in the embodiment of FIG. 1.

The wand 150 may be any suitable member that can provide the desired structural connection between the hand vacuum 100 and the surface cleaning head 154. Preferably, the wand 150 can be configured as an air flow conduit that provides the fluid communication between the surface cleaning head 154 and the hand vacuum 100. Alternatively, the wand 150 may include a structural member and a separate air flow connection member (such as a flexible hose or the like). In the illustrated example, the wand 150 is a rigid fluid conduit that provides both structural and air flow connections between the hand vacuum 100 and the surface cleaning head 154. The wand 150 may be made from metal, plastic and/or any other suitable material.

Optionally, the lower end 152 of the wand 150 can be detachably connected to the support member 162, using any means, including a friction fit, suitable latch 170, locking mechanism or the like. Providing a detachable connection may allow the wand 150 to be separate from the surface cleaning head 154 for maintenance and/or for use in above floor cleaning. In such a configuration, the upstream end 152 of the wand 150 can function as an auxiliary dirty air inlet.

Preferably, the hand vacuum 100 can be detachably connected to the opposing upper end 149 of the wand 150, for example using latch 170, so that the hand vacuum 100 can be detached, and used independently from the wand 150 and/or surface cleaning head 154. Providing detachable connections at both ends of the wand 150 may help facilitate use of the surface cleaning apparatus 100 in at least three different operating modes: i) an upright cleaning mode in which both the surface cleaning head and hand vacuum are attached to the wand and there is an air flow path extending from the dirty air inlet in the surface cleaning head to the hand vacuum and including the wand; ii) a first above floor cleaning mode in which the wand is detached from the surface cleaning head and an air flow path extends from the auxiliary dirty air inlet to the hand vacuum cleaner; and iii) a second above floor cleaning mode in which the hand vacuum is detached from the upper end of the wand and the nozzle is used to directly clean a surface and/or is connected to one or more auxiliary cleaning tools (such as a hose, crevice tool, upholstery brush and the like).

Optionally, power can be supplied to the surface cleaning apparatus by the electrical cord connected to the hand vacuum (FIG. 2) that can be connected to a standard wall electrical outlet. The cord 104 may optionally be detachable from the hand vacuum 100. Alternatively, or in addition, the power source for the surface cleaning apparatus can be an onboard energy storage device which may include, for example, one or more batteries. In the embodiment of FIG. 5, the hand vacuum includes on board power sources in the form of battery packs 174 provided in the handle 110. The battery packs 174 are described in further detail herein. In some examples, the surface cleaning head 154 may include a rotating brush and brush motor 172 (FIG. 1), lights or other such features that require power. Optionally, power can be provided to the surface cleaning head 154 from the hand vacuum 100 via the wand 150, which may be configured to electrically connect the hand vacuum 100 to the surface cleaning head 154. Alternatively, or in addition to receiving power for the hand vacuum 100 via the wand 150, the surface cleaning head 154 may include its own battery pack 174.

In the embodiments of FIG. 5, and others illustrated herein (FIGS. 9-13), the pre-motor filter housing 134 and the suction motor housing 125 are both positioned rearward of the air treatment member 112 and forward of the handle 110. Alternatively, in other embodiments, such as those illustrated in FIGS. 27, 33 and 36, the main body 106 may be configured so that the pre-motor filter housing 134 is positioned rearward of the air treatment member 112 (and forward of the handle 110), but the suction motor housing 125 is positioned forward of both the pre-motor filter housing 134 and the handle 110. In this configuration, some or all of the suction motor housing 125 may be positioned above the air treatment member 112. For example, in the embodiment of FIG. 27, the suction motor housing 125 is positioned forward of the pre-motor filter housing 134 and is above and overlies an upper portion of a sidewall 188 of the cyclone chamber 128. In this embodiment, and the embodiments of Figure the suction motor 124 is also above and overlies the dirt collection chamber 130. In this arrangement, the suction motor housing 125 is rearward of the air inlet conduit 146. Positioning the suction motor housing 125, and the suction motor 124 therein, forward of the pre-motor filter housing 134 may alter the centre of gravity and hand feel of the hand vacuum 100 when in use. This configuration may also help facilitate the use of a relatively large pre-motor filter housing 134, and a pre-motor filter 136 with a relatively large upstream surface area, while helping to reduce the overall size of the hand vacuum 100.

Cyclone Unit

The following is a description of cyclone units that may be used by themselves in any surface cleaning apparatus or in any combination or sub-combination with any other feature or features described herein. For example, any cyclone unit described herein may be used with any of the dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Referring to the embodiment of FIG. 5, the cyclone unit 126 used in the hand vacuum 100 can optionally be a cyclone with unidirectional air flow or a "uniflow" cyclone chamber 128 (i.e. where the air inlet and air outlets are at opposite ends of the cyclone chamber). The cyclone chamber 128 includes a cyclone air inlet 178 in fluid communication with the inlet conduit 146, a cyclone air outlet 180 and a dirt outlet 182 that is in communication with the dirt collection chamber 130.

Optionally, the uniflow cyclone chamber 128 may be generally horizontally oriented so that the cyclone air inlet 178 is located toward the front end 118 of the hand vacuum 100, and the cyclone air outlet 180 spaced rearwardly behind the cyclone air inlet 178, at a rear end of the cyclone chamber 128. In this embodiment, the cyclone air outlet 180 is adjacent and faces other portions of the hand vacuum 100. For example, in the embodiments illustrated in FIGS. 1-8, 9, 10, 11, 12, 22, 27, 33 and 36 the cyclone air outlet 180 is directly adjacent the pre-motor filter housing 134 and faces one side (e.g., upstream or downstream side) of the pre-motor filter media 136.

Figure 38:
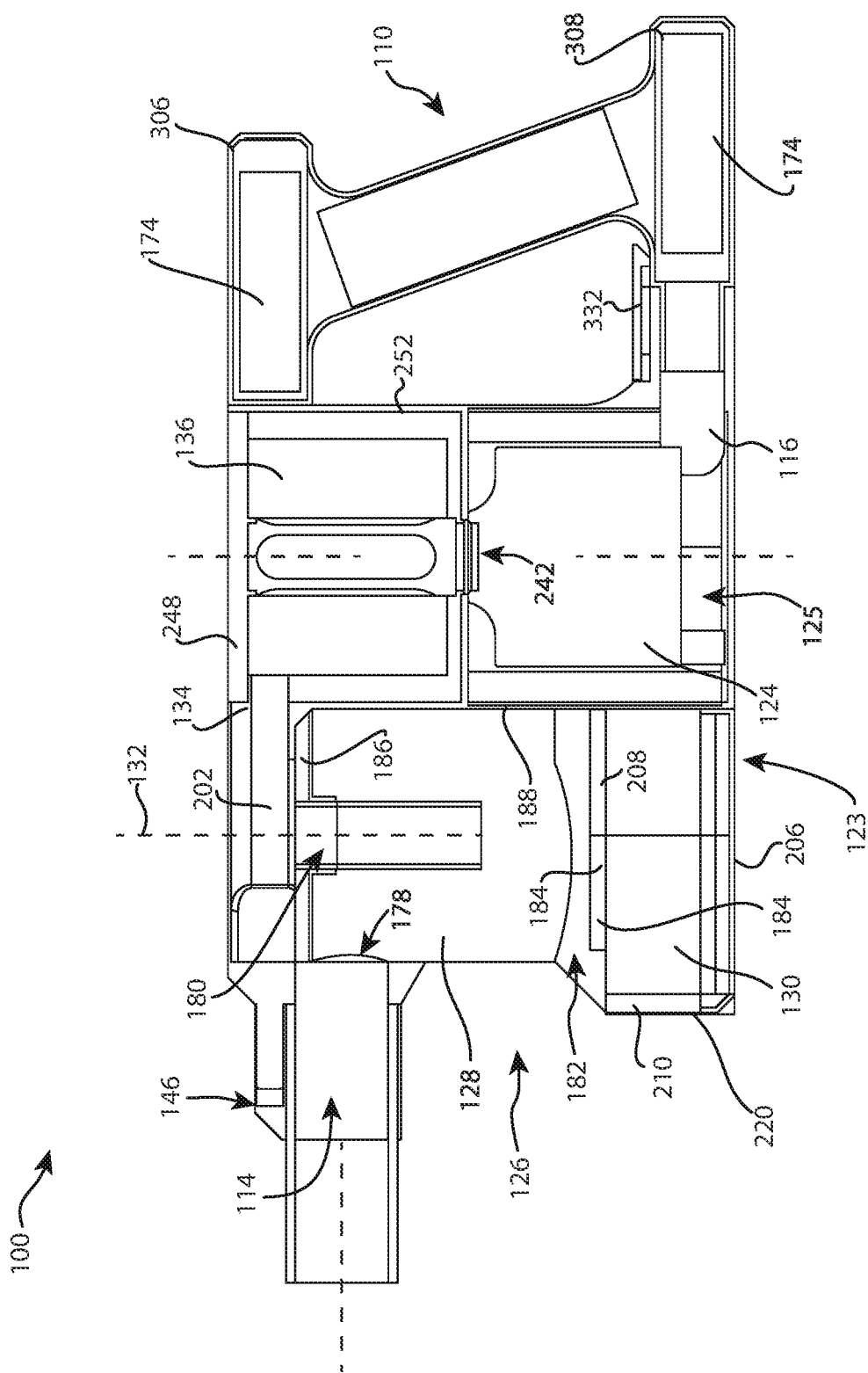
FIG. 38 is a cross-sectional view of the surface cleaning apparatus of FIG. 37, taken along line 38-38.
Figure 39:
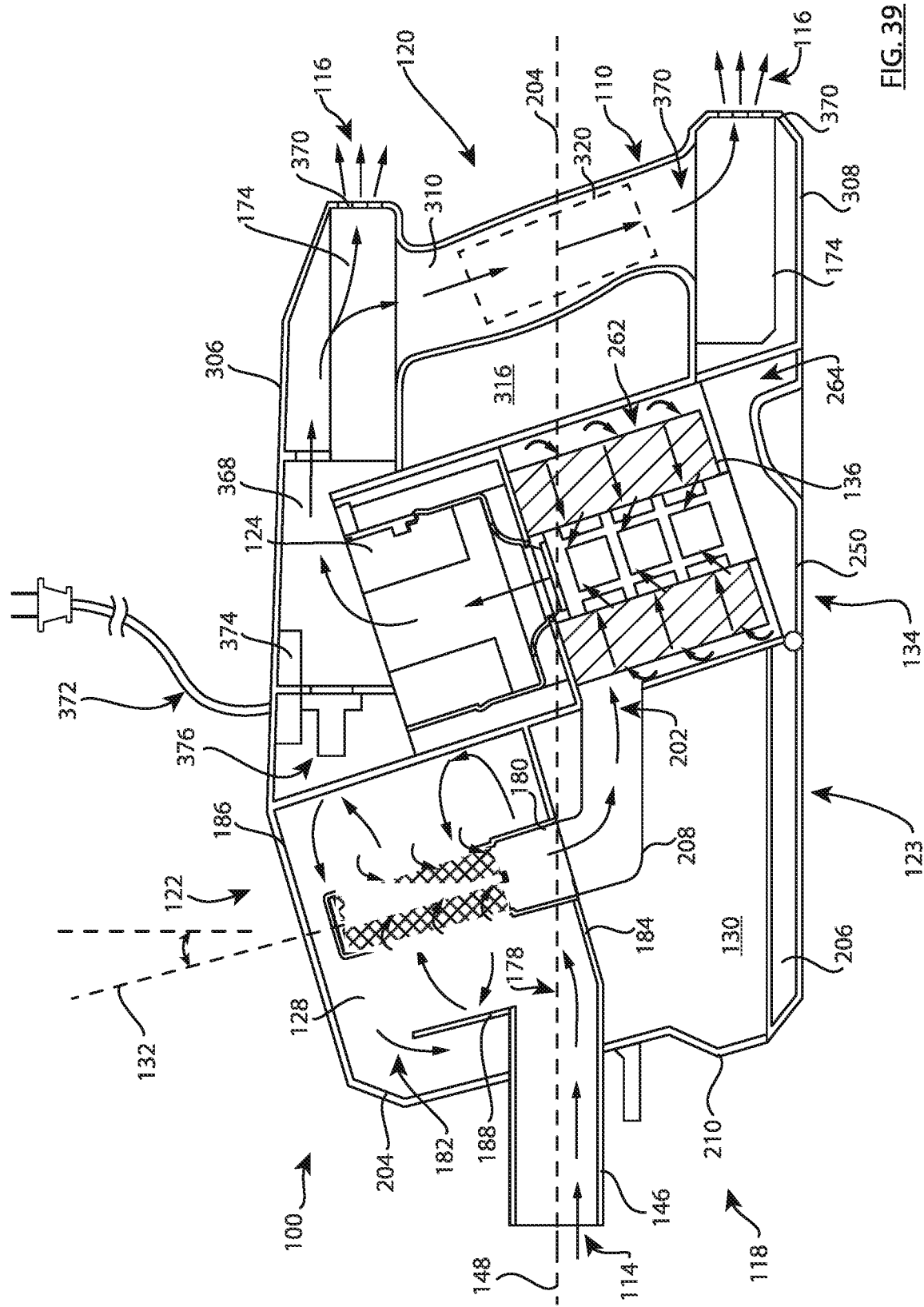
FIG. 39 is a side cross-sectional view of another embodiment of a surface cleaning apparatus.

One advantage of this design is that the cyclone air inlet 178 may be a tangential air inlet that is used to redirect the air from the inlet conduit 146 to the cyclone chamber 128 and the air may exit the cyclone chamber 128 and travel linearly (rearwardly) to the pre-motor filter 136. Accordingly, dirty air may travel from the cyclone air outlet 180 to the pre-motor filter 136 without passing through any bends, thereby reducing the backpressure created by air flow through the vacuum cleaner. Alternatively, the cyclone chamber 128 may be configured so that the air inlet 178 and air outlet 180 are located toward the same end of the cyclone chamber, such as shown in the embodiments of FIGS. 38 and 39. This configuration may provide flexibility regarding position of the dirty air inlet 114 relative to the rest of the main body 106, and may allow for a different arrangement of the hand vacuum components.

FIGS. 5 and 6 exemplify one embodiment of a hand vacuum 100 having a cyclone unit that includes a uniflow cyclone chamber 128 and a dirt collection chamber 130 that is positioned outside/exterior to the cyclone chamber 128 and is in communication with the dirt outlet 182 to receive dirt and debris exiting the cyclone chamber 128. In the illustrated example, the cyclone air inlet 178 and dirt outlet 182 are positioned toward opposing ends of the cyclone chamber 128, and the cyclone air outlet 180 is provided toward the same end as the dirt outlet 182 (the rear end as illustrated). In this configuration, dirty air can enter at the front end of the cyclone chamber, while cleaner air and the separated dirt particles both exit the cyclone chamber at the opposing rear end.

Figure 11:
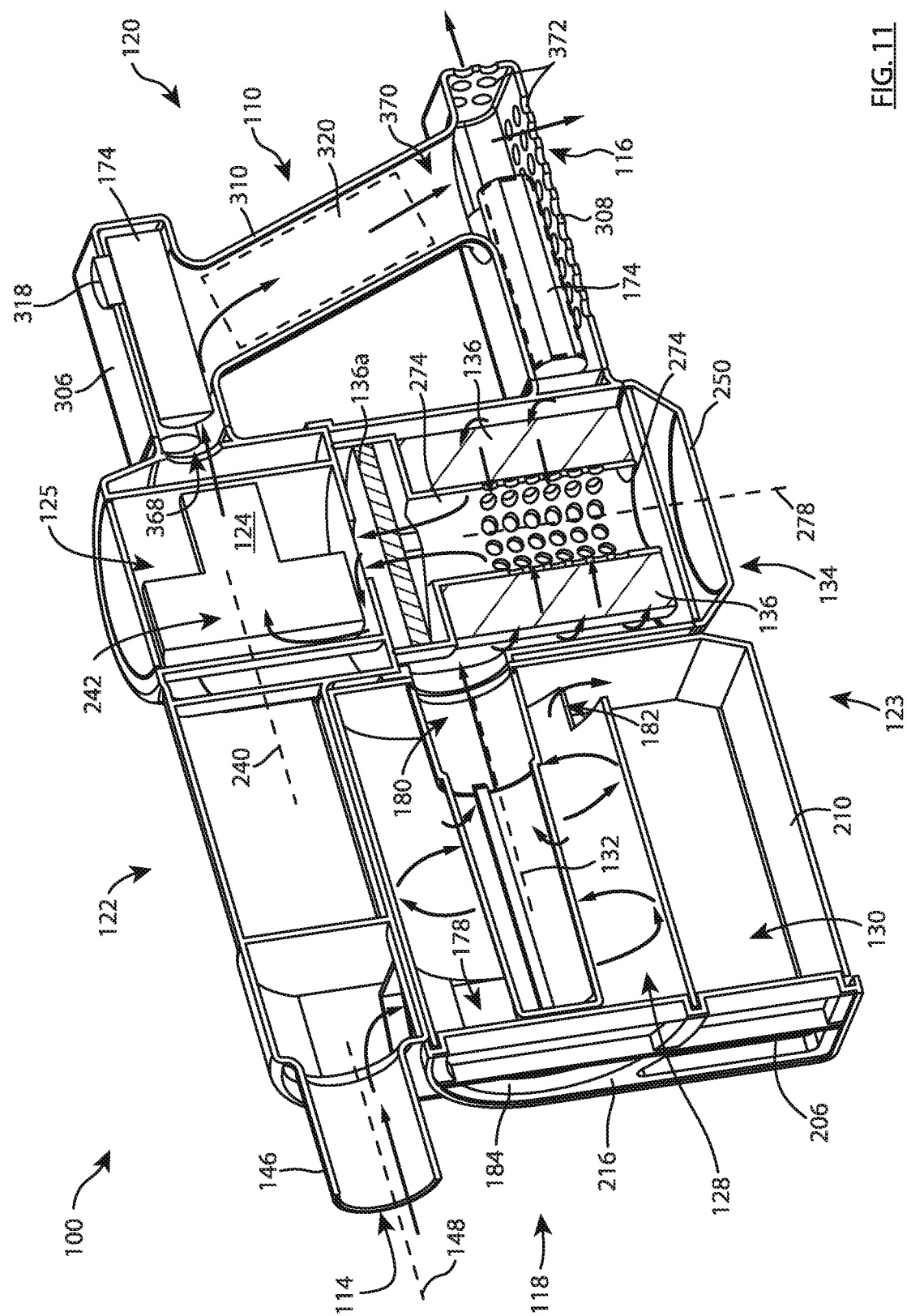
FIG. 11 is a perspective cross-sectional view of another embodiment of a surface cleaning apparatus.

In this embodiment, the cyclone chamber 128 has a front end wall 184 and an opposing rear end wall 186 that is spaced apart from the front end wall along the cyclone axis 132 about which air circulates when within the cyclone chamber 128. A cyclone chamber sidewall 188 extends between the front and rear end walls 184, 186. In the illustrated example, when the hand vacuum is oriented with the upper end above the lower end, the cyclone axis 132 is generally horizontal, and is closer to horizontal than vertical, e.g., ±20°, ±15°, ±10°, or ±5°. As exemplified, the cyclone axis 132 is substantially parallel to, e.g. ±20°, ±15°, ±10°, or ±5°, and laterally (vertically) offset below the conduit axis 148 of the air inlet conduit 146, the cyclone chamber 128 and dirt collection chamber 130 are below the inlet conduit axis 148, and a projection of the inlet conduit axis 148 intersects the suction motor 124. In the embodiment of FIG. 11, when the hand vacuum 100 is horizontal (as illustrated), the inlet conduit axis 148 is above the cyclone axis 132 and intersects the suction motor 124. In this embodiment, the suction motor 124 is arranged so that a suction motor axis 240 is horizontal and is parallel to the inlet conduit axis 148, and is disposed above the cyclone axis 132.

In this embodiment, the cyclone air inlet 178 may terminate at an opening that is formed in cyclone sidewall 188, optionally an upper portion of the cyclone sidewall 188, adjacent the front end wall 184. Optionally, the cyclone air inlet 178 can be formed in the front end wall. The cyclone air inlet 178 is fluidly connected with the outlet end of the conduit 146 via a corresponding air outlet aperture 190 that may be provided in a lower portion of the air inlet conduit 146. The cyclone air inlet 178 may have any suitable arrangement and/or configuration, and in the illustrated example is configured as a tangential air inlet that is directly connected to the air outlet aperture 190. Connecting the air inlet 178 to the air outlet aperture 190 in this manner may help reduce the need for additional conduits to fluidly connect the dirty air inlet 114 to the cyclone chamber 128, and may reduce or eliminate the need for additional bends or air flow direction changes between the dirty air inlet 114 and the cyclone chamber 128. Reducing the conduit length and number of bends may help reduce the backpressure and air flow losses within the air flow path.

Positioning the cyclone air inlet 178 toward the front of the cyclone chamber 128 may help facilitate a desired air flow configuration within the cyclone chamber 128. For example, in this configuration the cyclone chamber 128 itself functions as part of the air flow path that conveys air rearwardly from the front 118 of the hand vacuum 100 to the pre-motor filter housing 134, without the need for a separate fluid conduit. This may help reduce the complexity of and back pressure produced by the air flow path, and may help reduce the number of joints and seals required in the air flow path.

In the illustrated example, the cyclone air inlet 178 is directly adjacent the front wall 184. Alternatively, the cyclone air inlet 178 may be axially spaced from the front end wall 184, and may be located at another location along the length of the cyclone chamber 128. Preferably, the cyclone air inlet 178 may be provided in the front half of the cyclone chamber 128 (i.e. forward of the axial mid-point of the cyclone chamber sidewall 188). Positioning the cyclone air inlet 178 toward the front of the cyclone chamber 128 may help reduce the distance between the dirty air inlet 114 and the cyclone air inlet 178.

In the embodiment of FIGS. 5 and 6, the cyclone air outlet 180 is provided in the rear end wall 186 of the cyclone chamber 128, adjacent the pre-motor filter housing 134, and an axially extending vortex finder conduit 192 extends from the rear end wall 186 and is aligned with the cyclone air outlet 180. An optional mesh screen 194 is shown in positioned on the inlet end of the vortex finder conduit 192 to help inhibit lint, hair and other such debris from entering the vortex finder conduit 192. Positioning the air outlet 180 toward the rear end (and optionally in the rear end wall 186) may help facilitate the desired air flow through the cyclone chamber 128, such that air, while swirling, travels generally axially though the cyclone chamber 128—from the front end wall 184 toward the rear end wall 186.

Positioning the air outlet 180 in the rear end wall 186 of the cyclone chamber 128 may also help facilitate the air flow connection between the cyclone chamber 128 and other downstream components in the hand vacuum, such as the pre-motor filter housing 134 and suction motor housing 125 described herein. In this embodiment the air outlet 180 in the rear end wall 186 and is connected substantially directly to the pre-motor filter housing 134 without the need for a separate connecting conduit. This may help simplify the air flow path and construction of the hand vacuum. Alternatively, the air flow path may include one or more conduits connected downstream from the cyclone air outlet.

In this arrangement, air travelling through the hand vacuum 100 will travel generally rearwardly along the air inlet conduit 146 (i.e. parallel to the conduit axis 148) and then change direction to travel generally downwardly into the cyclone air inlet 178 (i.e. generally orthogonal to the cyclone axis 132). The air can then circulate within the cyclone chamber 128, and travel generally rearwardly toward the cyclone air outlet 180, and ultimately exit the cyclone chamber 128 via the cyclone air outlet 180 while travelling through the vortex finder 192 in a rearward direction (i.e. generally parallel to the cyclone axis 132). In this configuration, the air flow changes direction only once (and by only approximately 90° which may be accomplished by a tangential air inlet), between entering the dirty air inlet 114 and exiting the cyclone air outlet 180.

The cyclone dirt outlet 182 may be of any suitable configuration, and in the embodiment of FIGS. 5 and 6 is a slot 182 that is provided in the cyclone chamber side wall 188, toward the rear end wall 186. The slot 182 can extend around at least a portion of the perimeter of the cyclone side wall 188, and may have any suitable height 196 in the axial direction (FIG. 6). As exemplified, the slot may be provided only in a lower portion of the sidewall. Accordingly, when dirty air inlet 114 faces downwardly during use, dirt will exit into an upper end of an external dirt collection chamber. Positioning the dirt collection chamber below the cyclone chamber, and not surrounding the cyclone chamber, reduces the width of the hand vacuum. While shown directly adjacent the rear end wall 186, such that the slot 182 is partially bounded by the cyclone side wall 188 and the rear end wall

Figure 22:
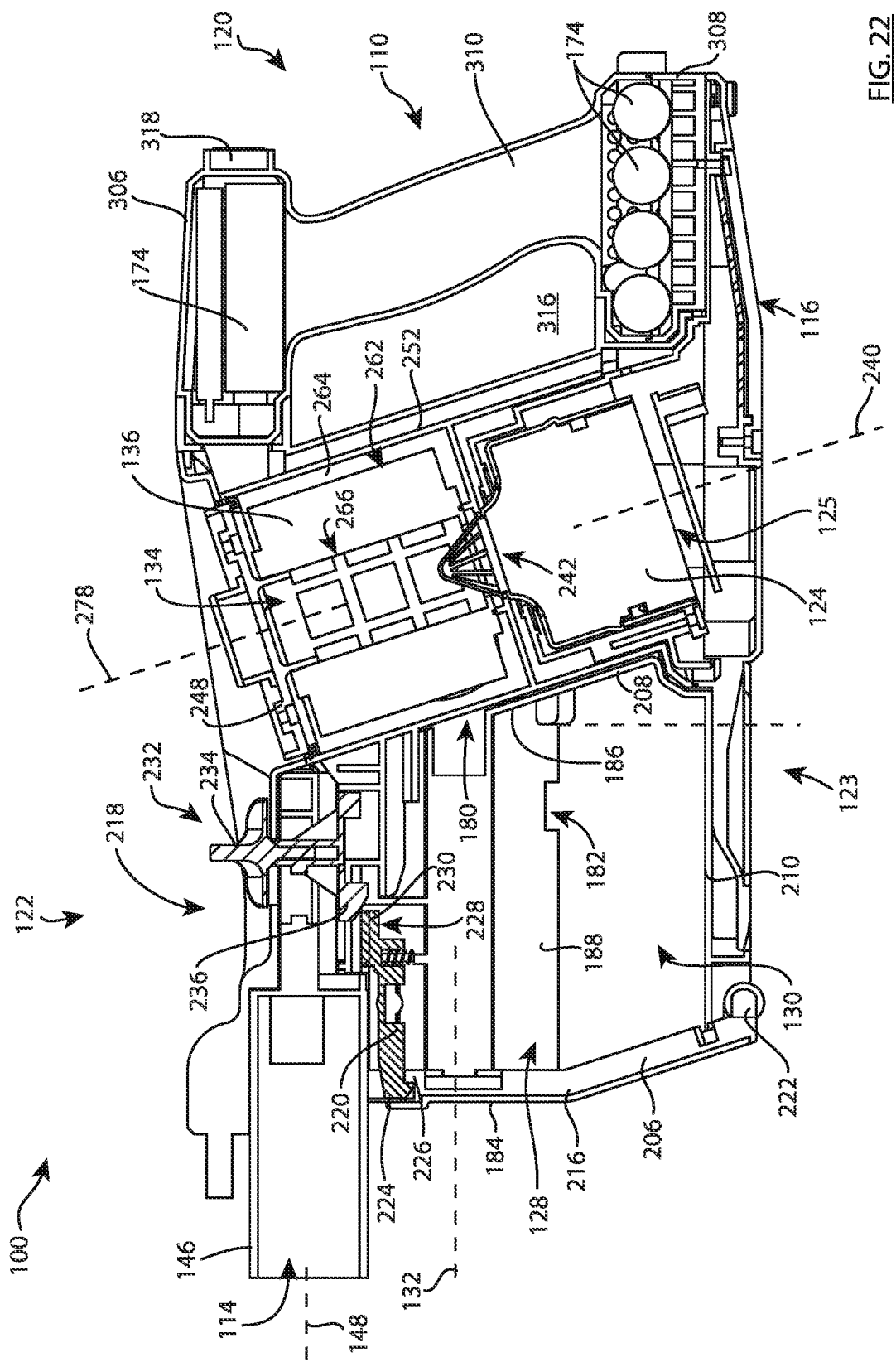
FIG. 22 is a side cross-sectional view of another embodiment of a surface cleaning apparatus.

186, the slot 182 may be located at another location along the length of the cyclone side wall 188, and need not be directly adjacent the rear end wall 186 (see FIG. 22). Optionally, the dirt outlet 182 may be provide toward the mid-point of the cyclone chamber sidewall 188, or may be provided toward the front end wall 184. While illustrated with a single dirt outlet 182, the cyclone chamber 128 may include two or more dirt outlets that are in communication with the same, or optionally different dirt collection chambers 130.

Figure 27:
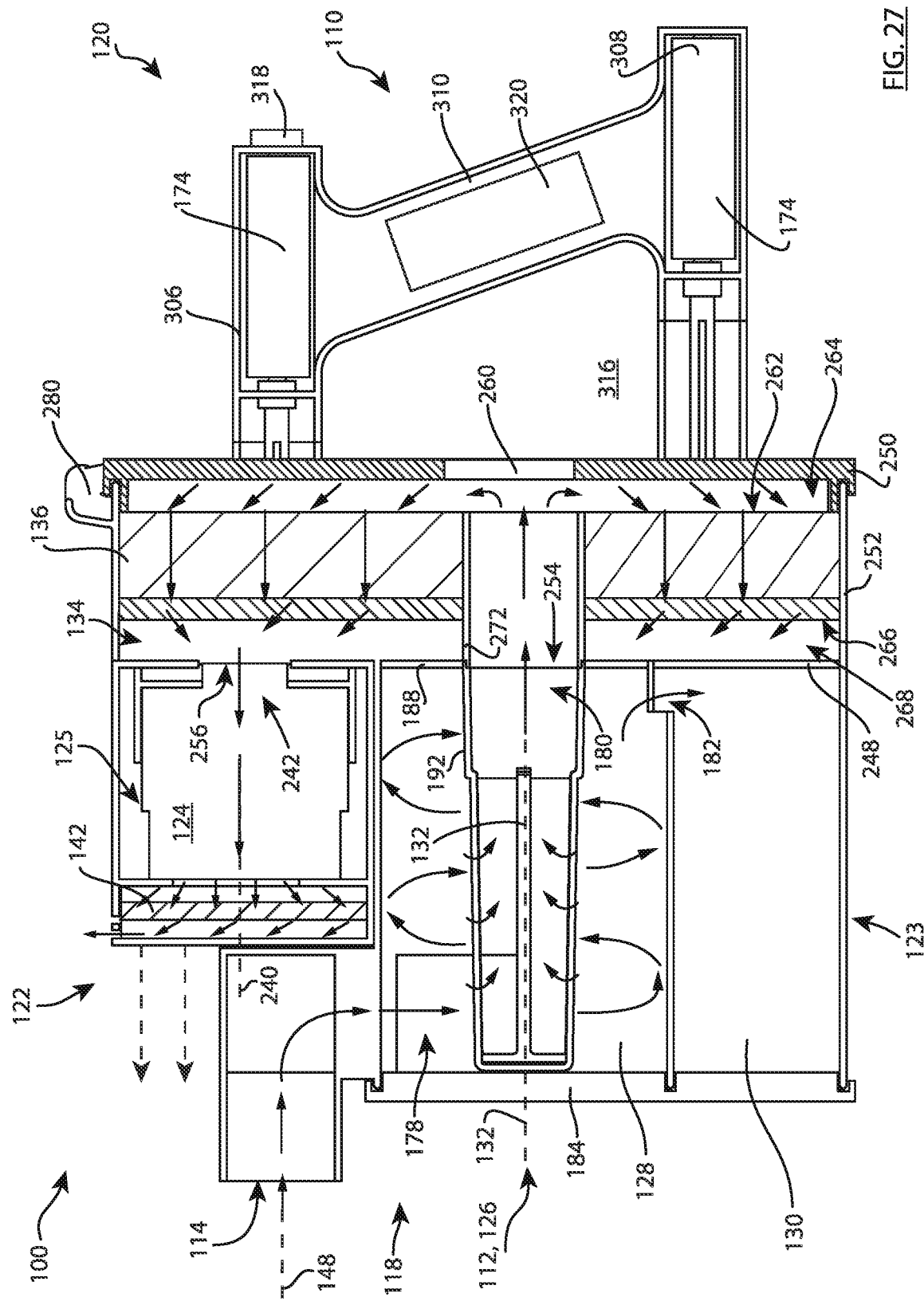
FIG. 27 is a cross-sectional view of the surface cleaning apparatus of FIG. 25, taken along line 25-25.
Figure 29:
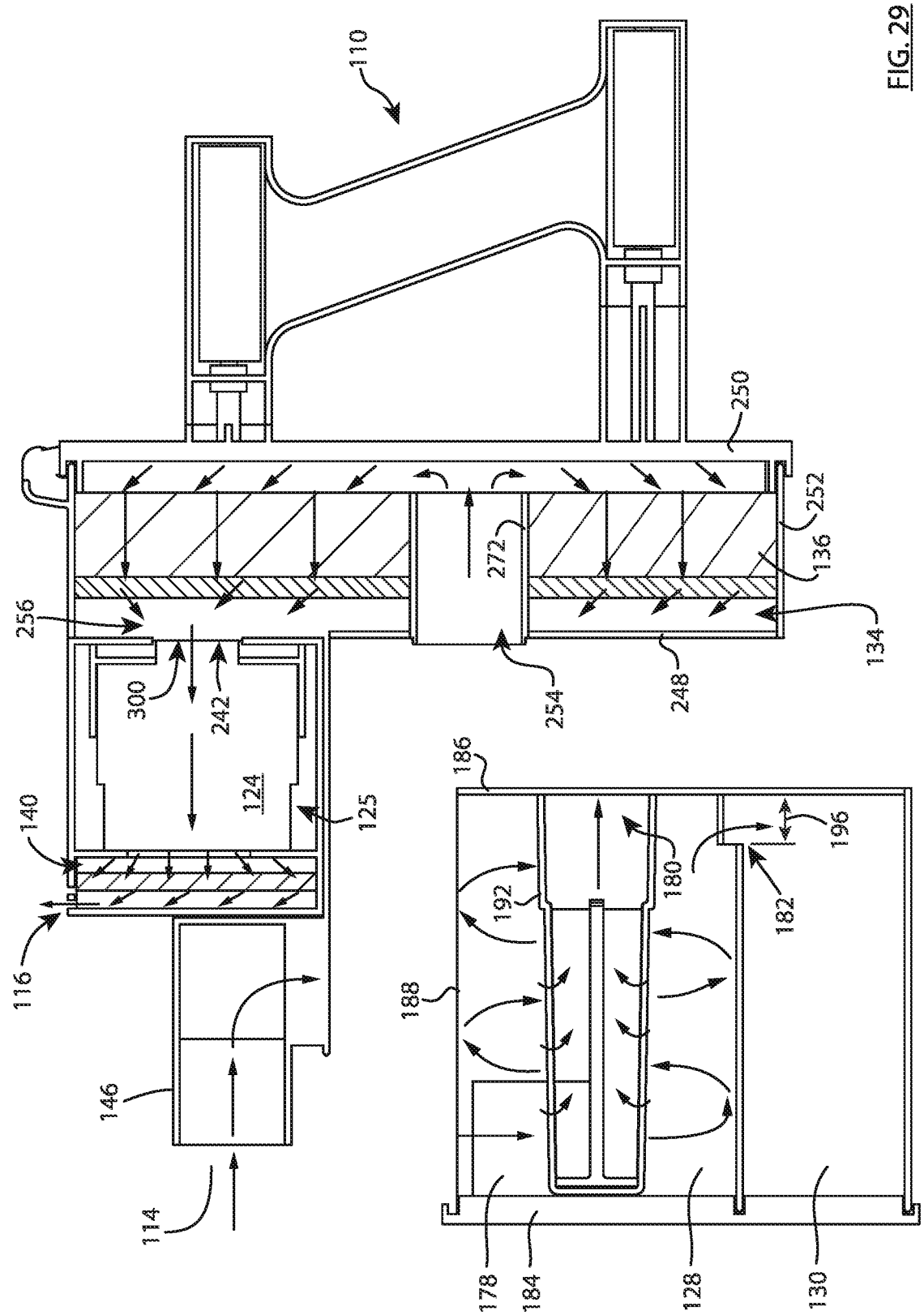
FIG. 29 is a cross-sectional view of the surface cleaning apparatus of FIG. 25, with a portion of the apparatus detached.

Referring to FIGS. 27 and 29, a cyclone chamber having substantially the same configuration as shown in FIGS. 5 and 6 is shown in another embodiment of a hand vacuum cleaner 100 that includes a different pre-motor filter housing 134 and suction motor housing 125 configuration (which are described in more detail herein). While the configuration of the pre-motor filter housing 134 is different from the pre-motor filter housing of FIGS. 5 and 6, the air flow path from the dirty air inlet 114 to the cyclone air outlet 180 is substantially the same as described above, and the cyclone air outlet 180 is connected directly to the pre-motor filter housing 134.

Optionally, in some embodiments the cyclone unit 126 may be configured to include two or more cyclone chambers 128. The cyclone chambers can be arranged in series with each other (air exiting one cyclone chamber flows into another cyclone chamber) or in parallel with each other. If multiple cyclone chambers are provided, they may be generally the same size and configuration as each other, or alternatively may be of different sizes and configurations.

Referring to FIGS. 15-21, an embodiment of a hand vacuum cleaner 100 is shown in which the air treatment member 112 is a cyclone unit 126 that includes two cyclone chambers 128. Each cyclone chamber may be generally analogous to the cyclone chamber illustrated in FIG. 5, and like features are indicated using like reference characters.

In this embodiment, the cyclone chambers 128 are arranged as mirror images of each other and are positioned adjacent to each other in a generally horizontal arrangement, so that the cyclone axes 132 are substantially parallel with each other. In this embodiment, the cyclone air inlets 178 are spaced apart from each other and are provided on opposite, outer sides of the cyclone unit 126. Alternatively, one or both of the air inlets 178 could be provided toward the centre of the cyclone unit 126.

Figure 21:
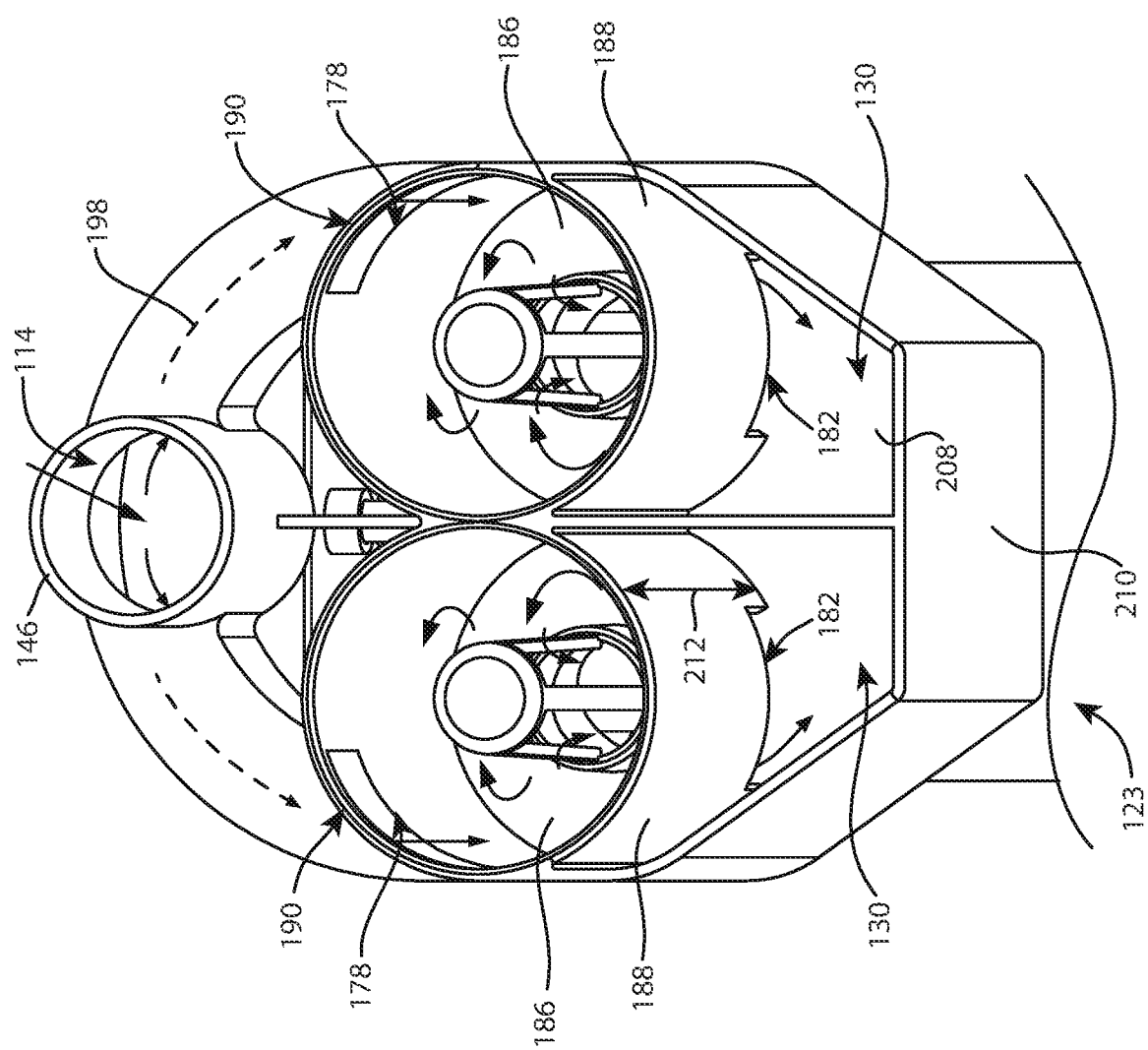
FIG. 21 is a lower front perspective view of a portion of the surface cleaning apparatus illustrated in FIG. 20.

Referring to FIG. 21, to provide air flow communication between the cyclone chambers 128 and the dirty air inlet 114, in the illustrated embodiment the inlet conduit 146 includes an inlet manifold portion 198 that divides the incoming dirty air flow between the air inlets 178 of both cyclone chambers 128. The manifold portion 198 is downstream from the inlet end of the inlet conduit 146, and includes two spaced apart outlet apertures 190—one connected to each of the cyclone air inlets 178. Alternatively, other air flow paths may be provided, including, for example providing two dirty air inlets on the hand vacuum cleaner, each in fluid communication with respective one of the cyclone chambers.

Figure 20:
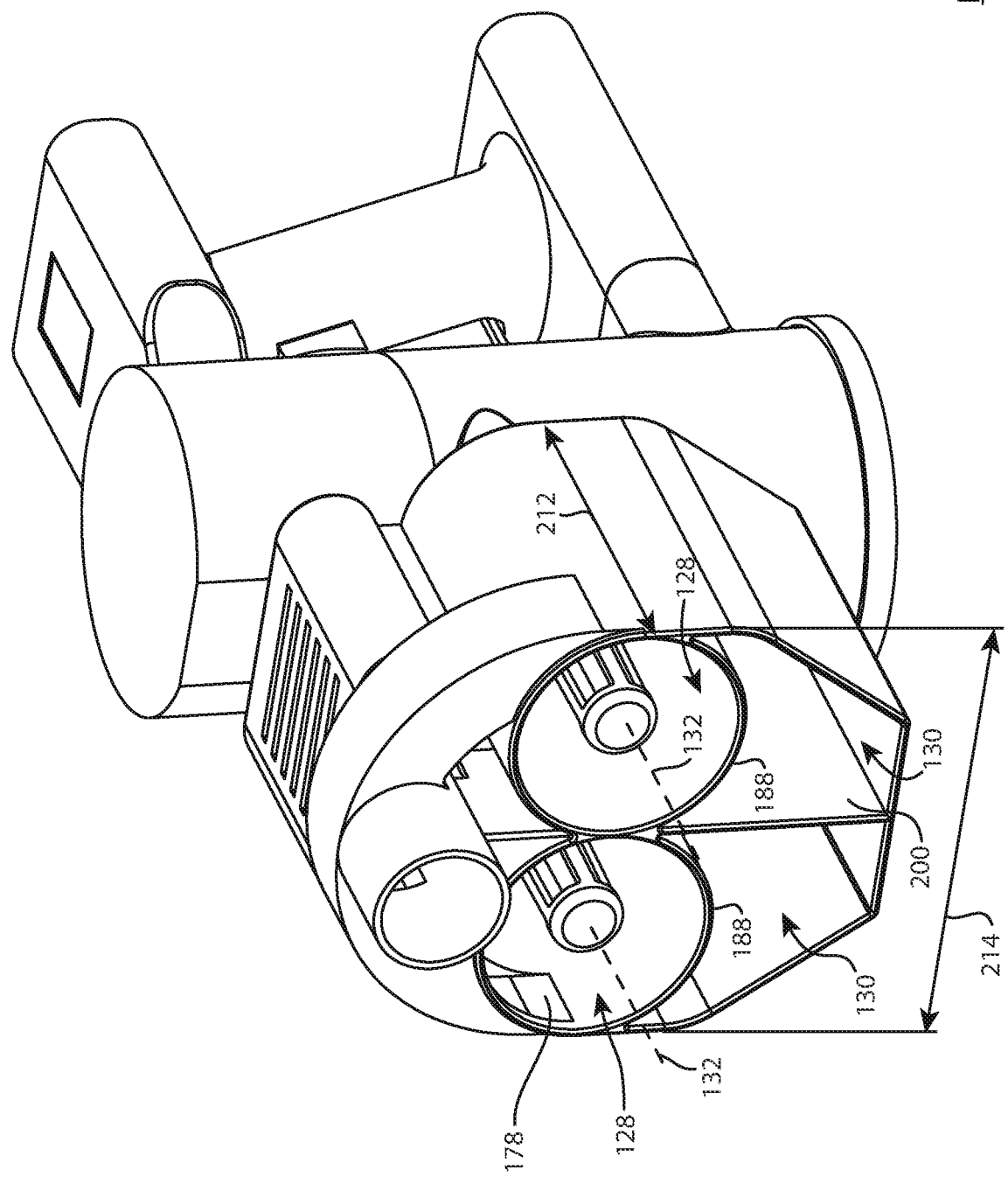
FIG. 20 is a front perspective view of the surface cleaning apparatus of FIG. 15 with a portion of the air treatment member removed.

Referring also to FIG. 20, in this embodiment each cyclone chamber 128 includes its own dirt outlet 182 that is in communication with a respective dirt collection chamber 130. In this embodiment, separate dirt collection chambers 130 are provided for each cyclone chamber 128, and they are separated from each other by a dividing wall 200 that physically and fluidly isolates the dirt collection chambers 130 from each other. This may help maintain the desired air flow paths through the air treatment member 112, and may prevent cross-flow between the separate air flow path travelling through each of the cyclone chambers 128.

Figure 23:
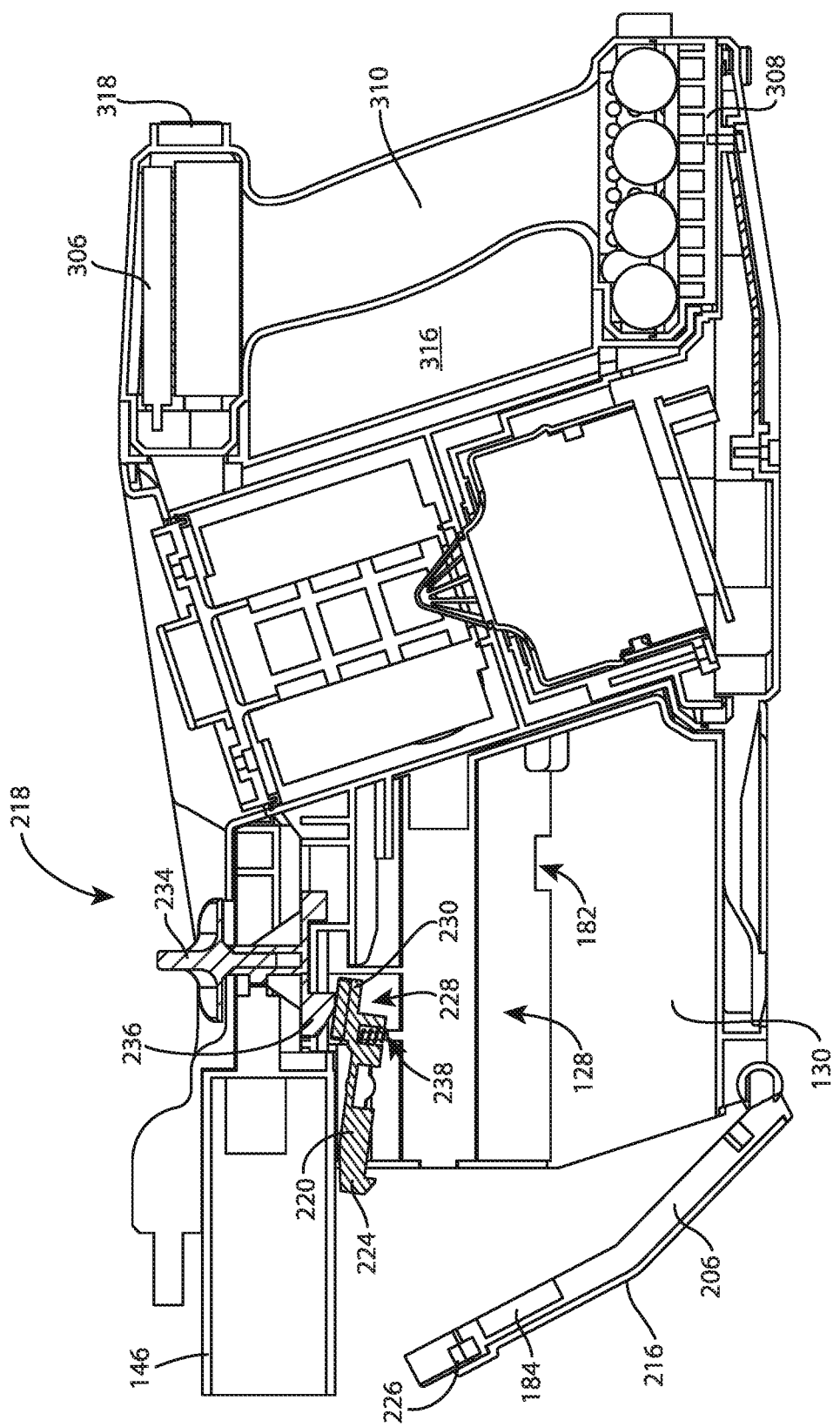
FIG. 23 is a side cross-sectional view of the surface cleaning apparatus of FIG. 22, with a portion of the air treatment member open.
Figure 24:
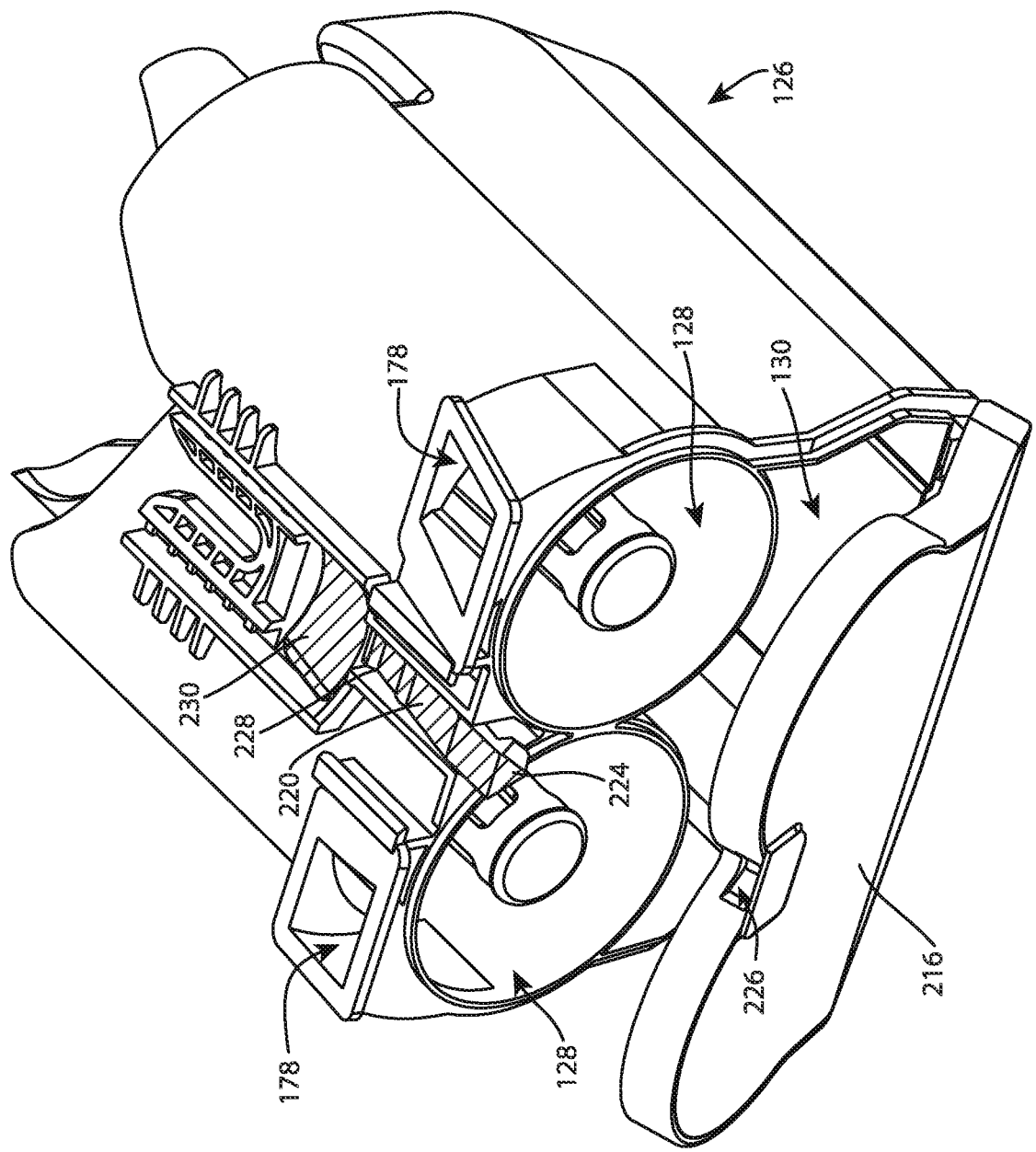
FIG. 24 is a top front perspective view of a portion of the surface cleaning apparatus of FIG. 22, with a portion of the air treatment member open.

Alternatively, the air treatment member 112 may be configured such that the dirt outlets 182 from both of the cyclone chambers 128 are in communication with a single, shared dirt collection chamber 130. One embodiment having two cyclone chambers 128 in communication with a single dirt collection chamber is illustrated in FIGS. 22-24 and the embodiment in FIGS. 35 and 36, where the cyclone unit 126 does not include the internal dividing wall 200.

Figure 37:
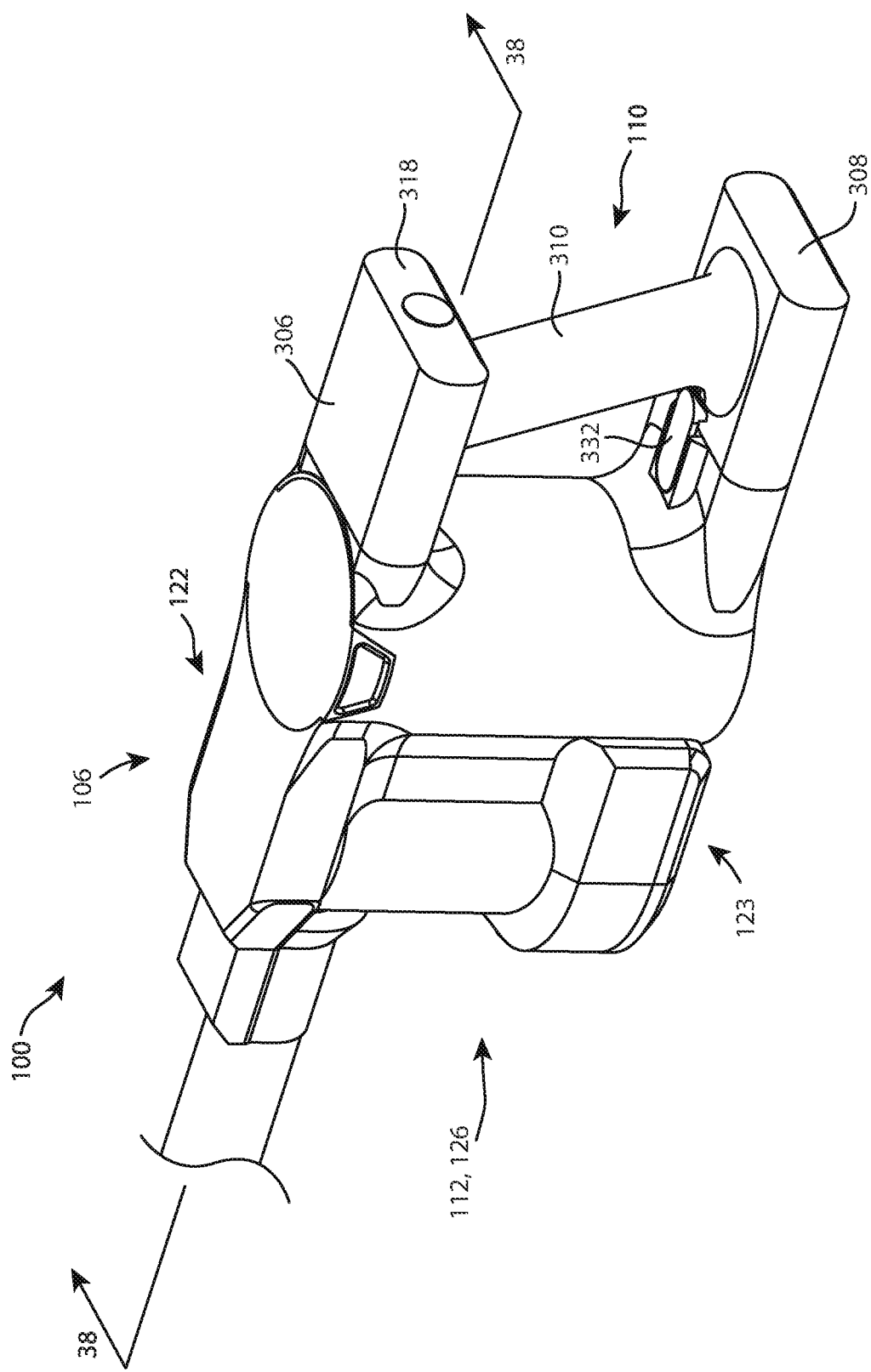
FIG. 37 is a perspective view of another embodiment of a surface cleaning apparatus.

Optionally, instead of being configured as a uniflow cyclone, one embodiment of a hand vacuum illustrated in FIGS. 37 and 38 includes a cyclone unit 126 in which the cyclone chamber 128 is oriented generally vertically (i.e. the cyclone axis 132 is closer to a vertical axis than a horizontal axis when the bottom is resting on a horizontal surface, so that the upper end 122 is positioned above the lower end 123) and is configured so that the cyclone air inlet 178 is provided toward an upper end of the cyclone chamber 128 and the cyclone air outlet 180 is provided in the upper end wall 186.

Instead of being directly adjacent the pre-motor filter housing 134 and facing the pre-motor filter media 136, in this embodiment the cyclone air outlet 180 is fluidly connected to the pre-motor filter housing 134 by an internal conduit 202 that extends generally rearwardly.

Referring to FIG. 38, in this embodiment the cyclone dirt outlet 182 is positioned toward the lower end of the cyclone chamber 128, and the dirt collection chamber 130 is positioned below the cyclone chamber 128 to receive dirt exiting via the dirt outlet 182.

Referring to FIG. 39, another embodiment of a hand vacuum 100 includes a cyclone chamber 128 that is analogous to the cyclone chamber of FIGS. 37 and 38, but is arranged in a generally inverted configuration in which the cyclone air inlet 178 and cyclone air outlet 180 are both located toward the lower end of the cyclone chamber 128. In this embodiment, the inlet conduit 146 is provided on the sidewall 188 of the cyclone chamber 128, and is located toward the middle of the hand vacuum in the up/down direction instead of being located toward the upper end 122 of the hand vacuum 100 in the embodiments of FIGS. 1-8 and others. In this embodiment, the inlet conduit axis 148 may be proximate, and optionally may be substantially coaxial with a longitudinal central axis 204 of the hand vacuum 100, about which the hand vacuum 100 may be rotated while in use.

In this embodiment, the cyclone dirt outlet 182 is provided toward the top of the cyclone chamber 128, and toward the front 118 of the hand vacuum 100. Dirt exiting via the dirt outlet 182 can fall downwardly in the space between the cyclone chamber sidewall 188 and the cyclone unit sidewall 204 and is collected in the dirt collection chamber 130 that is underneath the cyclone chamber 128.

Like in the embodiment of FIGS. 37 and 38, in this embodiment the cyclone air outlet 180 is spaced apart from the pre-motor filter housing, and is fluidly connected to the pre-motor filter housing 134 via a generally rearwardly extending, internal air flow passage 202.

It is understood that any of the cyclone units 126 described herein may be generally interchangeable with each other and may be used combination with any of the motor, filter, housing, detachable assembly and handle embodiments described herein to form various embodiments of the hand vacuum cleaner.

Structure of a Screen for a Cyclone Chamber

The following is a description of the screen for a cyclone chamber that may be used by itself in any surface cleaning apparatus or in any combination or sub-combination with any other feature or features described herein. For example, the dirt collection chamber may be used in association with any of the cyclone units, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

In accordance with this aspect, the screen is recessed inwardly to provide a larger annual gap between the screen and the inner wall of the cyclone chamber. This additional annular width may reduce the intermixing of air swirling in the cyclone chamber and treated air that is exiting or about to exit the cyclone chamber. Alternately, or in addition, the end of the screen holder distal to the air outlet end of the cyclone assembly may be solid (non-porous). The non-porous end may extend inwardly towards the air outlet end of the cyclone assembly further than the cyclone inlet. Accordingly, air entering the cyclone chamber may not pass directly through the screen and exit the cyclone chamber. Alternately or in addition, the end of the screen holder proximal to the air outlet end of the cyclone assembly may be solid (non-porous). In particular, if the dirt outlet of the cyclone chamber is distal to the air inlet end, then the portion of the screen holder that extends inwardly from the air outlet end of the cyclone assembly inwardly towards the cyclone inlet end may be non-porous and may extend inwardly towards the inlet end of the cyclone further than the dirt outlet. An advantage of this design is that air will not be exiting the cyclone chamber at a location at which dirt is exiting the cyclone chamber and reintrainment of dirt may be reduced.

Figure 46:
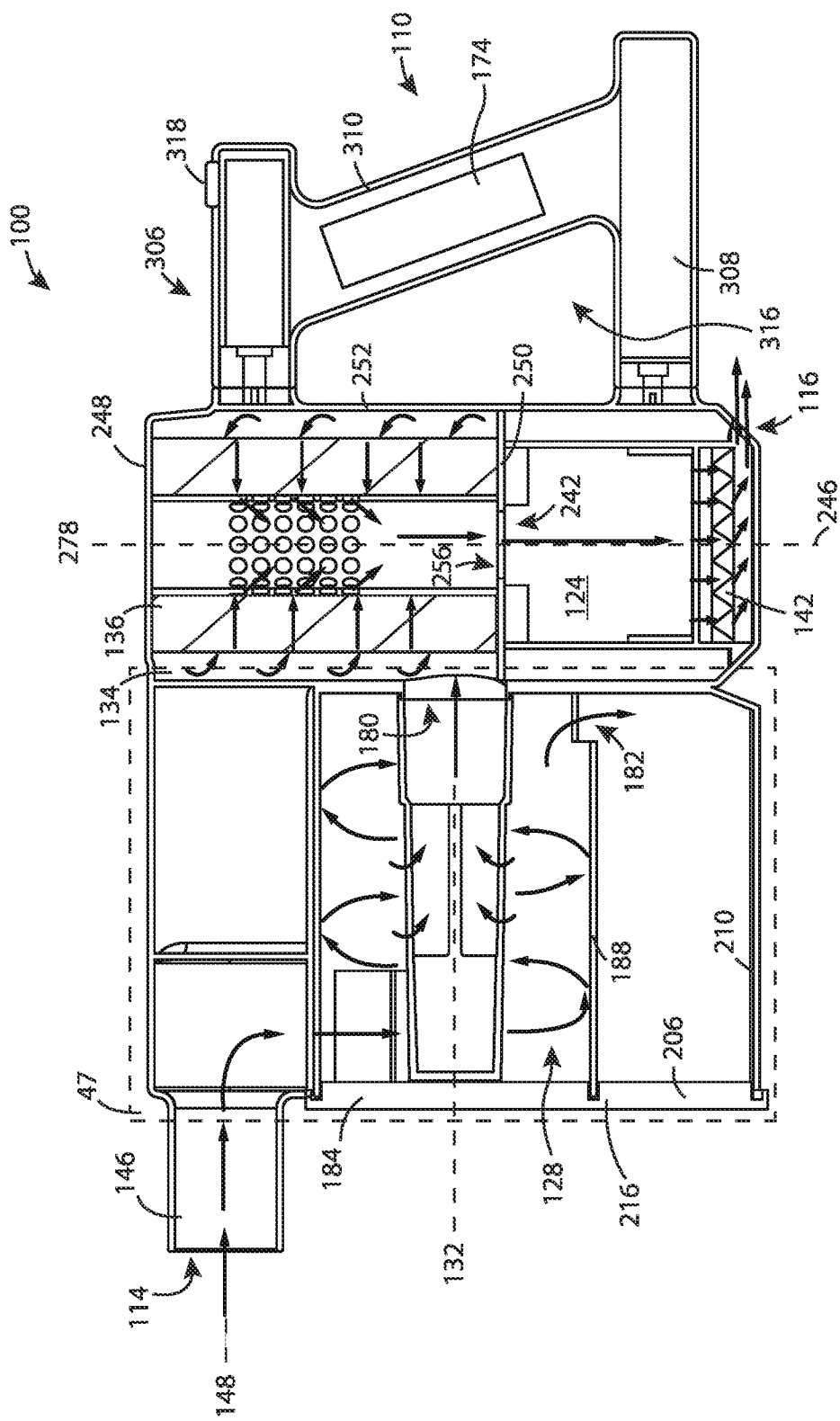
FIG. 46 is a side cross-sectional view of another embodiment of a surface cleaning apparatus.
Figure 47:
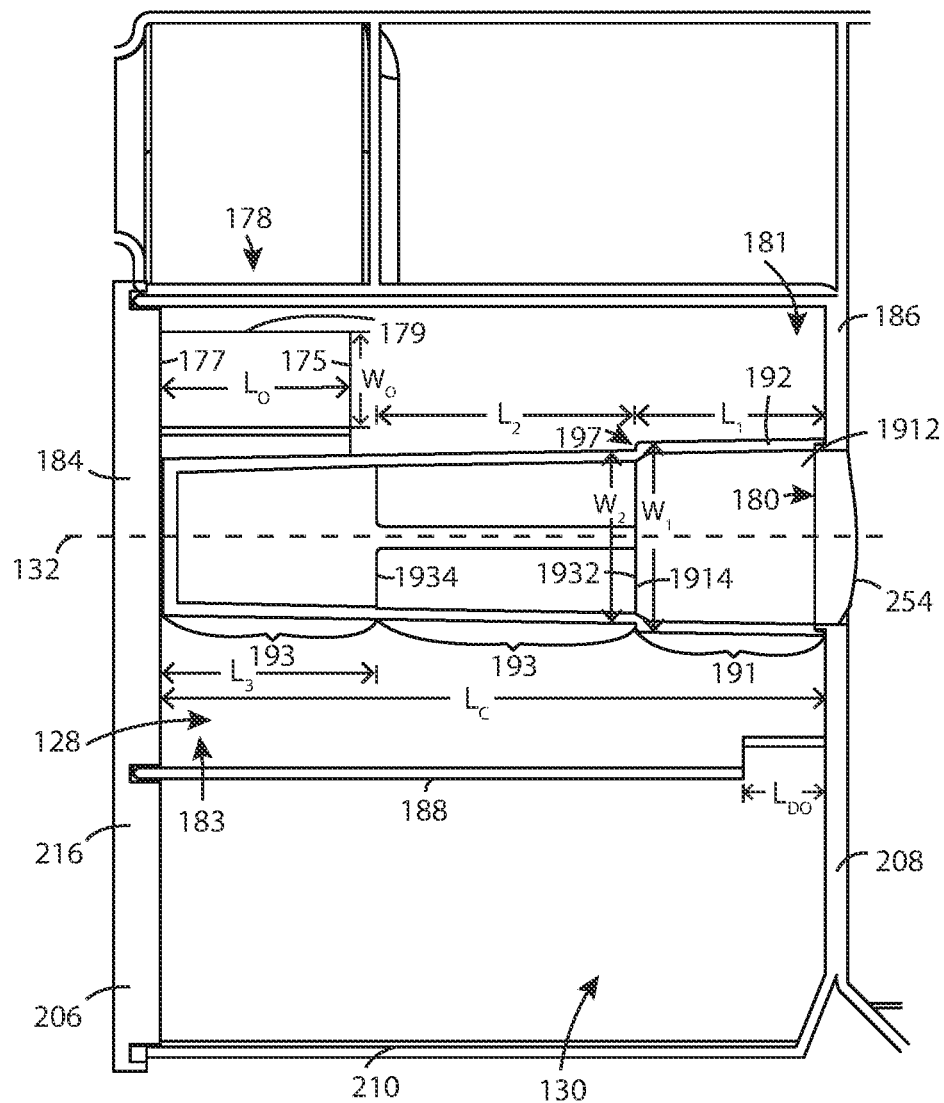
FIG. 47 is an enlarged view of the box 47 of FIG. 46.

Referring to FIGS. 46 and 47, in this embodiment a cyclone chamber 128 includes a screen assembly that extends in a longitudinal direction generally parallel to the cyclone axis 132. The screen assembly includes an outlet section 191, a porous section 193, and a distal section 195.

Outlet section 191, which in the illustrated example comprises vortex finder conduit 192, extends inwardly (i.e. towards a longitudinal midpoint of the cyclone chamber) from the end wall 186 in which the cyclone air outlet 180 of the cyclone assembly is positioned. The end of the cyclone chamber 128 in which air outlet 180 is provided may be referred to as the outlet end 181 of the cyclone chamber and the outlet end of the cyclone assembly. In the illustrated example, outlet section 191 is aligned with and overlies the cyclone air outlet 180 and extends longitudinally an axial or longitudinal length $L_1$ between an outlet end 1912 of the outlet section 191 to an inlet end 1914 of the outlet section 191. The distance $L_1$ may alternatively be referred to as an outlet section length. In the illustrated example, outlet section 191 is non-porous.

Porous section 193 extends longitudinally an axial or longitudinal length $L_2$ between an outlet end 1932 positioned adjacent the inlet end 1914 of the outlet section 191, to an inlet end 1934. The distance $L_2$ may alternatively be referred to as a porous section length. Porous section may be of any design which permits air to exit the cyclone chamber. Accordingly, the porous section may be a plastic section with a plurality of holes provided therein. Alternately, the outlet and distal sections may be connected together by one or more struts and a mesh screen 194 may be wrapped around the one or more struts. Alternately, a mesh screen 194 may extend between and connect the outlet and distal sections. Mesh screen may be sized to inhibit lint, hair and other such debris from entering the outlet section 191.

Distal section 195 extends longitudinally an axial or longitudinal length $L_3$ from the inlet end 1934 of the porous section 193. The distance $L_3$ may alternatively be referred to as a distal section length. In the illustrated example, distal section 195 is non-porous. The distal and outlet sections, and any strut or portion connecting them may be referred to as a screen holder to which screen 194 is mounted.

In the illustrated example in FIGS. 46 and 47, the screen assembly extends longitudinally from the rear end wall 186 to the front end wall 184. That is, the longitudinal length $L_1$ of the outlet section 191, plus the longitudinal length $L_2$ of the porous section 193, plus the longitudinal length $L_3$ of the distal section 195 is equal to the longitudinal length $L_C$ of the cyclone chamber 128. Longitudinal length $L_C$ may also be referred to as the axial length 212 of the cyclone chamber. Alternatively, the screen assembly may extend less than the longitudinal length $L_C$ of the cyclone chamber 128. For example, it may not extend to front wall 184.

In the illustrated example, an outlet port 179 of cyclone air inlet 178 has an axial or longitudinal length $L_O$ between a first outlet port side 177 and a second outlet port side 175 located longitudinally inwardly from the first outlet port side 177, and a transverse height or width $W_O$. The distance $L_O$ may alternatively be referred to as the cyclone outlet port length.

The cyclone outlet port length $L_O$ is preferably greater than the cyclone outlet port width $W_O$. For example, the cyclone outlet port length $L_O$ may be between 1 and 2 times greater, e.g. 1.5 times greater, than the cyclone outlet port width $W_O$.

In order to reduce backpressure through the cyclone chamber 128, it is preferred that the velocity of the airflow entering the cyclone chamber is approximately equal to the velocity of the airflow exiting the cyclone chamber. Thus, in an effort to achieve relatively equal airflow velocities (e.g., ±25%, ±20%, ±15%, ±10%, ±5%), the cross-sectional area of the outlet port 179 of cyclone air inlet 178 (i.e. $L_O \times W_O$) is preferably approximately equal to the cross-sectional area of the cyclone air outlet 180.

In general, it may be assumed that the airflow swirling in an annular band interior the cyclone chamber sidewall as it progresses along the axial length of the cyclone chamber maintains a degree of cohesion (i.e., the air generally has a cross sectional area in the direction of travel about the same as the cross sectional area of the outlet port 179), and that during each revolution within a cyclone chamber, an air stream moves in the longitudinal direction towards an end of the cyclone chamber by a distance approximately equal to the longitudinal length $L_O$ (also referred to as the axial height) of the cyclone chamber air inlet. For example, in a cyclone chamber that has a longitudinal length that is five times greater than the longitudinal length of its air inlet, the resulting cyclone may be expected to rotate about five times as it travels from the end of the cyclone chamber that has the air inlet to the opposite end of the cyclone chamber. The cyclone outlet port length $L_O$ and the longitudinal length $L_C$ of the cyclone chamber 128 are preferably selected such that air entering the cyclone chamber via outlet port 179 of cyclone air inlet 178 is expected to rotate approximately 3 to 6 times, 3 to 5 times, 2 to 4 times or three-and-a-half times in the cyclone chamber prior to reaching the outlet end 181.

It may also be assumed that this degree of cohesion may persist substantially or completely as the air stream reaches the end of the cyclone chamber opposite the end of the cyclone chamber that has the air inlet. Thus, in order to inhibit air from flowing into porous section 193 prior to substantially or completely rotating about the cyclone chamber at the outlet end 181, outlet section 191 is preferably configured to inhibit air from flowing into the inlet end 1914 of the outlet section 191 via porous section 193 prior to substantially or completely rotating about the cyclone chamber at the outlet end 181. For example, the outlet section length $L_1$ may be at least as long as the cyclone outlet port length $L_O$. By providing such a configuration, e.g. in which the inlet end 1914 of the outlet section 191 is spaced from the end wall 186 by a longitudinal distance equal or greater to a width of an expected air stream, airflow efficiency through the cyclone chamber may be improved, and/or backpressure through the cyclone chamber may be reduced.

Also, in the illustrated example, dirt outlet 182 has an axial or longitudinal length $L_{DO}$. Longitudinal length $L_{DO}$ may also be referred to as the axial height 196 of the cyclone dirt outlet 182.

In order to inhibit turbulent flow of air in the cyclone chamber at the location of the dirt outlet 182 (e.g., by air exiting through the porous section 193), the outlet section length $L_1$ may be greater than the longitudinal length $L_{DO}$ of the dirt outlet 182. Accordingly, swirling motion of the air may be maintained adjacent the outlet end of the cyclone assembly.

As noted above, in the example illustrated in FIGS. 46 and 47 the screen assembly extends longitudinally from the rear end wall 186 to the front end wall 184. Thus, the outlet port 179 of cyclone air inlet 178 and the distal section 195 of the screen assembly are each positioned at the same end of the cyclone chamber, which may be referred to as the inlet end 183 of the cyclone chamber due to the presence of the cyclone air inlet 178.

Distal section 195 is preferably configured to inhibit air from flowing into the inlet end 1914 of the outlet section 191 via porous section 193 prior to substantially or completely rotating about the cyclone chamber to the outlet end 181. For example, the distal section length $L_3$ may be greater than the cyclone outlet port length $L_O$. Such a configuration may inhibit all or substantially all of an air stream entering the cyclone chamber having a width approximately equal to $W_O$ from being directed radially inwardly prior to rotating about the cyclone chamber. For example, as illustrated a radial projection (i.e. a projection in a direction transverse to the longitudinal/axial direction of the cyclone chamber 128) of the second outlet port side 175 may intersect the distal section 195.

Alternatively, the screen assembly may not extent to the front end wall 184. In such configurations, both the distal section 195 and the outlet port 179 of cyclone air inlet 178 may be longitudinally spaced from the outlet end 181 of the cyclone chamber, and the distal section 195 may be longitudinally closer to the outlet end 181 than the outlet port 179 is to the outlet end 181. Put another way, from the inlet end 183 of the cyclone chamber, the distal section 195 may extend further towards the outlet end 181 of the cyclone chamber than the outlet port 179 of cyclone air inlet 178. For example, the longitudinal distance $L_1$ plus the longitudinal distance $L_2$ may be less than a longitudinal distance from the second outlet port side 175 to the rear end wall 186 of the cyclone chamber 128.

An advantage of such configurations is that they may improve airflow efficiency and/or reduce backpressure through the cyclone chamber.

Also, in the example illustrated in FIGS. 46 and 47, a circumferential 'step-out' or shoulder 197 is provided at the juncture between the inlet end 1914 of the outlet section 191 and the outlet end 1932 of the porous section 193. That is, the width $W_1$ of the inlet end 1914 of the outlet section 191 is greater than the width $W_2$ of the outlet end 1932 of the porous section 193.

Providing a step-out at the juncture between the outlet section and the porous section of the screen assembly may have one or more advantages. For example, it may also be assumed that the degree of air flow cohesion may result in the air stream having a radial thickness that is approximately equal to the a transverse height or width $W_0$ of the outlet port 179 of cyclone air inlet 178 as it rotates in the cyclone chamber. For example, the radial gap surrounding the outlet section 191 may be about 0.100 to 1.000 inches, or 0.150 to 0.500 inches, or 0.200 to 0.400 inches. Providing a step-out may provide a greater radial gap between the radial thickness of the rotating airstream and the porous section 193 than the outlet section 191. Providing an increased radial gap along the porous section 193 may improve airflow efficiency and/or reduce backpressure through the cyclone chamber.

Positioning of the Dirt Collection Chamber

The following is a description of the positioning of the dirt collection chamber that may be used by itself in any surface cleaning apparatus or in any combination or sub-combination with any other feature or features described herein. For example, the dirt collection chamber may be used in association with any of the cyclone units, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Preferably, the dirt collection chamber in the cyclone unit can be configured so that it is positioned at least partially and optionally entirely below the cyclone chamber, toward the bottom side of the hand vacuum, and underlies at least a portion of the cyclone chamber. Vertically stacking the dirt collection chamber below the cyclone chamber in this manner may help reduce the overall size of the hand vacuum. Optionally, dirt collection chamber can be positioned so that it underlies substantially the entire cyclone chamber, and does not extend forwardly beyond the front side of the cyclone chamber or rearwardly of the rear side of the cyclone chamber. In this arrangement, the entire dirt collection chamber may be located beneath the cyclone chamber. This may help reduce the overall size of the cyclone unit and the hand vacuum. Alternatively, portions of the dirt collection chamber may extend forward and/or rearward of the cyclone chamber.

Referring to FIGS. 5 and 6, in the one embodiment the dirt collection chamber 130 includes a front end wall 206, a rear end wall 208 that is axially spaced from the front end wall 206 and a dirt collection chamber sidewall 210 extending therebetween. The walls 206, 208 and 210 (and optionally the walls of the cyclone chamber 128) may be made from any suitable material, including plastic. Optionally, at least a portion of the walls 206, 208 and 210 may be transparent to allow a user to see into the interior of the dirt chamber 130 without opening the chamber. Preferably, the walls 206, 208 and 210 may be formed entirely from transparent plastic.

In this embodiment, the dirt collection chamber 130 is located below the cyclone chamber 128 and has substantially the same axial length 212 as the cyclone chamber 128. In this configuration, the front end wall 206 of the dirt chamber is generally aligned with the front end wall 184 of the cyclone chamber 128, and the rear end wall 208 is generally aligned with the rear end wall 186 of the cyclone chamber 128. In the illustrated example, the dirt chamber 130 is substantially entirely beneath the cyclone chamber 128, and does not extend beyond the cyclone chamber 128 in the front/back or side/side direction (see also FIG. 2). That is, the length 212 of the dirt chamber 130 in the axial direction is substantially equal to the length 212 of the cyclone chamber 128, and the width of the dirt collection chamber 214 in a lateral direction (FIG. 2), that is orthogonal to the cyclone axis 132, is substantially equal to the lateral width of the cyclone chamber 128. Nesting the dirt collection chamber 130 entirely beneath the cyclone chamber 128 in this manner may help reduce the overall size of the cyclone unit 126 and/or hand vacuum 100 overall. Alternatively, the dirt collection chamber may be provided so that it extends beyond at least one of the length and width of the cyclone chamber, and optionally both.

Optionally, the front end walls 184 and 206 of the cyclone chamber 128 and dirt collection chamber 130 may be generally flat and arranged to be co-planar with each other, and the rear end walls 186 and 208 may have an analogous configuration. In this arrangement, a portion of the dirt collection chamber sidewall 210 is coincident with a portion of the cyclone chamber sidewall 188, as a lower portion of the cyclone chamber sidewall 188 also forms an upper portion of the dirt collection chamber sidewall 210 that serves to separate the cyclone chamber 128 from the dirt collection chamber 130.

Optionally, in some embodiments the dirt collection chamber 130 can be configured so that portions of the outer surface of the dirt collection chamber 130 can form part of a lower end 123 of the hand vacuum 100, upon which the hand vacuum rests if placed on a flat surface. In the illustrated example, downward facing portions of the dirt collection chamber sidewall 210 are positioned such that they will contact an underlying surface and form part of the bottom of the hand vacuum 100. Alternatively, the cyclone unit 126 can be configured so that its outer surfaces do not contact an underlying surface or form part of the vacuum base when the vacuum is rested on a surface, as shown for example in the embodiment of FIG. 15.

Figure 16:
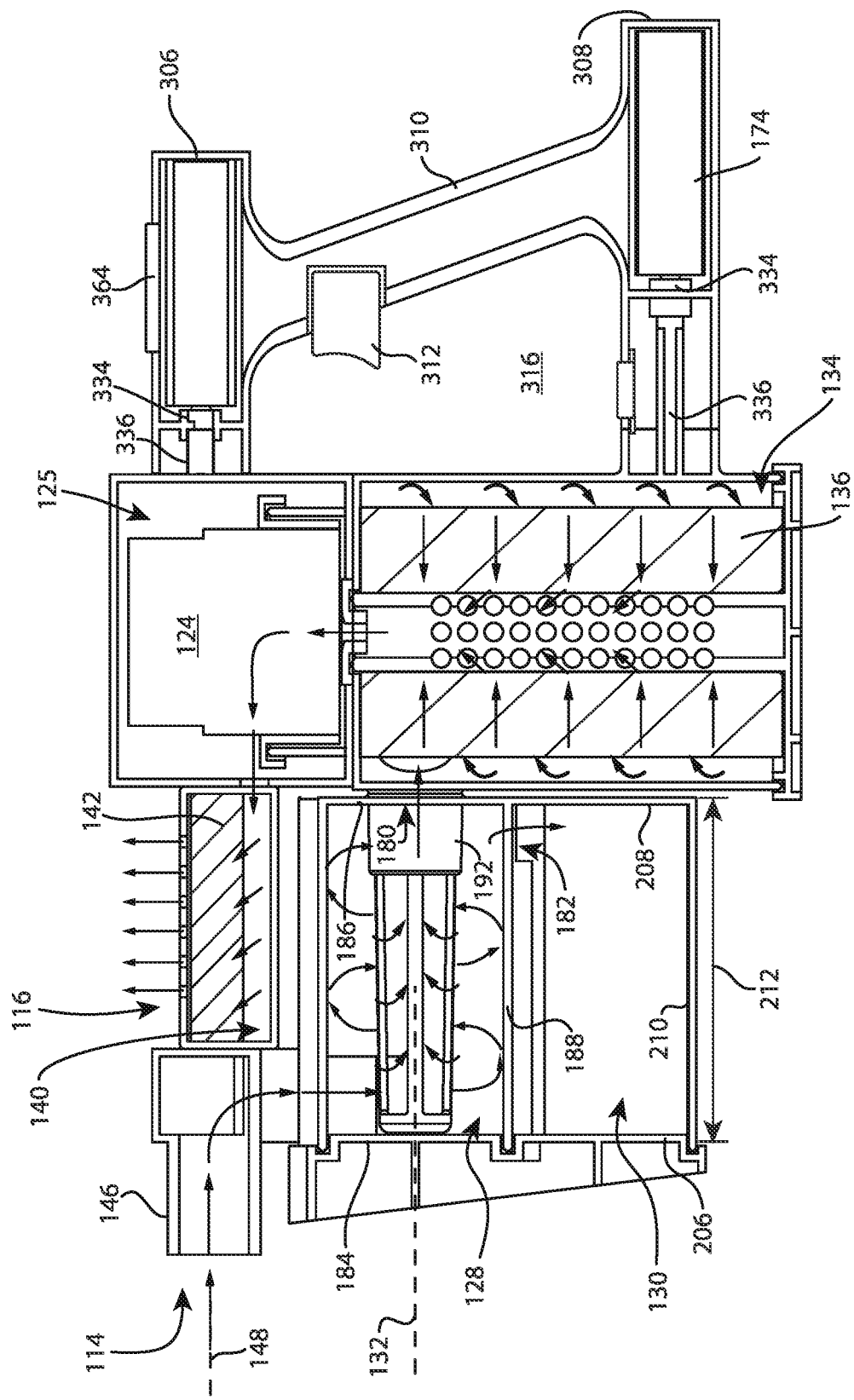
FIG. 16 is a side cross-sectional view of the surface cleaning apparatus of FIG. 15, taken along line 16-16.
Figure 17:
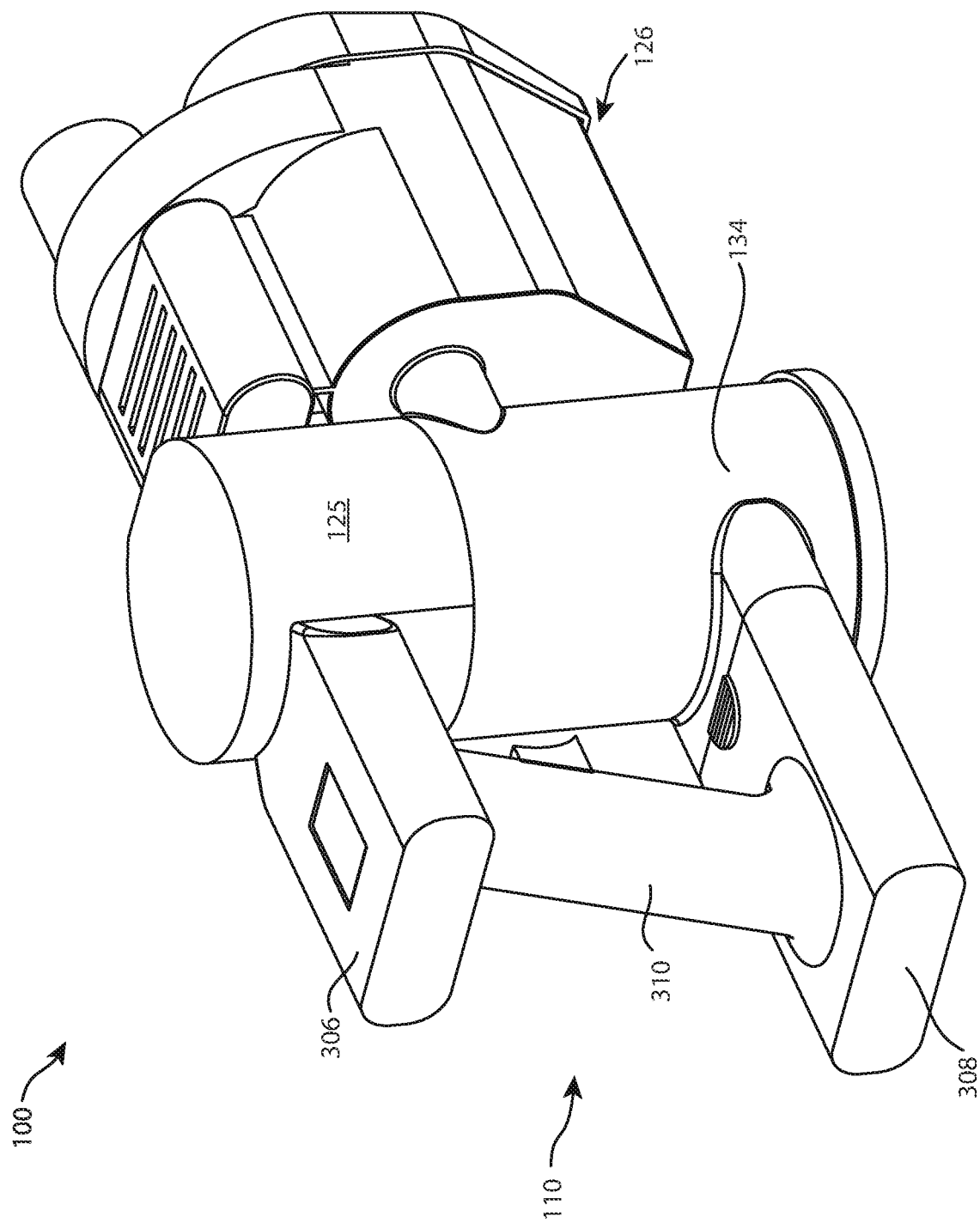
FIG. 17 is a rear perspective view of the surface cleaning apparatus of FIG. 15.
Figure 18:
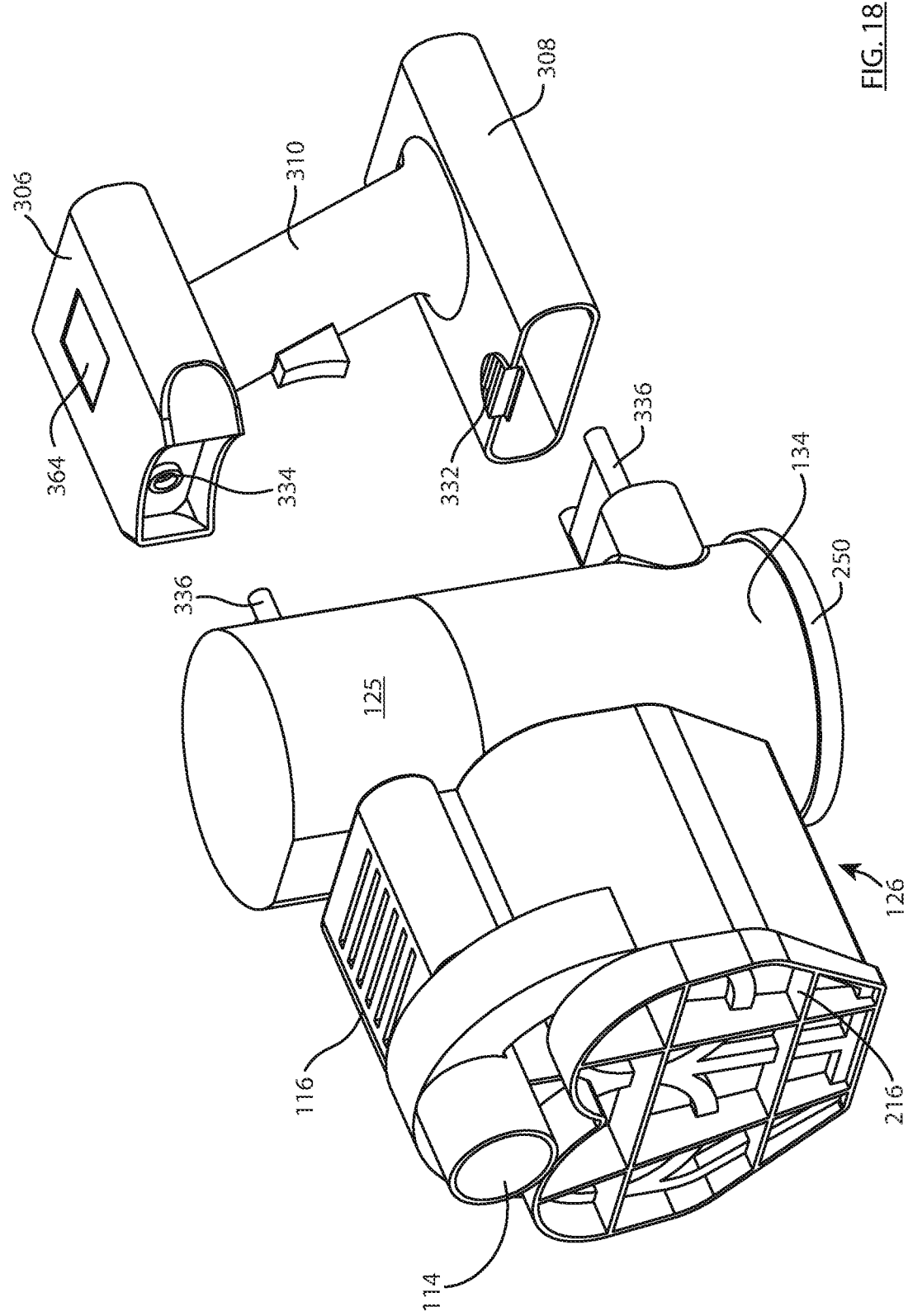
FIG. 18 is a front perspective view of the surface cleaning apparatus of FIG. 15 with the handle detached.
Figure 19:
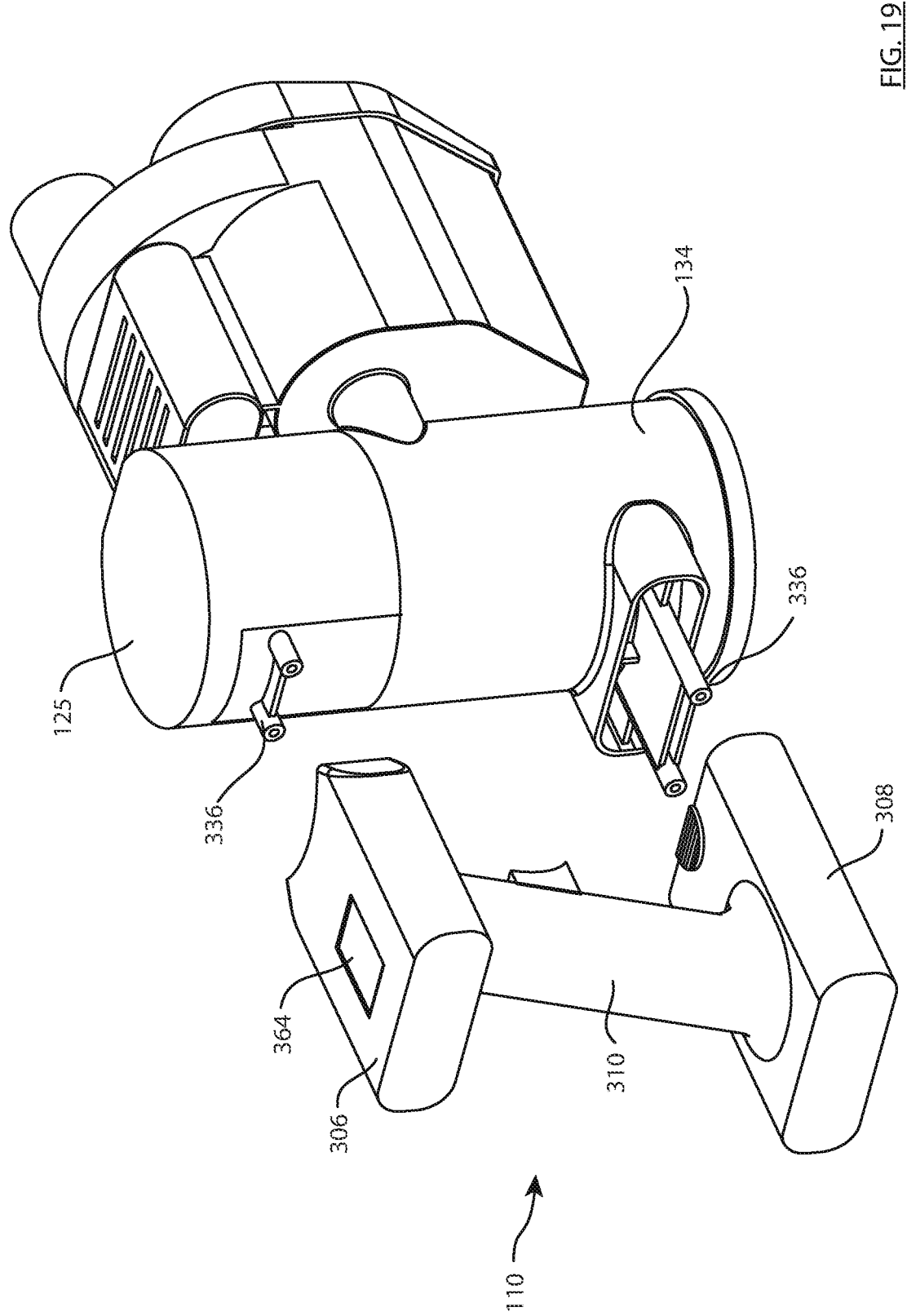
FIG. 19 is a rear perspective view of the surface cleaning apparatus of FIG. 15 with the handle detached.

Referring to dual cyclone the embodiment shown in FIGS. 16 and 21, the dirt collection chambers 130 in this embodiment are each configured to have substantially the same length 212 as their respective cyclones 128, and each dirt collection chamber 130 is positioned entirely beneath its respective cyclone 128. As shown in FIG. 21, in this embodiment the dirt collection chambers 130 taper toward the lower end 123 of the hand vacuum 100 such that the dirt collection chambers 130 are actually narrower than their respective cyclones 128 toward the lower their lower ends. Alternatively, the dirt collection chambers 130 could be configured to have a generally constant width from top to bottom.

The dirt chambers in the embodiments of FIGS. 9-14 and 25-36 have analogous configurations.

Referring to FIGS. 37 and 38, in this embodiment the dirt collection chamber 130 underlies the entire lower end of the cyclone chamber 128, and extends slightly forward of the cyclone chamber 128. In this arrangement, the end wall 184 of the cyclone chamber 128 and the end wall 208 of the dirt collection chamber 130 may be coincident with each other, and the sidewalls 188 and 210 do not overlap.

The dirt collection chamber 130 in the embodiment of FIG. 39 has a similar configuration. In contrast, in the embodiment shown in FIGS. 22-24, the front of the dirt collection chamber 130 is substantially flush with the front end walls 184 of the cyclone chambers, but portions of the dirt collection chamber 130 extend rearward of the rearmost extent of the rear end wall 186. In this embodiment, the dirt collection chamber 130 and underlies not only the cyclone chamber, but a portion of the pre-motor filter housing 134 as well. Nesting the dirt collection chamber 130 in this manner may help provide a relatively larger dirt chamber capacity while helping to reduce the overall size of the hand vacuum.
Emptying of the Air Treatment Member The following is a description of emptying the air treatment member that may be used by itself in any surface cleaning apparatus or in any combination or sub-combination with any other feature or features described herein. For example, the mechanisms for emptying the air treatment member may be used with any of cyclone units, dirt collection chambers, cyclone chamber, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Preferably, at least a portion of the air treatment member can be openable for emptying. For example, at least one end, and optionally both ends of the dirt collection chamber 130 can be openable for emptying. Optionally, at least one end, and optionally both ends of the cyclone chamber 128 can also be openable for emptying.

Referring to FIGS. 5-6, in this embodiment, the front end wall 184 of the cyclone chamber 128 and the front end wall 206 of the dirt collection chamber 130 are both provided by portions of an openable front door 216 that covers the front end of the cyclone unit 126. In this arrangement, opening the front door 216 will concurrently open the front end walls 184 and 206 of the cyclone and dirt collection chambers 128, 130. In the illustrated example, the front door 216 can be opened while the cyclone unit 126 is connected to the main body 106 (see for example, FIG. 23). In this arrangement, a user may hold the hand vacuum 100 via the handle 110 with one hand and open the front door 216 with the other hand. The front end wall 184 of the cyclone chamber 128 and the front end wall 206 of the dirt collection chamber 130 may be concurrently openable and may cover all of a substantial portion of the front end of the cyclone chamber and the dirt collection chamber. For example, the front end wall 184 of the cyclone chamber 128 and the front end wall 206 of the dirt collection chamber 130 may be a one piece assembly or they may be integrally formed.

The front door 216 can be openably connected (e.g., pivotally openable or removably mounted) to the rest of the cyclone unit 126 using any suitable mechanism, including a hinge or other suitable device. Optionally, the front door 216 can be secured in the closed position using any suitable type of locking mechanism, including a latch mechanism that can be released by a user. In the embodiment of FIGS. 1-8, the front door 216 can be opened by detaching it from the cyclone and dirt chamber sidewalls 188 and 210, and is secured in the closed position by a friction fit when connected as illustrated in FIG. 5.

In this embodiment, the rear end walls 186 and 208 of the cyclone chamber 128 and dirt collection chamber 130 are not openable. However, in other embodiments one or both of the rear end walls may be openable, and optionally they may be openable concurrently in an analogous manner to the front end walls. Optionally, the front and rear walls may be openable at the same time (not necessarily concurrently). Having openable front and rear walls may help facilitate emptying and/or cleaning of the cyclone unit 126.

Optionally, the cyclone unit 126 can include an assembly door lock or other suitable locking mechanism, for securing the openable door 216 in its closed position. When the lock is in a locked position the door 216 can be held in its closed position and when the lock is in an unlocked position the door can be opened for emptying. Preferably, the assembly door lock can include at least one release actuator so that a user can unlock the assembly door lock.

The actuator for opening/releasing the openable portion of the cyclone unit 126 can be provided on the cyclone unit 126 itself, on the main body 106 or on any other portion of the hand vacuum 100 (such as the handle 110).

Optionally, instead of providing an openable front wall, the cyclone unit may be configured so that another portion is openable. For example, in the embodiments of FIGS. 37-38 and 39, the openable portion of the dirt collection chamber 130 is the bottom end wall 206. This wall can be opened in a manner that is analogous to opening the front door 216 in the other embodiments. Preferably, as in the embodiment of FIGS. 37-38, the lower end wall 184 of the cyclone chamber 128 is connected to and movable with the bottom wall 206, so that opening the bottom wall 206 opens both the dirt collection chamber 130 and the cyclone chamber 128 for emptying. Alternatively, the lower end wall 184 of the cyclone chamber 128 need not be openable, as in the embodiment of FIG. 39, such that opening the bottom wall 206 opens only the dirt collection chamber 130. The openable bottom wall 206 may be secured in its closed position using any suitable locking mechanism, including the mechanism described herein. For example, a latch 220 could be vertically oriented and provided on the front portion of sidewall of the cyclone unit 126. The openable bottom wall 206 may be secured in its closed position using any suitable locking mechanism, including the mechanism described herein.

Dual Mode Operable Door Lock

The following is a description of different features of a dual mode operable door lock that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

A surface cleaning apparatus may have a removable assembly which includes a dirt collection area (e.g., a dirt collection chamber that may be internal of a cyclone chamber or external thereto). For example, an air treatment member may be removable by itself or with other components as described herein. The assembly that is removable may have an openable door that is secured in a closed position by a lock. When the lock is released, the door may be opened. An assembly actuator may be provided on the assembly. When actuated by a user (e.g., by pressing a button or sliding an actuator) the lock may be released. The assembly actuator may be concealed when the assembly is mounted to the rest of the surface cleaning apparatus (e.g., a main body of a surface cleaning apparatus). When the assembly is mounted to, e.g., a main body, a main body actuator may be used to open the lock. Accordingly, the main body actuator may be operatively connected to the lock, such as by being drivingly connected to the assembly actuator.

Accordingly, the assembly door lock may be configured so that portions of the assembly door lock provided on the cyclone unit 126 can be directly engaged by a user when the cyclone unit 126 (or any other air treatment member 112) is separated from the main body 106, but can also be engaged by an body-mounted actuator member when the cyclone unit 126 is attached to the main body 106. In such a configuration, the same assembly door lock mechanism can be actuated regardless of whether the cyclone unit 126 is attached to the main body 106 or separated from the main body 106, and the cyclone unit 126 can be openable in both configurations.

Referring to FIGS. 22-24, one example of an assembly door lock operable lock the front door in its locked position is shown. In this embodiment, the locking mechanism 218 includes lock portion in the form of a latch member 220 that is pivotally connected to a pivot mount on the upper side of the cyclone unit 126. The lower end of the door 216 is hingedly connected to the lower end of the cyclone unit 126 via hinge 222 (FIG. 22) so that the front door 216 can pivot open when the latch 220 is disengaged.

As shown in FIG. 22, the front end 224 of the latch member 220 is configured to engage a corresponding catch portion 226 on the upper end of the front door 216, and the rear end 228 of the latch member 220 includes an actuation portion in the form of an engagement portion 230 that is sized and configured to be pressed by a user. In this embodiment, the latch member 220 is located forward of the pivot mount and the engagement portion 230 is located rearward of the pivot mount. To unlock the assembly door lock, the user can press on the engagement portion 230 which can cause the latch member 220 to pivot relative to the cyclone unit sidewall, such that the front end 224 of the latch member 220 moves upward (disengaging from the catch 226—see FIG. 23) and the rear end 228 of the latch member 220 moves downward.

In this embodiment, the latch member 220 is provided on a portion of the upper side of the cyclone unit that is covered by the main body 106, and becomes generally inaccessible to the user, when the cyclonic unit 126 is attached to the main body 106. Preferably, sufficient clearance is provided between the main body and the cyclone unit so that the latch member 220 can move between the locked and unlocked positions while the cyclone unit 126 is attached, as well as when it is removed. This may help facilitate unlocking the front door 216 and opening the cyclone unit 126 for emptying regardless of whether the cyclone unit is attached or removed from the main body 106.

To operate the latch 220 in this embodiment, a release actuator can be provided on an accessible portion of the main body 106, and can be operable to unlock the front door 216. Optionally, the release actuator may be configured to directly engage and unlock the front door, or alternatively the release actuator may be configured to engage and act upon the latch member, which in turn can unlock the front door.

The release actuator may move in a different direction than the locking member (e.g., it could move is a different plane). For example, as exemplified in the illustrated embodiment, the hand vacuum includes a release actuator in the form of a slider 232 that is provided on the upper side of the main body 106 and can translate in the forward/backward direction. The slider 232 includes an actuation portion in the form of a tab portion 234 that can be grasped by a user, and driven end in the form of an internal abutment portion 236. A user can translate the tab portion 234 forwardly and rearwardly, which can cause a corresponding translation of the abutment portion 236. When the cyclone unit 126 is attached to the main body 106, the engagement portion 230 of the latch 220 is positioned generally proximate the abutment portion 236 of the slider 232. When the user translates the slider 232 forward, the abutment portion 236 is brought into contact with the engagement portion 230 and, due to its inclined caming surface, urges the engagement portion 230 downwardly to disengage the latch 220 (FIG. 23). With the latch 220 disengaged, the front door 216 can be freely opened.

Optionally, the latch member 220 can be biased toward is locked position using a spring 238, or other suitable biasing member. Similarly, the slider 232 can be biased toward its rearward, disengaged position. While shown as a horizontally sliding member in this embodiment, the release actuator may alternatively be configured as a vertically translatable linkage/button (i.e. vertically depressing the actuator button presses on the internal engagement portion to release the latch), a rotary dial or other suitable mechanism.

This locking mechanism 218, and release actuator 232, may be used in combination with any of the cyclone units 126 and hand vacuums 100 described herein.

Alternatively as discussed herein, the lower end wall 184 of the cyclone chamber 128 need not be openable, as in the embodiment of FIG. 39, such that opening the bottom wall 206 opens only the dirt collection chamber 130. In such an embodiment, the latch 220 may be provided on the rear side of the sidewall, such that it would be covered when the cyclone unit 126 is attached to the main body 106. In that case, the main body 106 may include a release actuator, such as a vertically oriented slider member. The latch 220 can include an engagement portion that is manually engageable by a user when the cyclone unit is detached, and that is engaged by the abutment portion of the vertical slider member when the cyclone unit is attached to the main body, like the embodiments of FIGS. 22-24.

Pre-Motor Filter Housing

The following is a description of different features of a pre-motor filter housing that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

In the embodiments described herein, the hand vacuum includes a pre-motor filter housing positioned in the air flow path between the cyclone chamber and the suction motor. In some configurations, the pre-motor filter housing may be fixedly connected to the suction motor housing, or other portions of the main body, such that the pre-motor filter housing is not detachable from the main body. Alternatively, in other examples the pre-motor filter housing may be detachable from the main body.

Referring to the embodiment of FIGS. 1-8, in the illustrated example the main body 106 includes both the suction motor housing 125 and the pre-motor filter housing 134, and is configured such that the pre-motor filter housing 134 is located below the suction motor housing 125. In this example, the suction motor 124 is generally vertically oriented, such that the suction motor axis of rotation 240 is generally vertical (e.g., ±20°, ±15°, ±10°, or ±5°) when the hand vacuum is resting on a horizontal surface with the upper end above the lower end (as illustrated in FIG. 5). In this arrangement, the suction motor axis 240 is generally orthogonal to the cyclone axis 132, and a projection of the motor axis 240 is positioned longitudinally between the cyclone unit 126 and the handle 110 (i.e. rearward of the cyclone chamber 128 and forward of the handle 110) and extends through the pre-motor filter housing 134 and through the grill 138 at the clear air outlet 116.

In this embodiment, when the hand vacuum 100 is upright (i.e. oriented so that is upper end is above its lower end as illustrated in FIG. 5) and the cyclone axis 132 extends generally horizontally, the motor axis 240 is substantially vertical (e.g., ±20°, ±15°, ±10°, or ±5°). Optionally, the suction motor 124 may be oriented so that when the hand vacuum 100 is upright and the cyclone axis 132 is horizontal that the suction motor axis 240 is within ±20°, ±15°, ±10°, or ±5° of vertical (see, for example the embodiment of FIG. 22).

Optionally, the hand vacuum 100 can be configured so that when the hand vacuum is upright, a lower end of the suction motor, which is the inlet end 242 in the embodiment of FIG. 5, is positioned below an upper portion of the cyclone chamber side wall 188

In the illustrated example, the pre-motor filter housing 134 is sized such that the pre-motor filter housing diameter 244 is generally the same as the motor housing diameter 246 (FIG. 3), and the pre-motor filter housing 134 is mostly, and optionally entirely, located beneath the motor housing 125 in a vertically stacked configuration.

Referring to FIG. 5, in the illustrated example the pre-motor filter housing 134 has upper and lower end walls 248 and 250, and a chamber sidewall 252 extending therebetween. The chamber 134 also has a housing inlet 254 (see also FIG. 6) that is connected downstream form the cyclone air outlet 180, and a housing air outlet 256 adjacent the motor inlet end 242. To travel from the housing air inlet 254 to the housing air outlet 256, the air will pass through the pre-motor filter 136 positioned within the chamber. In the illustrated example, the housing air inlet 254 is provided in a front portion of the chamber sidewall 252, and is located toward the upper end of the housing 134. The housing air outlet 256 is formed in the upper end wall 248. In this configuration, air entering the filter housing 134 travels in a generally rearwardly direction, and air exiting the filter housing 134 travels orthogonally, in a generally upward direction into the suction motor housing inlet end 242.

Optionally, the pre-motor filter housing 134 may be openable (optionally as described herein), and at least one of the end walls 248 or 250 and/or a portion of the sidewall 252 may be openable or otherwise re-configuration to provide access to the interior of the pre-motor filter housing 134.

In the illustrated example, the main body 106 is configured such that the suction motor 124 and pre-motor filter 136 are each located rearwardly of the cyclone chamber 128. For example, referring to FIG. 5, in this example the suction motor 124 and pre-motor filter 136 are both located rearward of a plane 258 that contains the rear end wall 186 of the cyclone chamber 128 and the cyclone air outlet 180. Alternatively, portions of the suction motor and/or pre-motor filter may extend forwardly of the plane 258, such that they vertically overlap the cyclone chamber 128.

Figure 12:
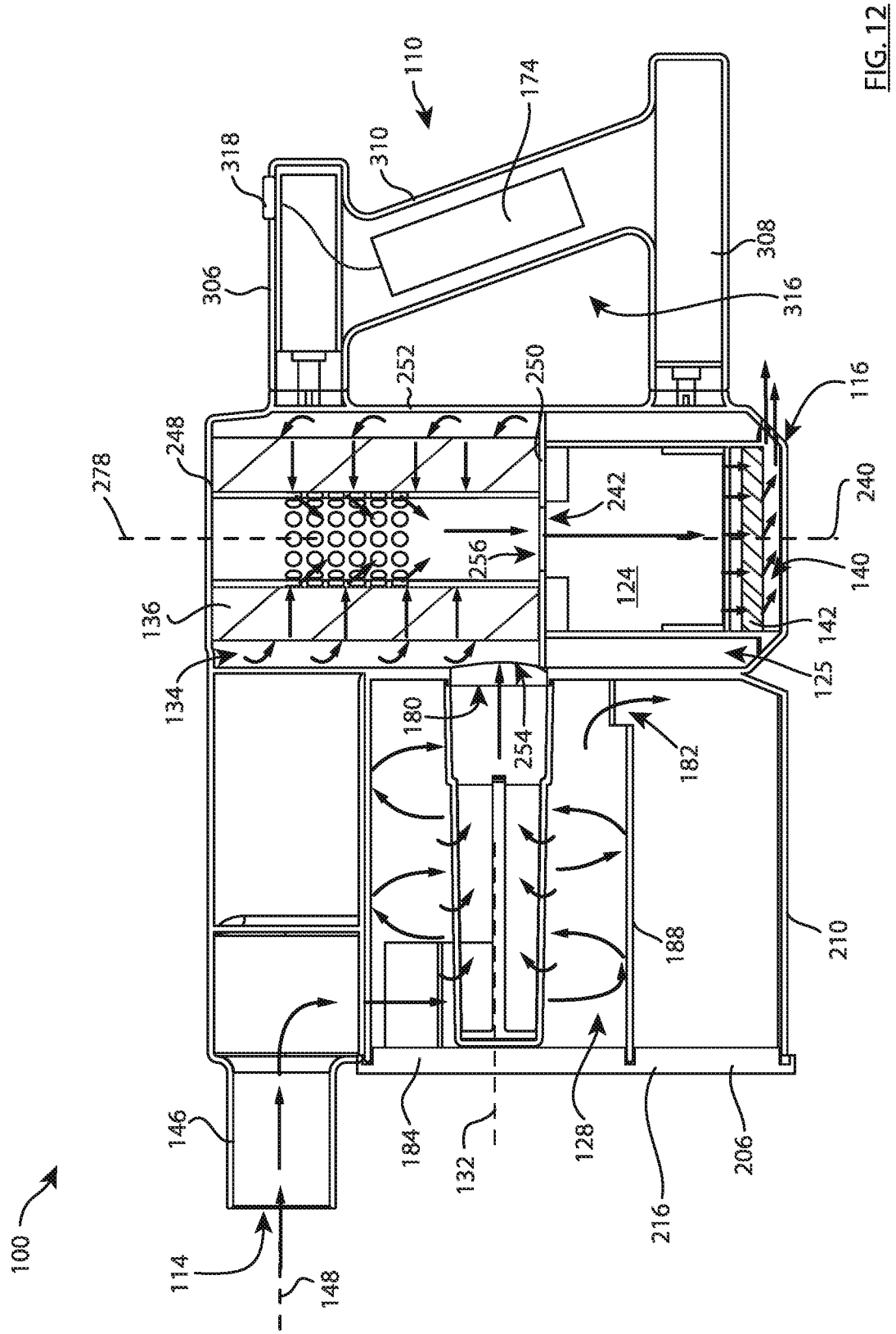
FIG. 12 is a side cross-sectional view of another embodiment of a surface cleaning apparatus.

Referring to FIGS. 12, 22 and 38, alternate embodiments of hand vacuum 100 may be configured so that the pre-motor filter housing 134 is positioned above the suction motor housing 125, so that the pre-motor filter 136 and suction motor 124 are vertically stacked in an opposite manner than the embodiment of FIGS. 1-11, and others. Stacking the components in this arrangement may alter the weight distribution of the hand vacuum.

Positioning the suction motor housing 125 toward the bottom of the main body 106 may also locate the clear air outlet 116 toward the bottom the body 106, instead of the upper end 122 as illustrated in FIGS. 1-11. This may help facilitate exhausting air from the hand vacuum 100 in a generally downward and/or rearward direction.

Positioning the pre-motor filter housing 134 toward the top 122 of the body 106 may help facilitate access to the pre-motor filter 136 while the hand vacuum is resting on its base. For example, if the hand vacuum 100 cleaner is rested upon a table or other such surface, an upper end wall 248 of the pre-motor filter housing 134 as illustrated in FIGS. 12, 22 and 38 is provided at the upper end of the housing and is accessible to a user. If the upper end wall 248 is configured to be openable, a user could then open the pre-motor filter housing 134, while the hand vacuum 100 rests on the table, to inspect or replace the pre-motor filter 136, without having to use one hand to grasp the handle 110 or otherwise support the hand vacuum.

Referring to FIGS. 25-31, an alternative embodiment of a hand vacuum 100 may include a generally flat, slab-like pre-motor filter 136, and a pre-motor filter housing 134 that has a different shape than the housings 134 in FIGS. 1-21. In this embodiment, the pre-motor filter housing 134 is positioned rearward of both the cyclone unit 126 and the suction motor housing 125, and forward of the handle 110. If the motor 124 is horizontal, as illustrated in FIG. 27, a projection of the motor axis 240 will intersect the pre-motor filter housing 134 and the filter 136. If the cyclone chamber 128 is horizontal, as illustrated, a projection of the cyclone axis 132 will intersect the pre-motor filter housing 134 and the filter 136, as well as the handle 110.

Figure 26:
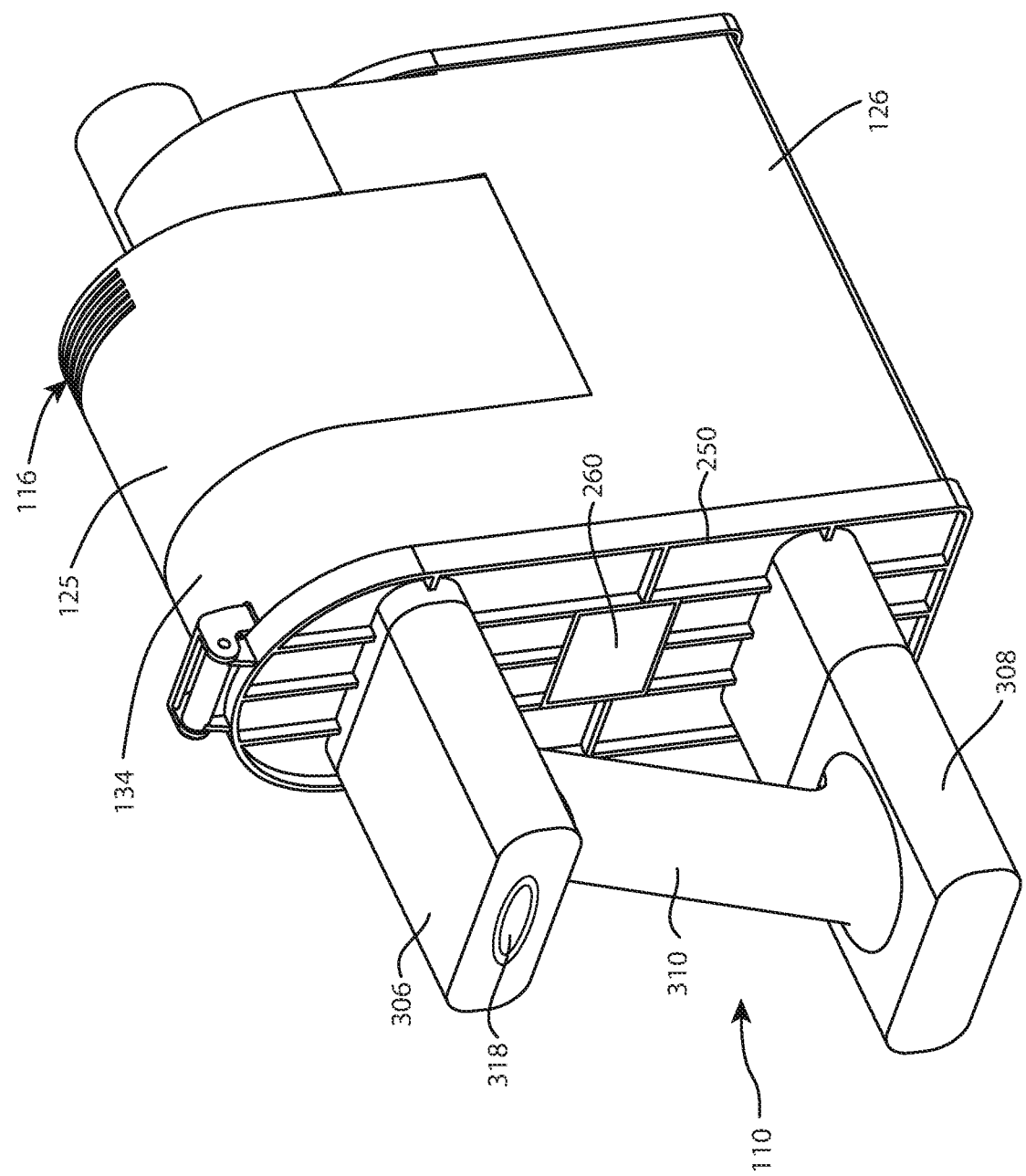
FIG. 26 is a rear perspective view of the surface cleaning apparatus of FIG. 25.

In this embodiment, the pre-motor filter housing includes a front end wall 248 that includes the housing inlet 254 and the housing outlet 256, a rear end wall 250 and a side wall 252 extending therebetween. Optionally, as illustrated in the embodiment of FIG. 26, the rear wall 250 may include at least one transparent portion 260 (or optionally be entirely transparent) so that a user may visually inspect the filter 136 without having to open the pre-motor filter housing 134.

Referring to FIG. 27, when the filter 136 is positioned within the pre-motor filter housing 134, a space between an upstream surface 262 of the filter 136, through which air enters the filter, and the opposing wall 250 of the housing 134 provides an upstream header 264 that is in air flow communication with the cyclone air outlet 180. A space between the downstream surface 266, through which air exits the filter, and the opposing end wall 248 provides a downstream header 268 that is in air flow communication with the suction motor 124. In the illustrated, the filter 136 includes a hole 270 (see also FIG. 28) that is configured to receive an air flow conduit 272. The air flow conduit 272 extends through the filter 136 and provides air flow communication between the cyclone air outlet 180 and the upstream header 264. In the illustrated example, the air flow conduit 272 is a rigid conduit section that is configured as an extension of the vortex finder conduit 192 and extends directly from the cyclone air outlet 180. The downstream header 268 is in airflow communication with the inlet of the suction motor housing 125, and the suction motor 124 therein. In this arrangement, air travelling through the filter 136 first travels rearwardly through the conduit 272 (without being exposed to the filter media itself), and then travels forwardly from the upstream surface 262 to the downstream surface 266, before then travelling forwardly into the suction motor 124.

In this embodiment, the filter 136 is positioned within the pre-motor filter housing 134 such that the downstream surface 266 is provided on a front side of the filter (i.e. the side facing the air treatment member 112) and the upstream surface 262 is provided on a rear side of the filter 136 (i.e. the side facing the handle 110) and is visible through the transparent portion 260.

Figure 36:
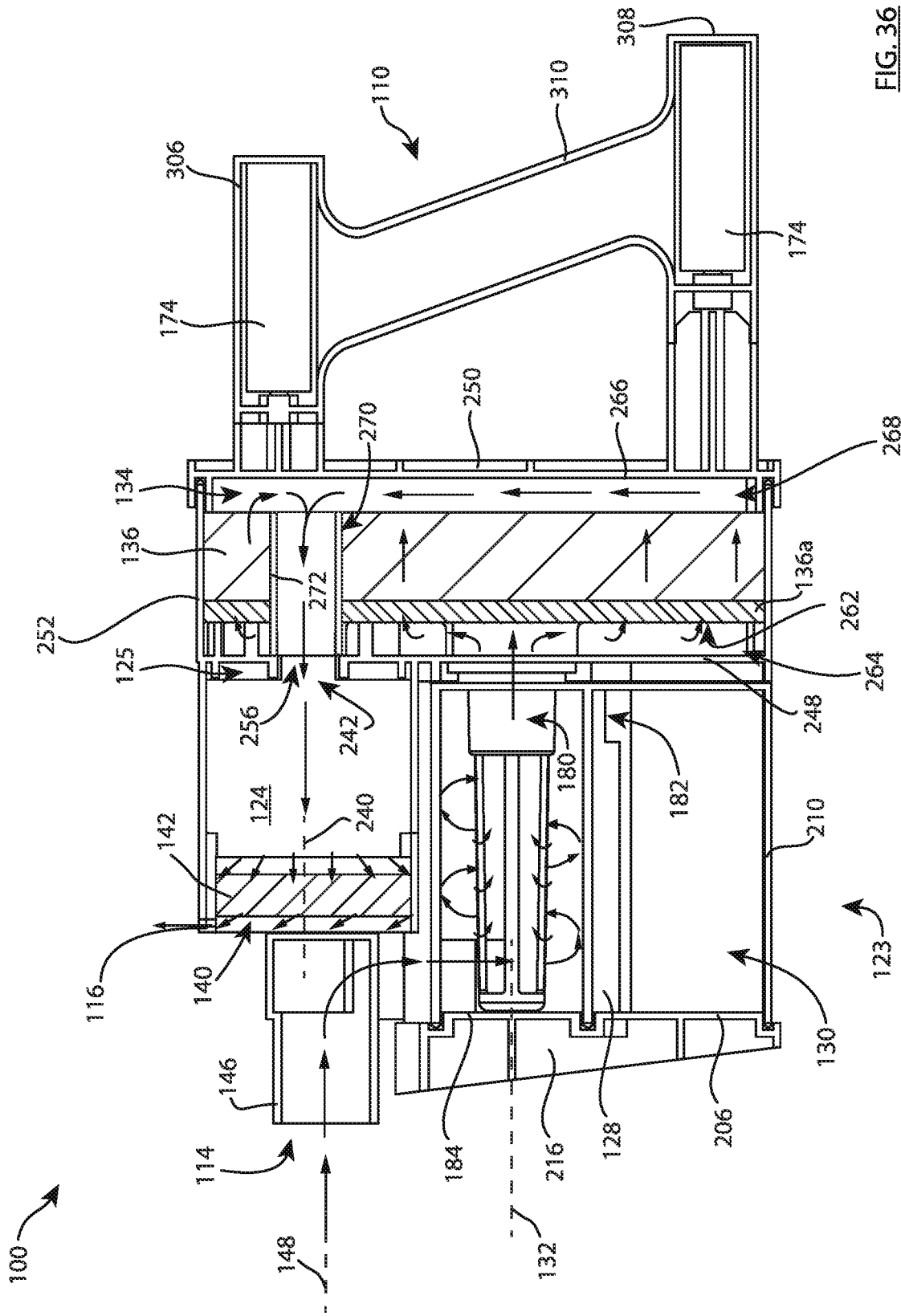
FIG. 36 is a cross-sectional view of the surface cleaning apparatus of FIG. 35, taken along line 36-36.

Referring to FIG. 36, in another embodiment the pre-motor filter housing 134 is configured so that air flows through the filter in a generally opposite direction than it flows through the filter shown in FIG. 27. That is, in this embodiment, the upstream side 262 of the filter 136 is the front surface of the filter 136, and the downstream side 266 is the rear surface of the filter 136. In this configuration, air exiting the cyclone unit 126 flows into an upstream header 264 that is positioned between the filter 136 and the cyclone unit 126 and motor. From the upstream header 264, air flows rearwardly through the filter 136 and reaches the downstream header 268. The downstream header 268 is fluidly connected to the suction motor 124 housing via a conduit section 272 that projects through a hole 270 in the filter. In this configuration, air can flow forwardly from the downstream header 268 to the suction motor 124 via the conduit 272, without being exposed to the filter media.

Optionally, some or all of the pre-motor filter housing walls can be transparent so that a user can visually inspect the outer, upstream side of the pre-motor filter without having to open the chamber. Alternatively, the chamber may be opaque and the filter may only be visible to a user when the chamber is opened.

Openable Pre-Motor Filter Housing

The following is a description of different features of an openable filter housing that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Optionally, the pre-motor filter housings can be openable to provide access to the filter. In some embodiments, the pre-motor housing may be opened by separating other components of the hand vacuum from the main body, such as by removing the cyclone unit 126 for emptying or removing the handle. Alternatively, or in addition to opening in this manner, the pre-motor filter housing may include one or more openable portions that can provide access to the interior of the pre-motor filter housing and the pre-motor filter therein.

Figure 7:
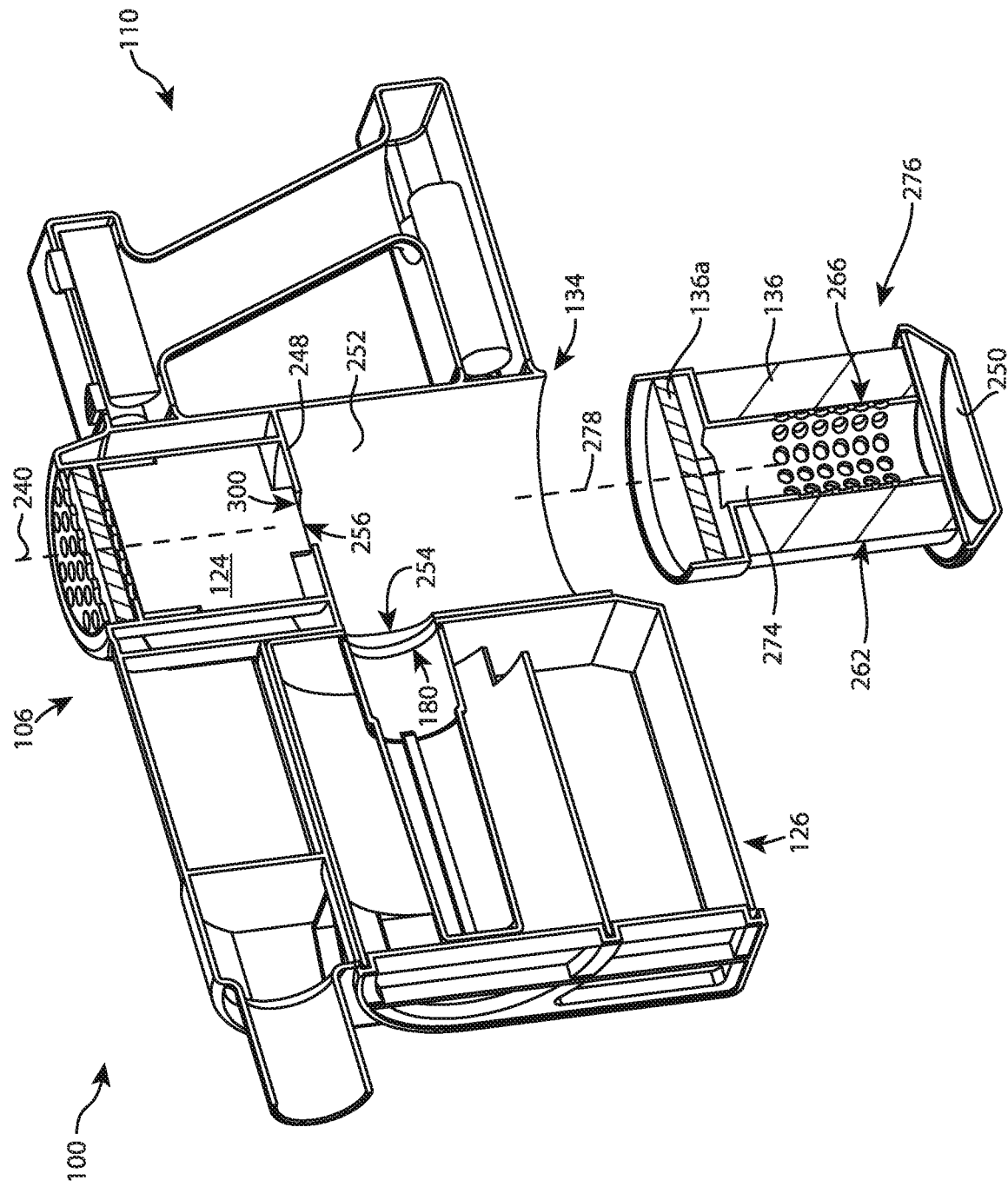
FIG. 7 is a perspective cross-sectional view of the surface cleaning apparatus of FIG. 1, with a different portion of the apparatus detached.

Referring to FIGS. 6 and 7, in one embodiment the pre-motor filter housing 134 includes an openable bottom wall 250 that can be detached from the sidewalls 252 of. Optionally, the bottom wall 250 may be removable while leaving the filter 136 in place, or may be configured so that the filter 136 is removed from the housing 134 when the bottom wall 250 is detached. In the illustrated example, the bottom wall 250 also functions as a base member of a filter carrier 276, which also includes an outlet conduit 274 (described in more detail herein), and supports the pre-motor filter 136. To access the pre-motor filter 136 in this configuration, a user can separate the filter carrier 276 from the filter housing 134 by extracting the carrier 276 in a generally axial direction (i.e. parallel to a filter axis 278—see also FIG. 5 and the embodiments of FIGS. 9-11, 13, 14, 15-11 and 39). Optionally, the foam filter 136 can be snugly received on the outlet conduit 274, so that the foam filter 136 can be removed with carrier 276 as a single unit and optionally without a user having to touch the dirty, upstream side 262 of the filter 136.

Figure 10:
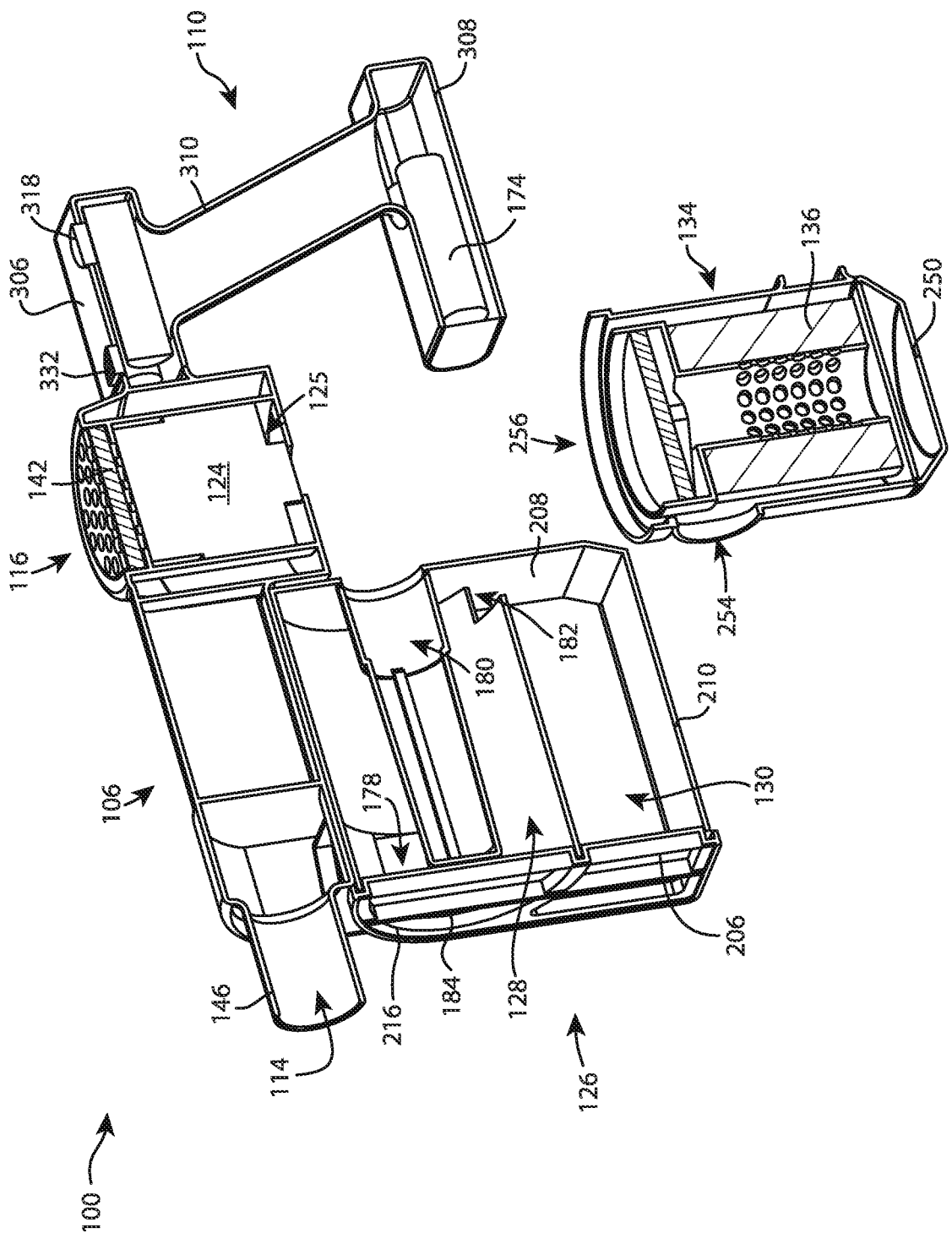
FIG. 10 is a perspective cross-sectional view of another embodiment of a surface cleaning apparatus, with a portion of the apparatus detached.

Alternatively, instead of separating the bottom wall 250 from the sidewalls 252, the pre-motor filter housing 134 may be configured so that substantially the entire housing 134 is detachable, as shown in the embodiment of FIG. 10. In this configuration, the housing side wall 252, including the housing air inlet 254, is removable from the rest of the main body. In this embodiment, the upper end of the pre-motor filter housing 134 is open when the housing 134 is detached, and the filter 136 may be extracted through the upper end. Optionally, the bottom wall 250 may also be detachable in this embodiment (as shown in FIG. 7), and may be detachable when the rest of the housing 134 is mounted to the main body 106 or when the side wall 252 of the housing 134 is detached as shown.

In the embodiment of FIG. 12, access to the interior of the pre-motor filter housing 134 can be provided by opening at least a portion of the upper wall 248 of the housing 134 (and optionally the entire upper wall) in a manner analogous to the bottom wall as shown in FIG. 7. The embodiment of FIGS. 22 and 38, are other examples of an embodiment in which the pre-motor filter housing 134 is located toward the upper end of the hand vacuum 100, and can be opened by detaching the upper wall 248 of the housing. In this embodiment, the conduit is connected to the upper wall and the filter is snugly received on the conduit, such that filter is removable from the interior of the pre-motor housing with the conduit and upper wall when the upper wall is detached.

Figure 28:
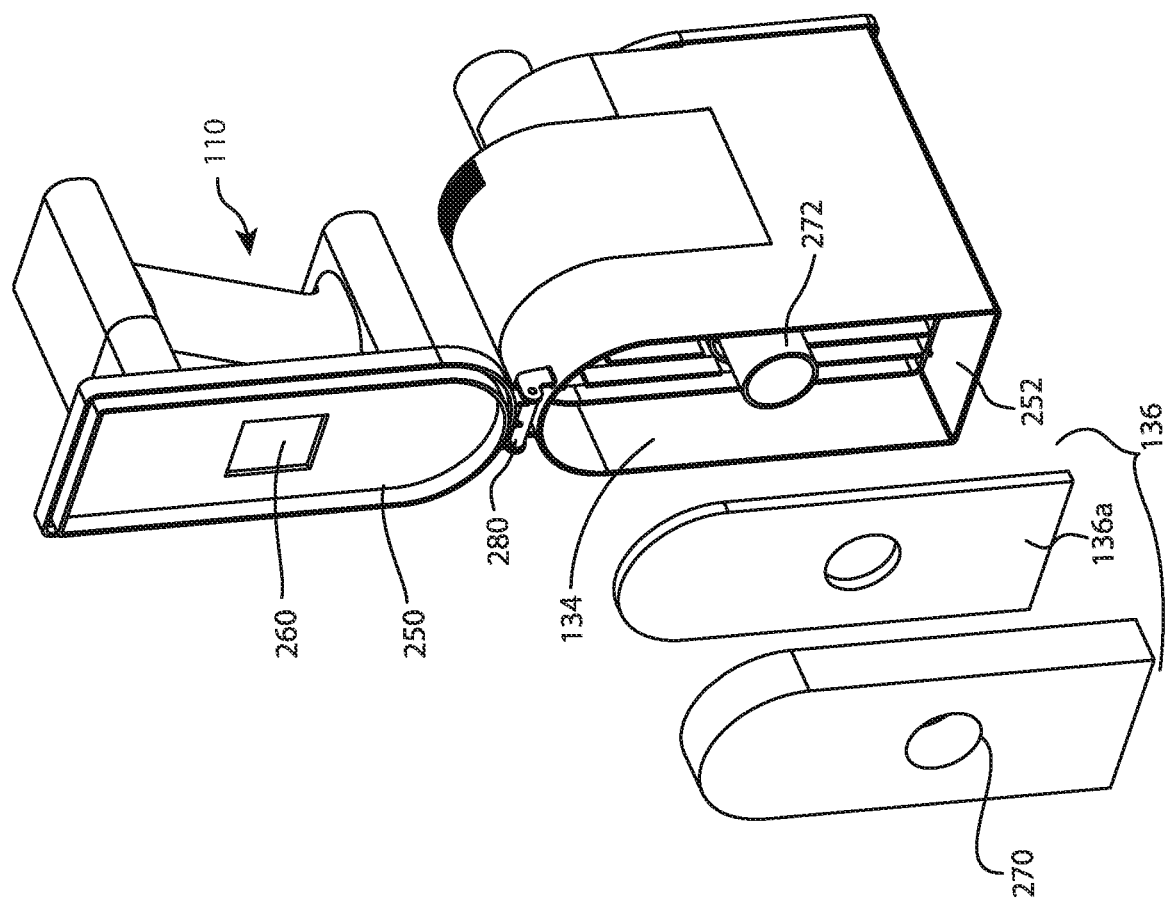
FIG. 28 is a rear perspective view of the surface cleaning apparatus of FIG. 25, with a pre-motor filter housing open.

FIGS. 27 and 28 illustrate an embodiment in which the rear wall 250 of the pre-motor filter housing 134 is openable to provide access to the interior and the filter 136. In this embodiment, the upper end of the rear wall 250 is connected to the sidewall 252 via a hinge 280, which allows the rear wall 250 to pivot relative to the sidewall 252. A latch or other suitable engagement mechanism can be provided toward the lower end of the rear wall 250 to hold the rear wall 250 in its closed position (FIG. 27). To access the filter 136, the rear wall 250 can be pivoted to an open position (FIG. 28). In the illustrated embodiment, the handle 110 is only connected to the rear wall 250, and therefore moves with the rear wall 250 when the pre-motor filter housing 134 is opened. Alternatively, the handle 110 may be mounted to other portions of the main body, such that the handle need not move when the pre-motor filter housing 134 is opened.

Figure 35:
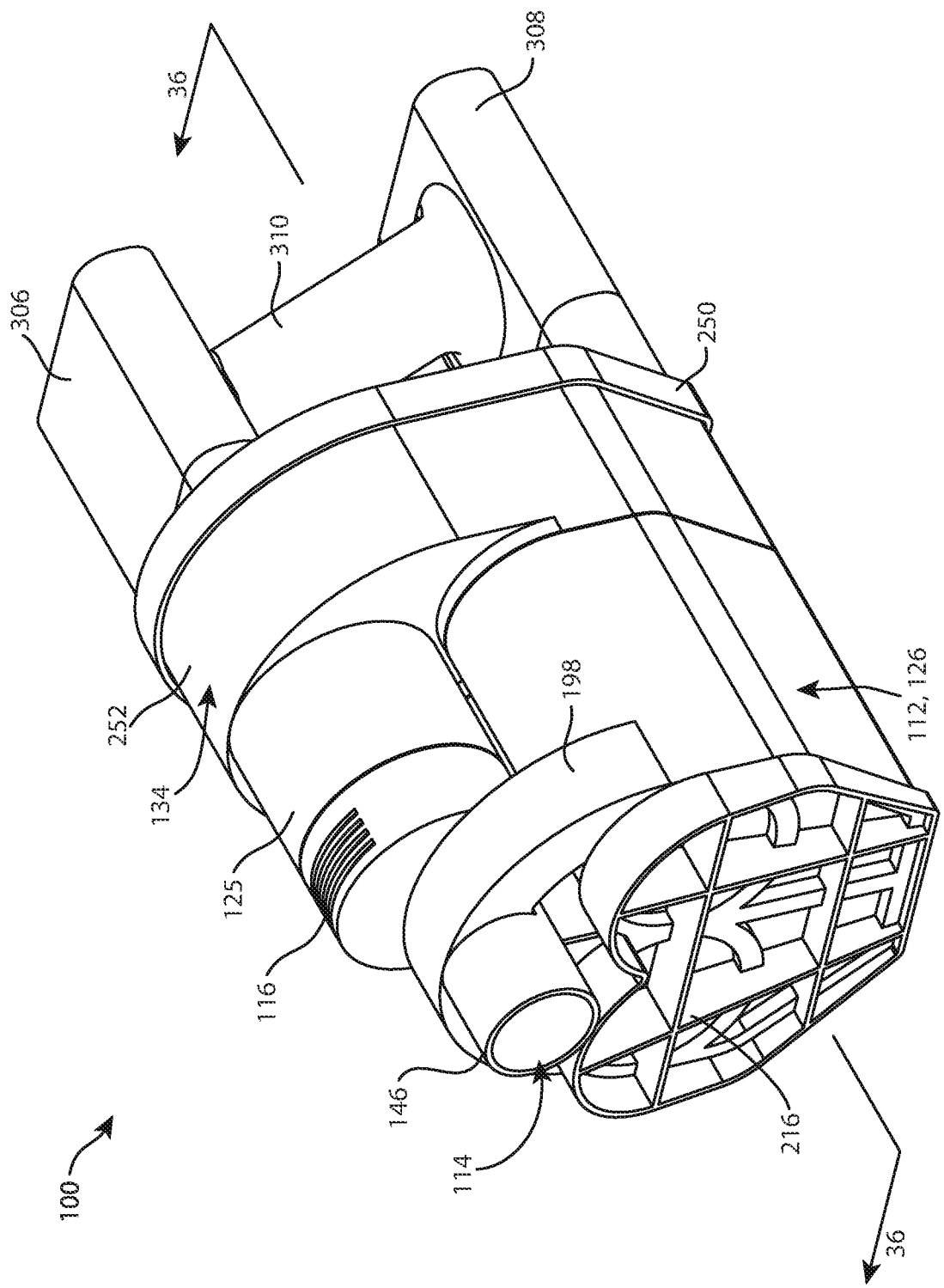
FIG. 35 is a front perspective view of another embodiment of a surface cleaning apparatus.

The embodiment of FIGS. 35 and 36 is configured in an analogous manner but the rear end wall 250 is secured to the side wall 252 via friction fit, rather than using a hinge.

Figure 32:
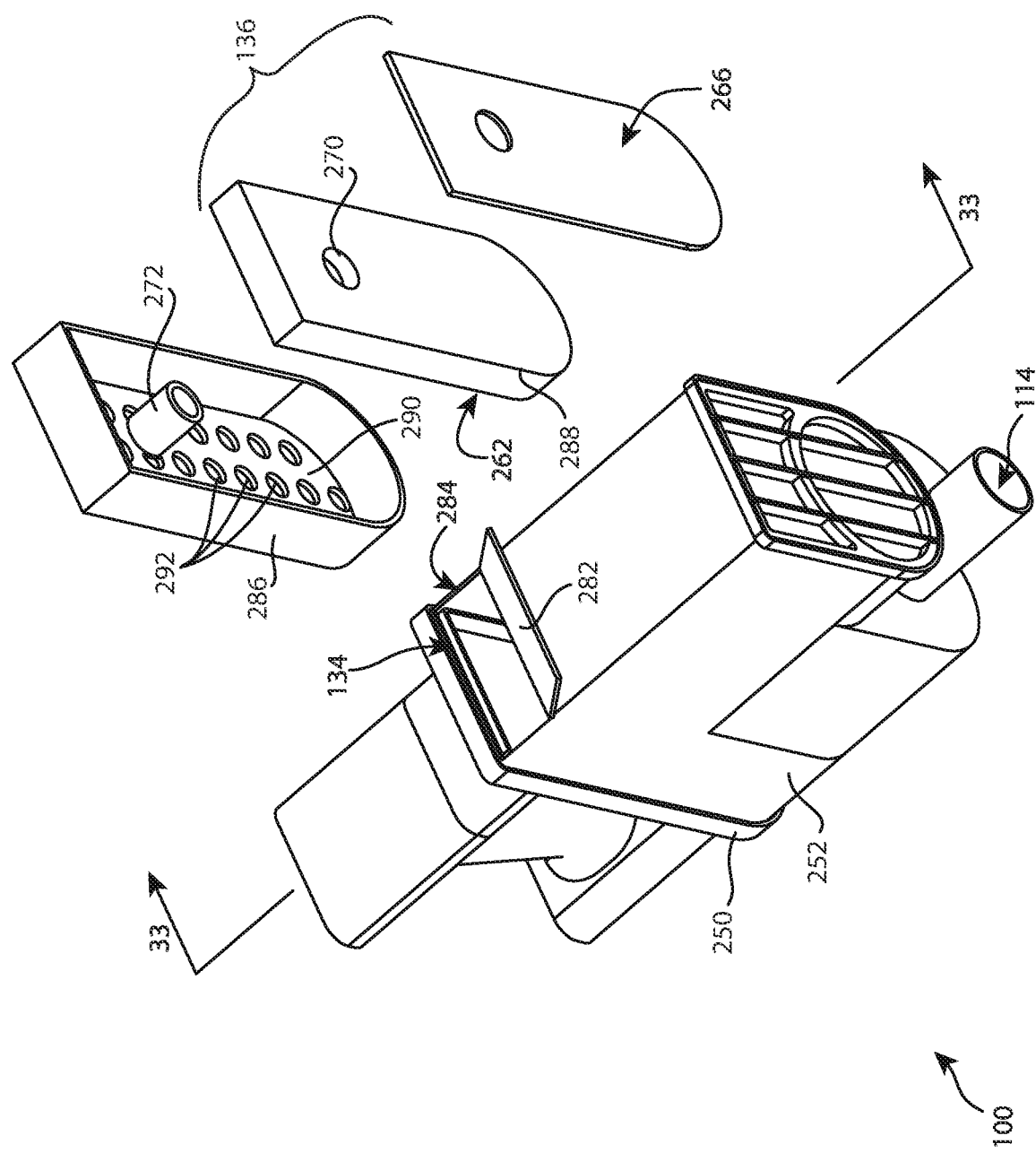
FIG. 32 is a bottom perspective view of another embodiment of a surface cleaning apparatus with a pre-motor filter chamber open and pre-motor filter removed.
Figure 33:
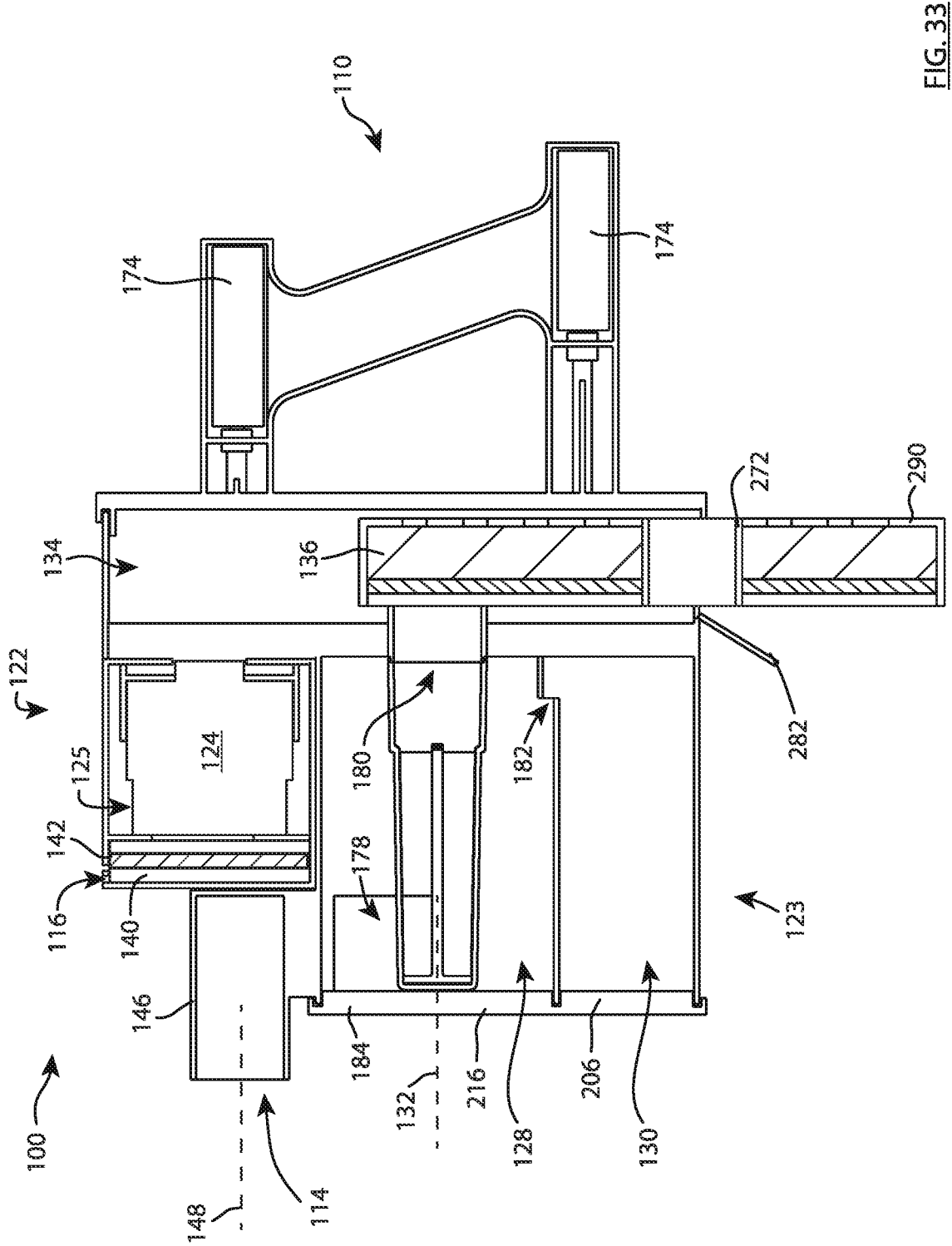
FIG. 33 is a cross-sectional view of the surface cleaning apparatus of FIG. 32, taken along line 33-33, with the pre-motor filter positioned partially within the pre-motor filter chamber.
Figure 34:
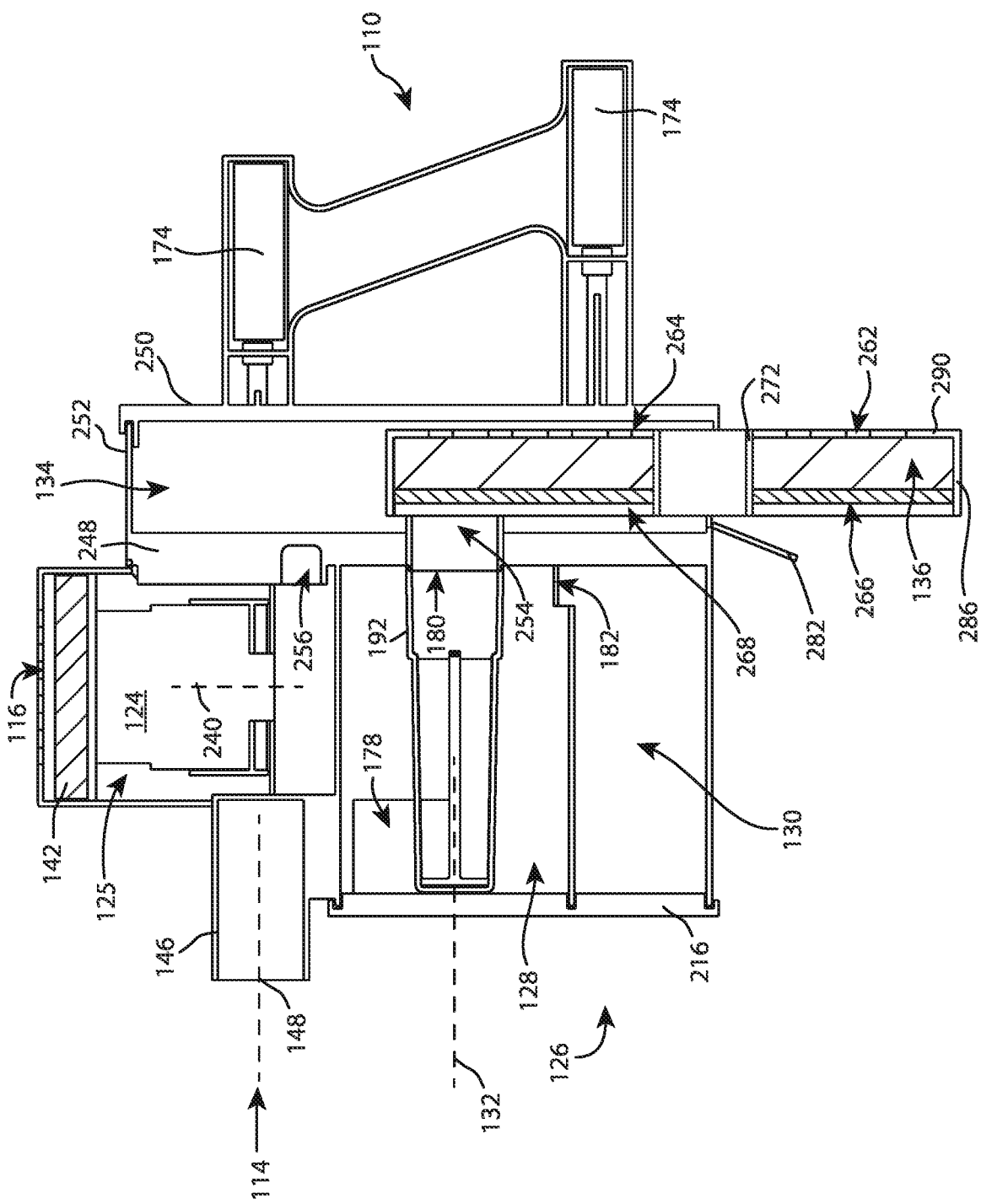
FIG. 34 is a cross-sectional view of another embodiment of a surface cleaning apparatus, with the pre-motor filter positioned partially within the pre-motor filter chamber.

In another embodiment, the handle may be mounted to the rear wall of the pre-motor filter housing but the rear wall need not be openable. Instead, another portion of the pre-motor filter housing may be openable. This may help strengthen the connection between the handle and the rest of the hand vacuum. Referring to FIGS. 32-34, another embodiment of a hand vacuum 100 is configured so that the bottom portion of the side wall 252 of the pre-motor filter housing 134 can be opened, without requiring movement of the rear wall 250. In this embodiment, the openable portion 282 of the housing 134 faces the side of the filter 136 (rather than either the upstream or downstream surfaces 262, 266), and the filter 136 can be removed by sliding the filter downwardly though the opening 284.

In some embodiments, a filter 136 made of foam, felt and/or other flexible materials of this nature may be somewhat difficult to insert into the opening 284 this embodiment. For example, the filter may tend to flex or distort when being inserted and may interfere with the front or rear walls. Optionally, the filters used in this embodiment may be made from materials that are sufficiently stiff to facilitate insertion of the filter in the pre-motor filter housing. Alternatively, or in addition, the pre-motor filter may be supported by a frame or other suitable embodiment of a filter carrier 276 that can help provide the desired strength.

Referring to FIG. 32, this embodiment of a filter carrier 276 includes a side wall 286 that surrounds the edge 288 of the filter 136, and a rear wall 290 that overlies the upstream surface 262 of the filter 136. The rear wall 290 of the frame is provided with a plurality of holes 292 to allow air to pass there through. In this embodiment the filter carrier 276 also includes a portion of the conduit 272 that extends through the hole 270 in the filter 136, connecting the cyclone air outlet 180 with the upstream header 264 on the rear side of the filter 136. A filter carrier 276 and filter 136 of this type may also be configured to accommodate different air flow patterns, including as shown in the embodiment of FIG. 36, in which case the conduit 272 and hole 270 may be in a different location.

Optionally, instead of including a rear wall 290 as illustrated, the filter carrier 276 may only include the side wall portion 286, and may be of generally ring-like configuration. This may help facilitate air flow through the filter 136 and may provide adequate strength and stiffness. In other embodiments, the filter carrier may include a front wall instead of a rear wall 290 (e.g. reversing the orientation of the frame as illustrated) or may include a rear wall that covers less than the entire flow area of the filter. For example, the rear wall may be configured as a relatively small flange extending inwardly from the side wall which may help stabilize the filter 136 while helping to reduce the impact on the flow area of the filter.

In some embodiments, a portion of the side wall 286 of the filter carrier 276 may be configured to also form a portion of the housing side wall 252 when the filter carrier 276 is inserted. For example, instead of an openable portion 282, the side wall 286 may be configured to cover and seal the opening 284 in the pre-motor filter housing 134, whereby a portion of the side wall 282 would be an exposed portion of the hand vacuum 100, like the bottom wall 250 in the embodiment of FIG. 5.

Pre-Motor Filter Media

The following is a description of different features and configurations of a pre-motor filter media that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filter housings, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Optionally, the pre-motor filter positioned within the pre-motor filter housing may be of any suitable design that is compatible with a given pre-motor filter housing design and may be formed from any suitable material, including, for example, physical porous filter media such as foam and/or felt.

Figure 13:
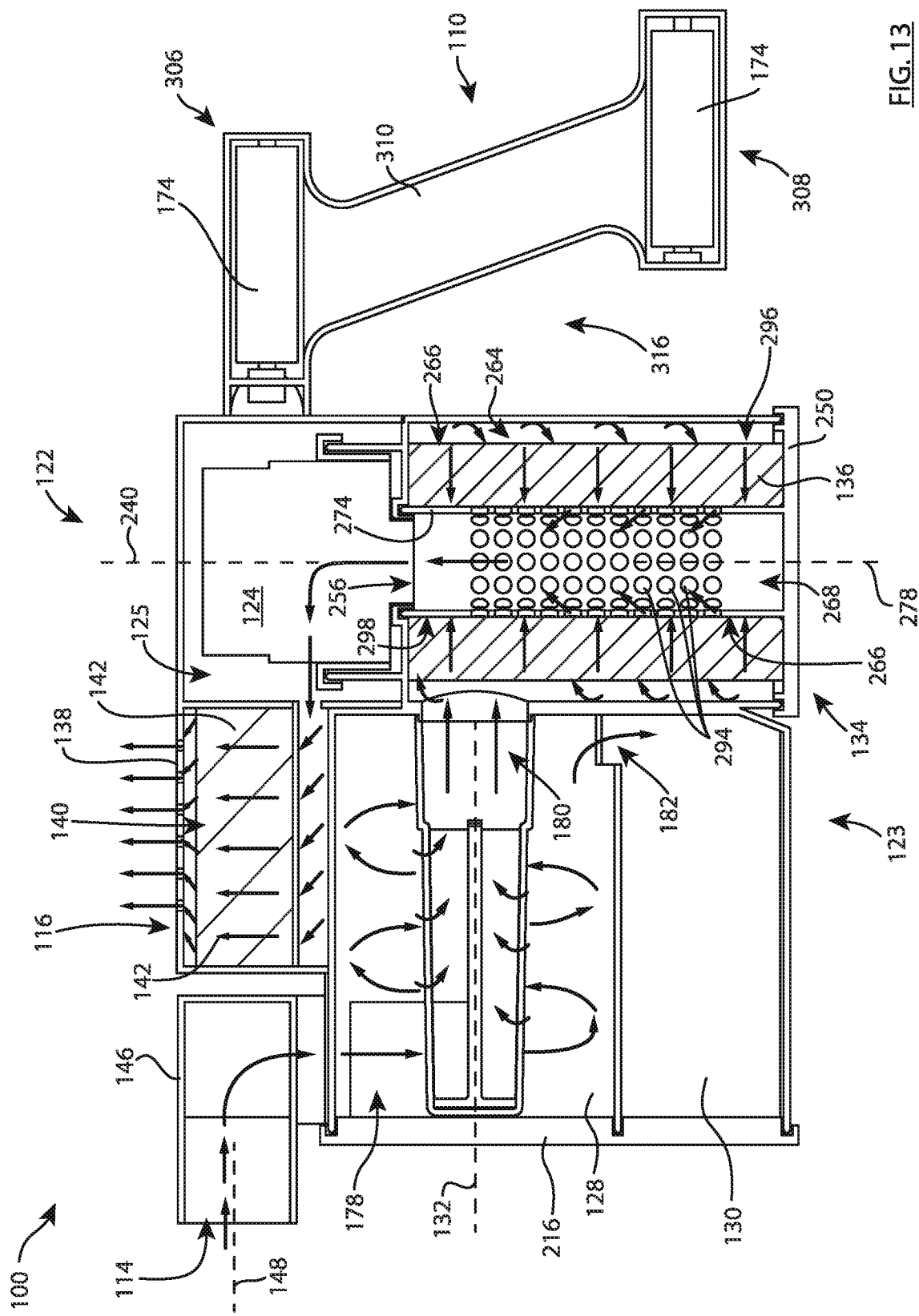
FIG. 13 is a side cross-sectional view of another embodiment of a surface cleaning apparatus.
Figure 14:
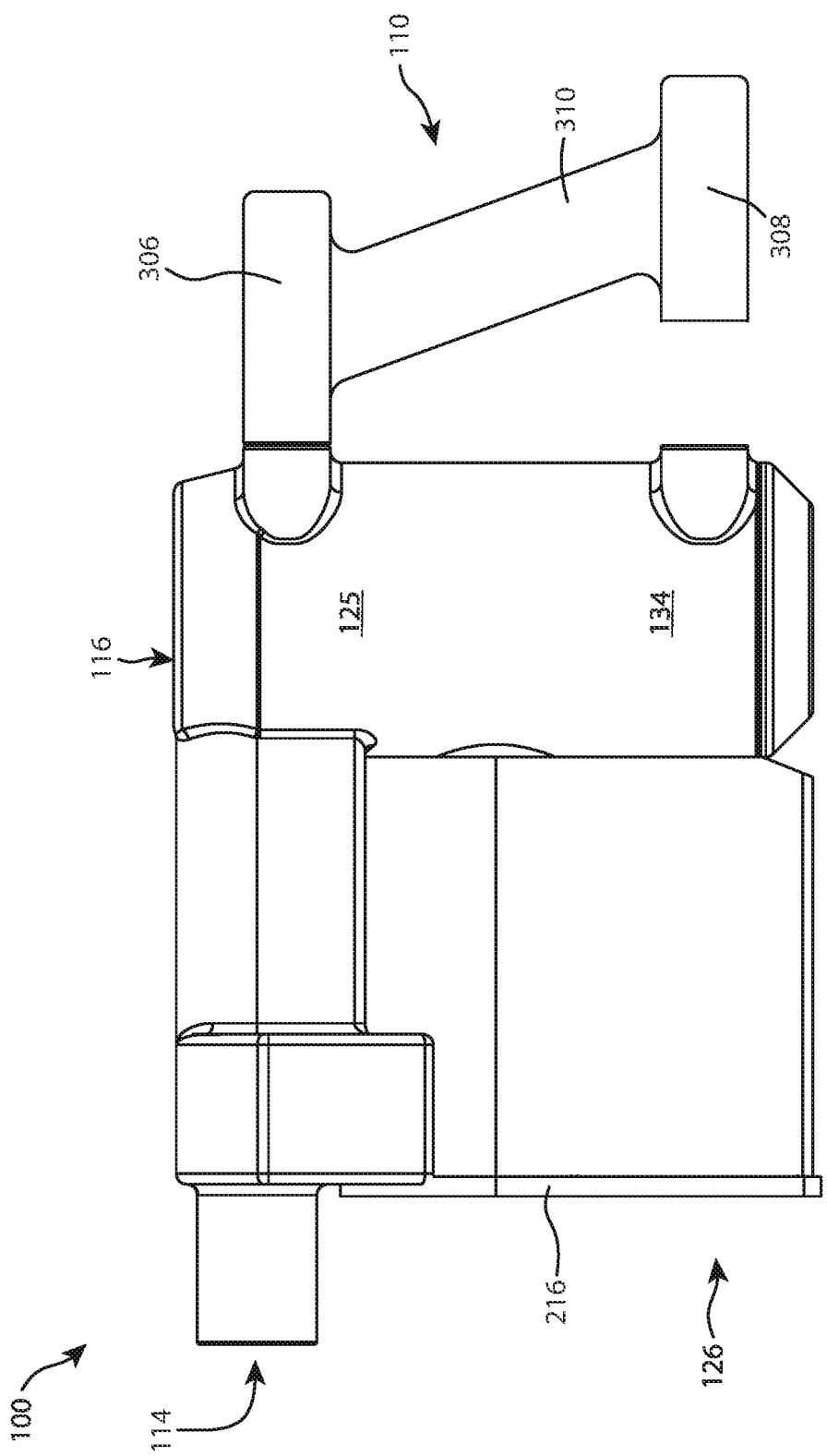
FIG. 14 is a side view of the embodiment of FIG. 13.

In the embodiment illustrated in FIGS. 1-24 and 37-39, the pre-motor filter 136 itself is configured as a generally cylindrical foam filter with a hollow, open interior that may be sized to fit around an optional outlet conduit 274 (see FIG. 13 for example). The foam filter 136 extends longitudinally between upper and lower ends along a filter axis 278, which is generally vertical in the illustrated embodiment. The filter 136 is placed around the outlet conduit 274, which includes a plurality of holes 294 spaced along its length. In this example, the filter 136 and conduit 274 are concentrically positioned, and both extend along the filter axis 278.

In the illustrated example, the filter 136 is sized so that its diameter is less than the diameter of the pre-motor filter housing side wall 252. In this arrangement, a generally annular flow region is defined between the side wall 252 and the outer wall 296 of the filter which functions as the upstream surface 262. This annular flow region functions as the upstream header 264. An opposed inner wall 298 of the filter 136 surrounds and faces the outlet conduit 274 and functions as a downstream surface 266. In this embodiment, the interior of the conduit 274 can function as the downstream header 268. In this embodiment, the filter 136 has a generally annular transverse cross-sectional area, taken in a plane that is orthogonal to the filter axis 278.

In the illustrated example, air flowing into the pre-motor filter housing 134 can flow within the upstream header 264, and is then drawn radially inwardly, through the upstream surface 262 and exits the filter via the inner, downstream surface 266. Arranging the pre-motor filter 136 in this manner may help provide an upstream surface 262 having a desired surface area in a relatively small physical volume. Air exiting the downstream side 266 is drawn into the interior of the conduit 274, via the holes 294, and flows upwardly out of the pre-motor filter housing 134 via the housing air outlet 256 in a direction that is substantially parallel to the filter axis 278. From the air outlet 256, the air flows into the suction motor housing 125.

Referring to FIG. 13, in the illustrated example, the pre-motor filter 136 is positioned so that the pre-motor filter axis 278 is generally aligned with the suction motor axis 240, and is orthogonal to the cyclone axis 132 and inlet conduit axis 148. In this position the projection of the suction motor axis 240 extends through the pre-motor filter housing 134 and through the interior of the conduit 274, but does not actually intersect the foam filter 136 itself. When positioned as shown in FIG. 13, for example, a projection of the cyclone axis 132 will intersect the filter 136 in two different locations (one location forward of the conduit 274 and one location rearward of the conduit 274) as well as intersecting the conduit 274 and the handle 110. In this configuration the passage of the air flow through the filter may redirect the air flow from, e.g., a horizontal axis to a vertical axis without requiring a conduit with a 90° bend, which would create increased back pressure.

Optionally, the pre-motor filter 136 can include more than one layer, and may include secondary pre-motor filter media, such as a felt layer 136a. Optionally, the felt layer 136a may be positioned between the inner wall 298 and the conduit 274 or alternatively may be positioned in the air flow path between the outlet conduit 274 and the suction motor 124. For example, in the embodiments of FIGS. 6 and 11, the felt layer 136a is positioned over the upper end of the outlet conduit, and overlies the conduit 274 and is intersected by both the filter and suction motor axes 278 and 240 in FIG. 7, and is only intersected by the filter axis 278 in the embodiment of FIG. 11 (in which the suction motor 124 is oriented horizontally). Alternatively, the secondary pre-motor filter media may be positioned in a different location or omitted entirely.

In other embodiments, such as those shown in FIGS. 25-36, instead of using a cylindrical filter, the pre-motor filter 136 can be a generally flat, slab-like filter that is formed from foam or other suitable media and has opposed upstream and downstream surfaces 262 and 266. An optional felt filter layer 136a can be provided on one side of the filter, and preferably is positioned adjacent the downstream side 266 as shown in FIGS. 25-34, but may be provided on the upstream side 262 as shown in FIG. 36.

In these embodiments, the pre-motor filter 136 covers substantially the entire rear side of the cyclone unit 126 and suction motor housing 125. In embodiments of FIG. 27, a projection of the cyclone axis 132 intersects the pre-motor filter 136, and a projection of the motor axis 240 also intersects the pre-motor filter 136. In the embodiment of FIG. 34, a projection of the cyclone axis 132 intersects the pre-motor filter 136, but a projection of the motor axis 240 does not.

In the embodiments that incorporate the flat filter 136, the filter 136 and filter housing 134 are positioned between the handle 110 and the rest of the hand vacuum 100.

Removable Component Configurations

The following is a description of different configurations of components (optionally grouped together as assemblies and/or sub-assemblies) that can be removed from the hand vacuum cleaner, for example when emptying the air treatment member. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Optionally, as mentioned herein, the cyclone unit 126 may be removable from the hand vacuum cleaner 100. This may be useful when emptying the cyclone unit 126, and may also allow access to the cyclone unit 126 and additional portions of the hand vacuum that would otherwise be concealed for cleaning, inspection and the like. Optionally, the cyclone unit 126, including the cyclone chamber and the dirt collection chamber may be removable on its own. Preferably, the cyclone unit 126 may be removed as a sealed unit, with the exception of the cyclone air inlet 178 and the cyclone air outlet 180, so that the dirt collection chamber 130 and dirt collection region within the cyclone chamber 128 (if any) remains sealed. This may help prevent spilling of the dirt or debris from within the cyclone unit 126 while it is being transported for emptying. Once the user has arrived at the garbage can (or other suitable dumping location), the cyclone unit 126 can be opened (for example by opening the front door 216 or bottom wall as discussed herein). Alternatively, portions of the cyclone unit may be opened/exposed when the cyclone unit 126 is detached to the main body. For example, one wall of the cyclone unit 126 (such as the rear end wall) may remain with the main body 106, so that separating a portion of the cyclone unit 126 from the main body 106 opens a portion of the cyclone chamber 128 and/or the dirt collection chamber 130.

In some embodiments, other portions of the hand vacuum cleaner may be removable with the cyclone unit. For example, one or more of the dirty air inlet and conduit, pre-motor filter housing, pre-motor filter, suction motor housing, suction motor, release actuator and the like may be removable with the cyclone unit 126 as part of a removable assembly. Preferably, any such removable assembly may also be configured to be removed as a generally sealed unit, but for an assembly air inlet and an assembly air outlet (which may be any combination of the dirty air inlet or cyclone air inlet and the cyclone air outlet, pre-motor filter housing outlet, motor housing outlet and/or clean air outlet). This may help prevent dirt/debris from spilling, and may help reduce the number of seals and connections in the air flow path required to accommodate the removal of the assembly.

Any configuration of the removable components can secured to the main body of the hand vacuum using any suitable, releasable fasteners or locking mechanisms, including latches, rotary couplings and the like.

Referring to FIGS. 1-6, in this embodiment the removable assembly includes only the cyclone unit 126 (including the cyclone chamber 128 and dirt collection chamber 130) that is removable from the main body 106 for emptying (see FIG. 6). In this example, the cyclone unit 126 is removable from the main body as a substantially sealed unit, but for the cyclone air inlet 178 and cyclone air outlet 180, which may help a user transport the cyclone unit 126 to a garbage can without spilling dirt from the dirt collection chamber.

In this embodiment, when the cyclone unit 126 is detached the cyclone air inlet 178 is separated from the air inlet conduit 146, and the cyclone air outlet 180 is separated from the pre-motor filter housing inlet 254. Gaskets and other suitable sealing members may optionally be provided at each of these interfaces to help provide a substantially air tight seal when the cyclone unit is attached.

In this configuration, removing the cyclone unit 126 interrupts the airflow path in two locations, and replacing the cyclone unit re-establishes two fluid connections at the same locations. Providing an openable interface between the inlet conduit 146 and the cyclone air inlet 178 may allow a user to inspect and/or access the cyclone air inlet 178 and the downstream end of the inlet conduit 146 when the cyclone unit 126 is detached. This may help facilitate cleaning or maintenance of the hand vacuum 100, and may be helpful if objects become lodged in the air flow path between the inlet 114 and the cyclone air inlet 178. Optionally, the cyclone unit 126 can be configured so that both fluid connections are simultaneously re-established when the cyclone unit 126 is attached.

In the illustrated embodiment, the cyclone unit 126 can be separated from the main body by translating the cyclone unit 126 in a generally axial, forward direction, in a generally vertical, downward direction or in a combined forward and downward direction.

When configured in this manner, removing the cyclone unit 126 does not provide access to the interior of pre-motor filter housing 134 or the pre-motor filter itself 136. Optionally, in addition to have the removable cyclone unit, the pre-motor filter housing can be independently openable and/or removable, for example as discussed herein and shown in FIGS. 7 and 10.

Referring to FIG. 6, in this embodiment the pre-motor filter housing 134, suction motor housing 125 remain and inlet conduit 146 remain in place and connected to the handle 110 (i.e. as part of the main body 106) when the cyclone unit 126 is detached. In this configuration a user may hold the handle 110 with one hand, to support the suction motor 124, pre-motor filter 136 and dirty air inlet 114, while detaching and manipulating the cyclone unit 126 with the other hand.

The embodiment illustrated in FIG. 25-29, FIGS. 22-24 illustrate another examples of hand vacuums that are configured so that the cyclone unit 126 that is removable from the main body 106, while leaving the inlet 114, pre-motor filter housing 134 and suction motor housing 125 in position. Alternatively, the removable portion of the hand vacuum cleaner may include more than cyclone unit.

Figure 8:
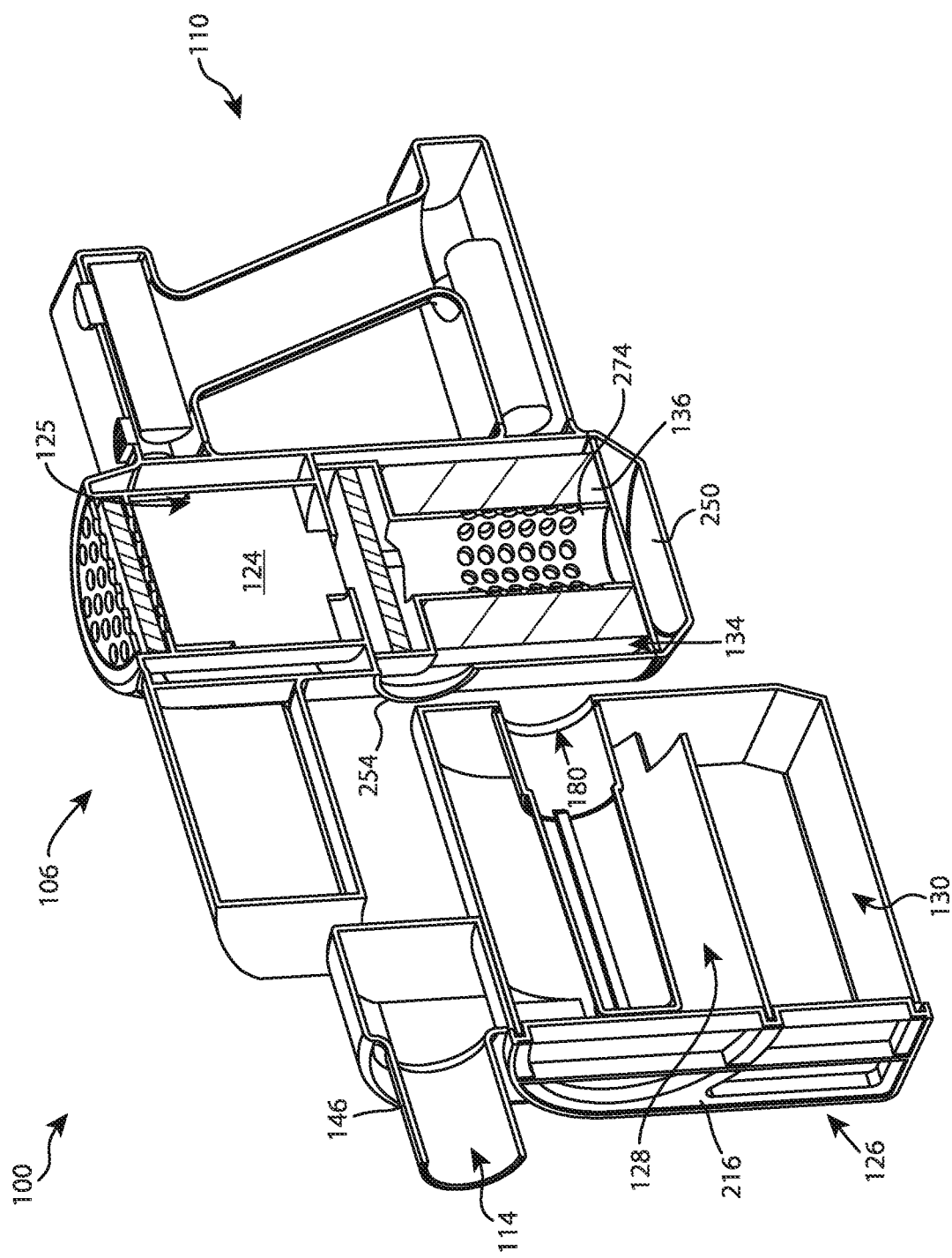
FIG. 8 is a perspective cross-sectional view of the surface cleaning apparatus of FIG. 1, with a different portion of the apparatus detached.
Figure 30:
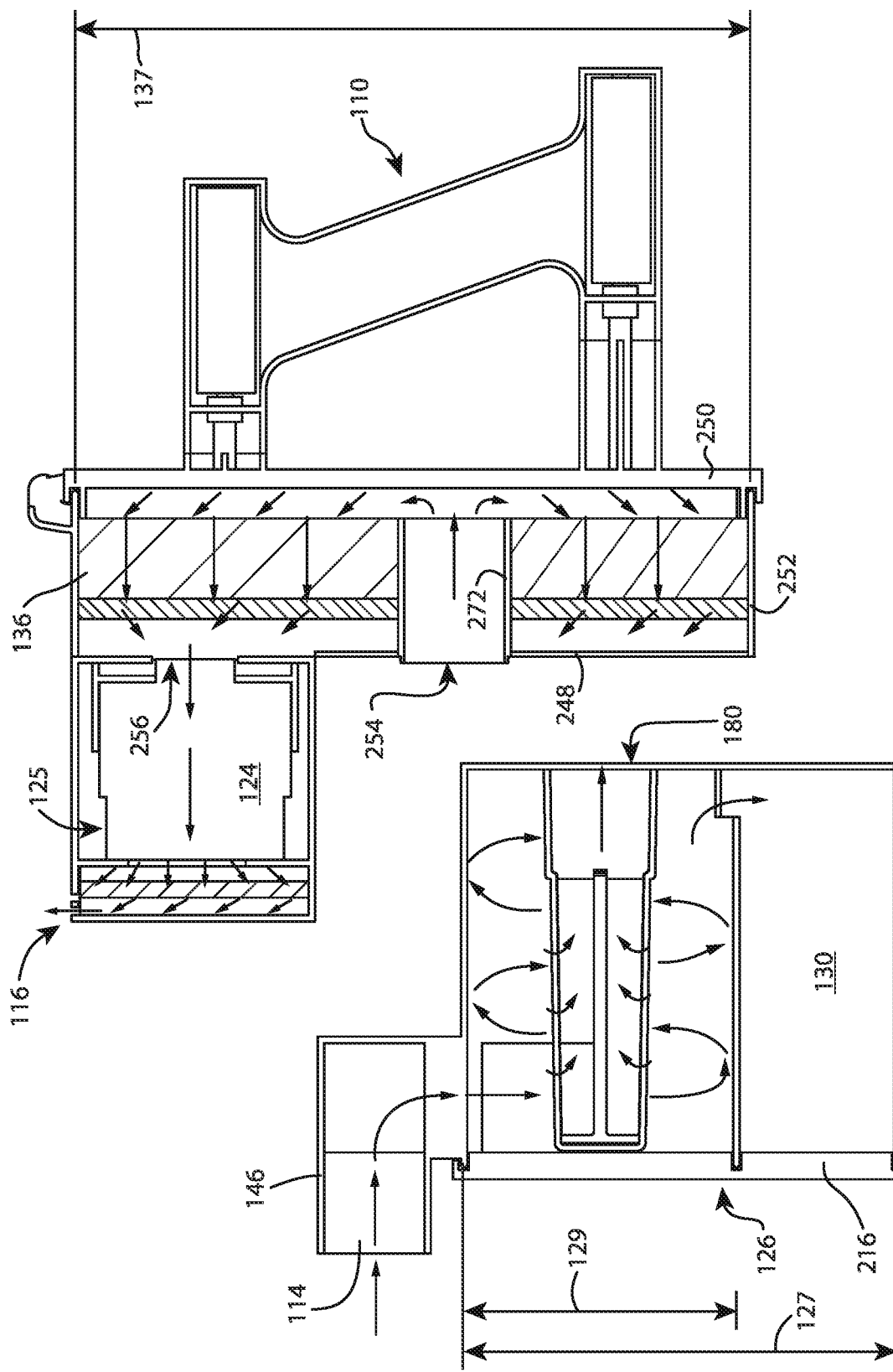
FIG. 30 is a cross-sectional view of the surface cleaning apparatus of FIG. 25, with a different portion of the apparatus detached.

Referring to FIGS. 8 and 30, in these embodiments the inlet conduit 146 and dirty air inlet 114 is coupled to the cyclone unit 126 and is detachable from the main body 106 with the cyclone unit 126. In this embodiment the inlet conduit 146 need not be detachable from the cyclone air inlet 178, and the inlet conduit 146 may, for example, be integrally formed with the cyclone unit 126. When configured in this manner, detaching the cyclone unit 126 from the main body only interrupts the air flow path in one location—the interface between the cyclone air outlet 180 and the pre-motor filter housing inlet 254—rather than two locations as in the embodiment of FIGS. 1-7. This may simply construction of the hand vacuum 100 and may reduce the number of seals required along the portion of the air flow path extending between the inlet conduit 146 and the pre-motor filter housing 134. However, in this embodiment the inlet conduit 146 may need to be detached from the cleaning wand 150 (or other tool) when the cyclone unit 126 is removed for emptying—or the cleaning wand 150 could be carried along with the cyclone unit for emptying. In contrast, the embodiments of FIG. 1-7 (and others) allow the cyclone unit 126 to be Referring to FIG. 9, in yet another embodiment, the hand vacuum 100 may be configured so that the pre-motor filter housing 134 is separable from the main body 106, either in isolation (FIG. 10), or in combination with the cyclone unit 126 (FIG. 7). Optionally, the inlet conduit 146 may be configured to be removable along with these components, (for example as illustrated in FIG. 8) so that the removable assembly includes the cyclone unit 126, inlet conduit 146 and pre-motor filter housing 134. Alternatively, the nozzle may remain attached to the main body as illustrated in FIG. 9.

Figure 9:
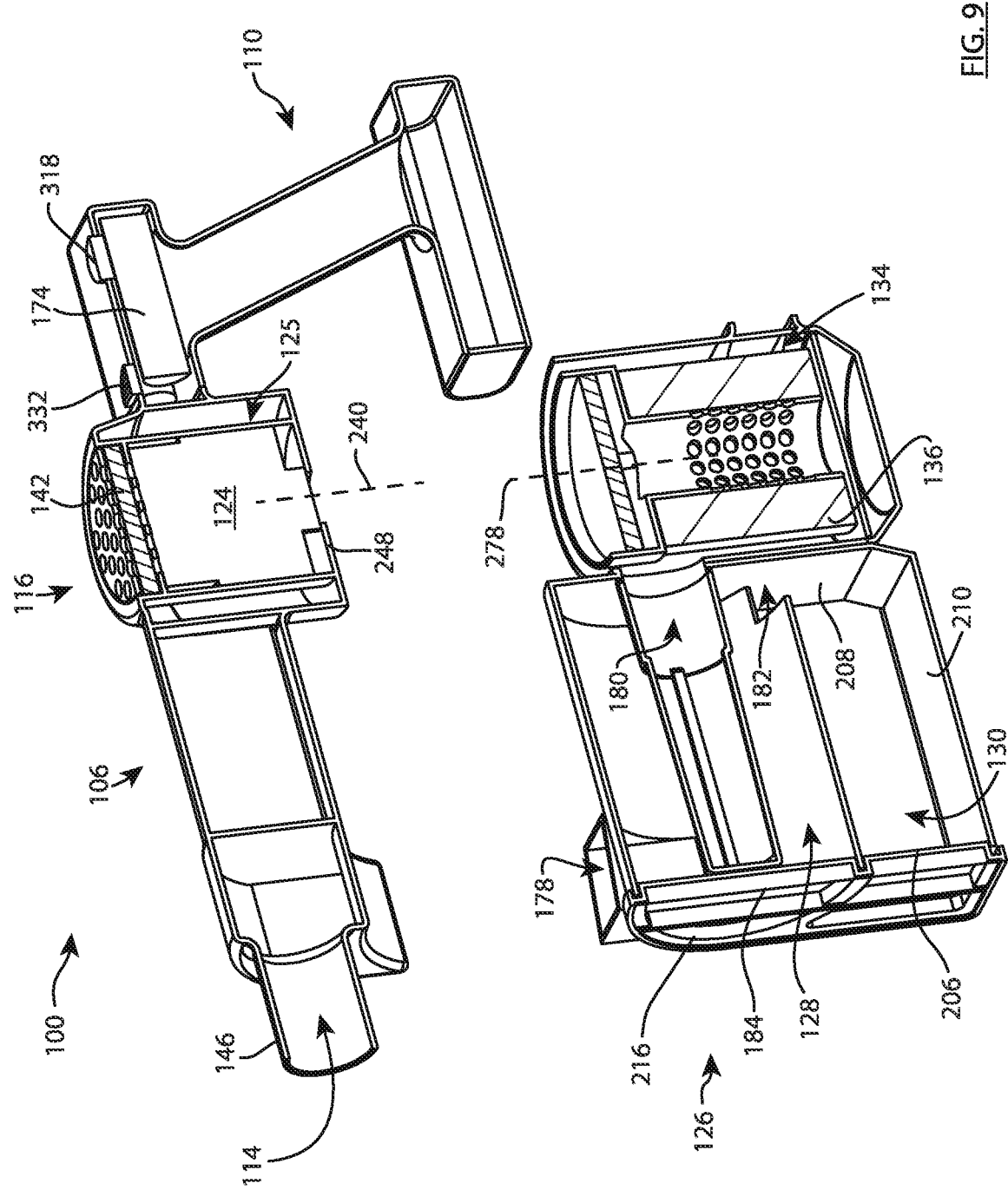
FIG. 9 is a perspective cross-sectional view of another embodiment of a surface cleaning apparatus, with a portion of the apparatus detached.

In the embodiment of FIG. 9, a user may remove all of the "dirty" components from the main body in a single module, for emptying and/or cleaning. That is, the dirt collection chamber 130 and pre-motor filter 136 may both be removed in unison in a single operation. A user may then empty the dirt chamber 130 and inspect and/or clean the pre-motor filter 136 before re-attaching the components. This may help remind a user to inspect the condition of the pre-motor filter 136 each time the dirt collection chamber 130 is emptied. As the pre-motor filter housing 134 is less likely to contain loose dirt particles than the dirt collection chamber, removing the cyclone unit 126 with the pre-motor filter housing open may still be considered a generally sealed configuration (but for the cyclone air inlet 178 and the open portion of the pre-motor filter housing 134) as dirt from the dirt collection chamber 130 is unlikely to escape via the open portion of the pre-motor filter housing 134.

Alternatively, the pre-motor filter housing 134 may be configured so that its upper wall 248 is also removable along with the cyclone unit 126. In this configuration, the pre-motor filter housing 134 may be removable as a generally sealed unit, but for its air outlet 256.

Figure 31:
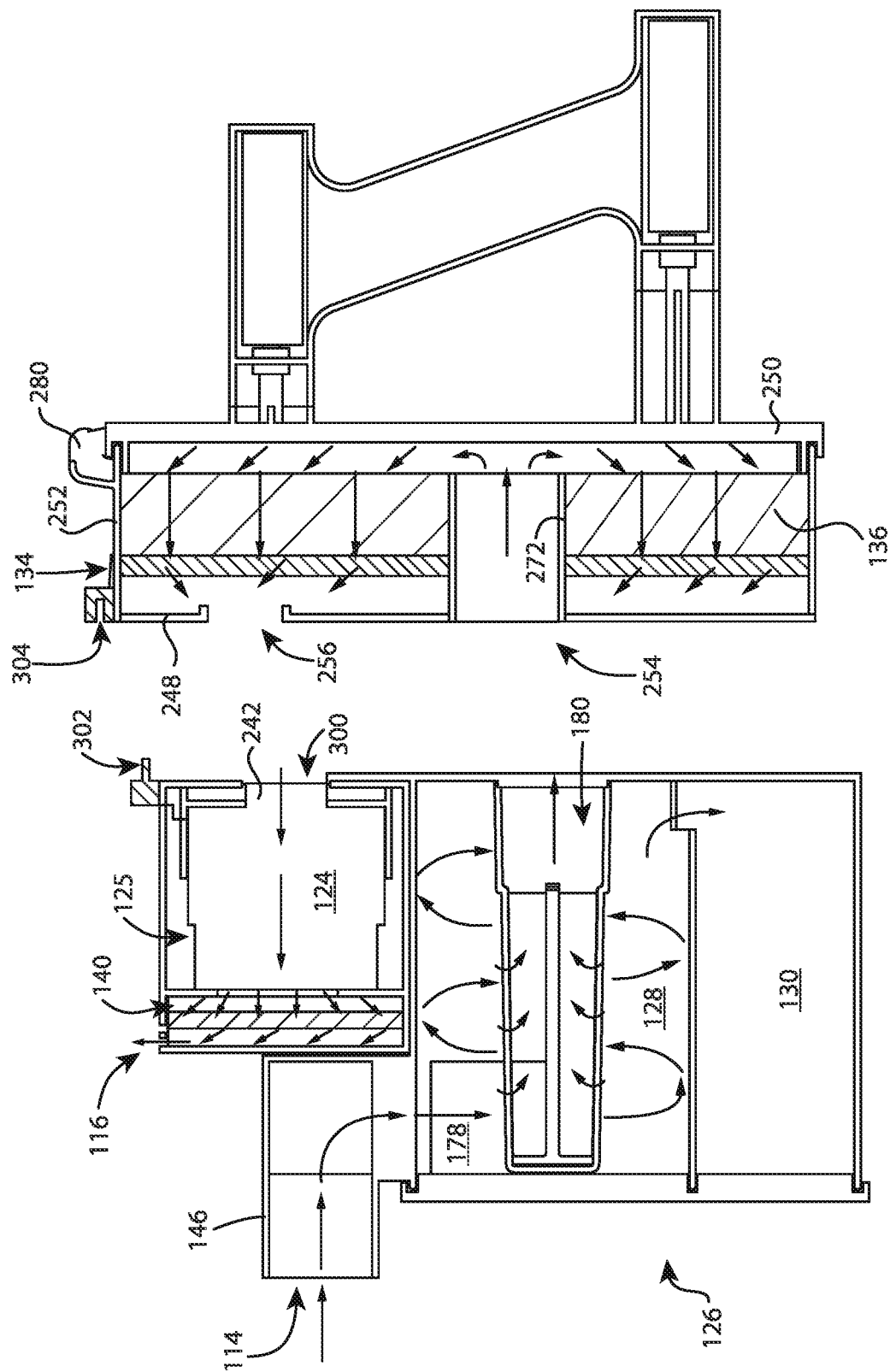
FIG. 31 is a cross-sectional view of the surface cleaning apparatus of FIG. 25, with a different portion of the apparatus detached.

Optionally, the suction motor housing and suction motor therein may be part of the removable assembly, and may be separable from the pre-motor filter housing, handle and other portions of the hand vacuum. For example, FIG. 31 illustrates an embodiment of a hand vacuum 100 in which the suction motor housing 125 is connected to the cyclone unit 126, and is separable from the pre-motor filter housing 134 along with the cyclone unit 126. In addition to the suction motor housing 125, the inlet conduit 146 is also connected to the cyclone unit 126, such that the removable assembly in this embodiment includes the conduit 146, cyclone unit 126 and suction motor housing 125, along with the suction motor 124 therein. In this arrangement, separating the removable assembly interrupts the air flow path in two locations (between the cyclone air outlet 180 and the pre-motor filter housing inlet 254, and between the pre-motor filter housing outlet 256 and the suction motor housing inlet 300). In this embodiment, the removable assembly would be sealed but for the air inlet 114, the cyclone air outlet 180 suction motor inlet 300. While this assembly includes three openings 114, 180 and 300, each of the openings are spaced apart from the dirt collection chamber 130 so that the dirt collection chamber 130 can still be considered to be generally sealed. In other words, even though there are three openings, the location of the openings reduces the likelihood that any dirt or debris from the dirt collection chamber 130 could leak out of the cyclone unit via the openings such that the user can carry and handle the removable assembly without spilling its contents.

This configuration may also interrupt the electrical connections between the suction motor 124 and the power source and/or main power switch (or button) of the hand vacuum. In the illustrated example, the hand vacuum includes battery packs 174 in the handle 110, and therefor includes a pair of detachable, mating electrical connectors to provide power to the suction motor when it is connected to the pre-motor filter housing. The connectors may be of any suitable configuration, such as mating pins 302 and sockets 304. Alternatively, instead of providing detachable electrical connections, the batteries or power cord and main power switch may be provided in the suction motor housing 125 or in other portions of the main body 106 that are not separable from the suction motor housing, or that separate along with the cyclone unit.

In this embodiment, the pre-motor filter housing 134 may be configured so that the front wall 248 is openable in addition to, or optionally instead of opening rear wall 250. The front wall 248 can be connected using the same type of hinge mechanism illustrated with respect to the rear wall 250, may be detachable or may be attached using any other suitable type of mechanism. In this illustrated configuration, the front wall 248 is covered by the cyclone unit 126 and suction motor housing 125 when the hand vacuum 100 is in used, and is revealed and is openable when the cyclone unit 126 and suction motor housing 125 are removed.

Optionally, instead of separating one or more components from the portion of the hand vacuum 100 that includes the handle 110, the hand vacuum may be configured such that the handle 110 is detachable from the rest of the components (or it can be understood as the removable assembly including all of the components except for the handle), such as by separating the handle 110 from the main body 106, as described herein.

Component Configurations

The following is a description of different component configurations that can be used in a hand vacuum cleaner. These features may be used by itself in any surface cleaning apparatus or in any combination or sub-combination with any other feature or features described herein. For example, any of the component configurations described herein may be used with any of the cyclone units, dirt collection chambers, cyclone chamber, emptying methods, pre-motor filter housings, pre-motor filters, removable component configurations, dual mode operable door lock, handle, on-board power source arrangements, wands, surface cleaning heads, information display devices, power switches and controls, air flow configurations, suction motors, reconfigurable vacuums, clean air outlet configurations, onboard chargers, power operating modes and other features described herein.

In some embodiments, a suction motor is provided in an upper portion of a hand vacuum 100 (see for example FIGS. 8, 11, 22 and 27. As exemplified, the suction motor may be oriented generally vertically or generally horizontally. Further, as exemplified in FIG. 27, the air flow through the motor may be in an opposite direction to the air flow through the air treatment member. In any such design, one or more energy storage members may be provided in a lower portion of the hand vacuum 100, such as in a lower portion of the main body and/or in a lower portion of the handle.

In some embodiments, the suction motor 124 and pre-motor filter 136 may each be located rearwardly of the air treatment member. For example, referring to FIG. 5, in this example the suction motor 124 and pre-motor filter 136 are both located rearward of a plane 258 that contains the rear end wall 186 of the cyclone chamber 128 and the cyclone air outlet 180. Alternatively, portions of the suction motor and/or pre-motor filter may extend forwardly of the plane 258, such that they vertically overlap the cyclone chamber 128.

In other embodiments, the suction motor may be positioned forward of a rear side of the pre-motor filter and optionally forward of the front side of the pre-motor filter (see for example FIG. 36). If a battery pack 174 is provided in a lower portion of the handle as exemplified in FIG. 36, then components of the hand vacuum 100 that have significant weight may be provided at both the upper and lower ends of the hand vacuum 100 and also longitudinally spaced from each other (i.e. essentially on a diagonal). An advantage of this design is that the centre of gravity may be positioned centrally with respect to the vertical height of the hand vacuum 100 but is moved forwardly.

As also exemplified in FIG. 36, the suction motor may be positioned above the air treatment member. As exemplified, the suction motor axis 240 is substantially parallel to, e.g. ±20°, ±15°, ±10°, or ±5°, and laterally (vertically) offset above the cyclone axis 132. Optionally, a projection of the inlet conduit axis 148 may intersect the suction motor 124 (See also FIG. 11). It will be appreciated that, as exemplified in FIG. 11, only a portion of the suction motor may be located above the air treatment member.

Handle

The following is a description of different features of a handle that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, removable component configurations, component configurations, dual mode operable door lock, on-board power source arrangements, wands, surface cleaning heads, information display devices, power switches and controls, air flow configurations, suction motors, reconfigurable vacuums, clean air outlet configurations, onboard chargers, power operating modes and other features described herein.

A hand vacuum in accordance with one or more of the features described herein may include any suitable type of carry handle. Referring to FIGS. 1 to 4, in the one embodiment the handle 110 is located at the rear end 120 of the hand vacuum 100. Optionally, the handle may include upper and lower ends 306 and 308, and either one (FIG. 13) or both of the upper and lower ends 306 and 308 (FIGS. 3 and 4) can be connected to the main body.

Referring also to FIG. 5, in this embodiment, the upper end 306 of the handle 110 is positioned at an elevation that is between the upper and lower ends of the suction motor housing 125, and the suction motor 124 itself, and is connected to the side wall of the suction motor housing 125. The lower end 308 of the handle 110 is positioned at an elevation that is between the end wall 248 and 250 of the pre-motor filter housing 134, and between the upper and lower ends of the pre-motor filter 136, and is connected to the side wall 252 of the pre-motor filter housing 134.

In an alternative embodiment, as shown in FIG. 12, the uppers end 306 of the handle 110 is positioned at an elevation that is between the end wall 248 and 250 of the pre-motor filter housing 134, and between the upper and lower ends of the pre-motor filter 136, and is connected to the side wall 252 of the pre-motor filter housing 134. The lower end 308 of the handle is at an elevation that is between the upper and lower ends of the suction motor housing 125, and the suction motor 124 itself, and is connected to the side wall of the suction motor housing 125.

In both embodiments, an elongate pistol-grip style hand grip portion 310 extends upwardly and forwardly along a hand grip axis 312 (FIG. 3) between upper and lower ends 306 and 308, when the hand vacuum is oriented so that the upper end is disposed above the lower end. In the illustrated embodiment, the hand grip axis 312 forms an acute angle 314, relative to a vertical axis. The angle 314 can be any suitable angle, and preferably is between about 5-85°, and may be between about 20-60°.

In this configuration, a finger gap 316 for receiving the fingers of a user is formed between the hand grip 310 and the main body 106. In the embodiments of FIGS. 3-5, 12 and 13, the finger gap 316 is partially bounded by the hand grip 310, the upper end 306 of the handle, the lower end 308 of the handle, a portion of the suction motor housing 125 and a portion of the pre-motor filter housing 134. As illustrated in FIG. 5, in this configuration a projection of the cyclone chamber axis 132 intersects the hand grip 310 and the finger gap 316, as well as passing through the pre-motor filter housing 134.

In the embodiments of FIG. 5, the handle 110 is positioned such that a projection of the inlet conduit axis 148 is above the hand grip portion 310 when the inlet conduit axis 148 is horizontally disposed (as illustrated in FIG. 5). Alternatively in other embodiments, the handle and inlet conduit can be positioned so that a projection of the inlet conduit axis does intersect the hand grip portion.

Figure 25:
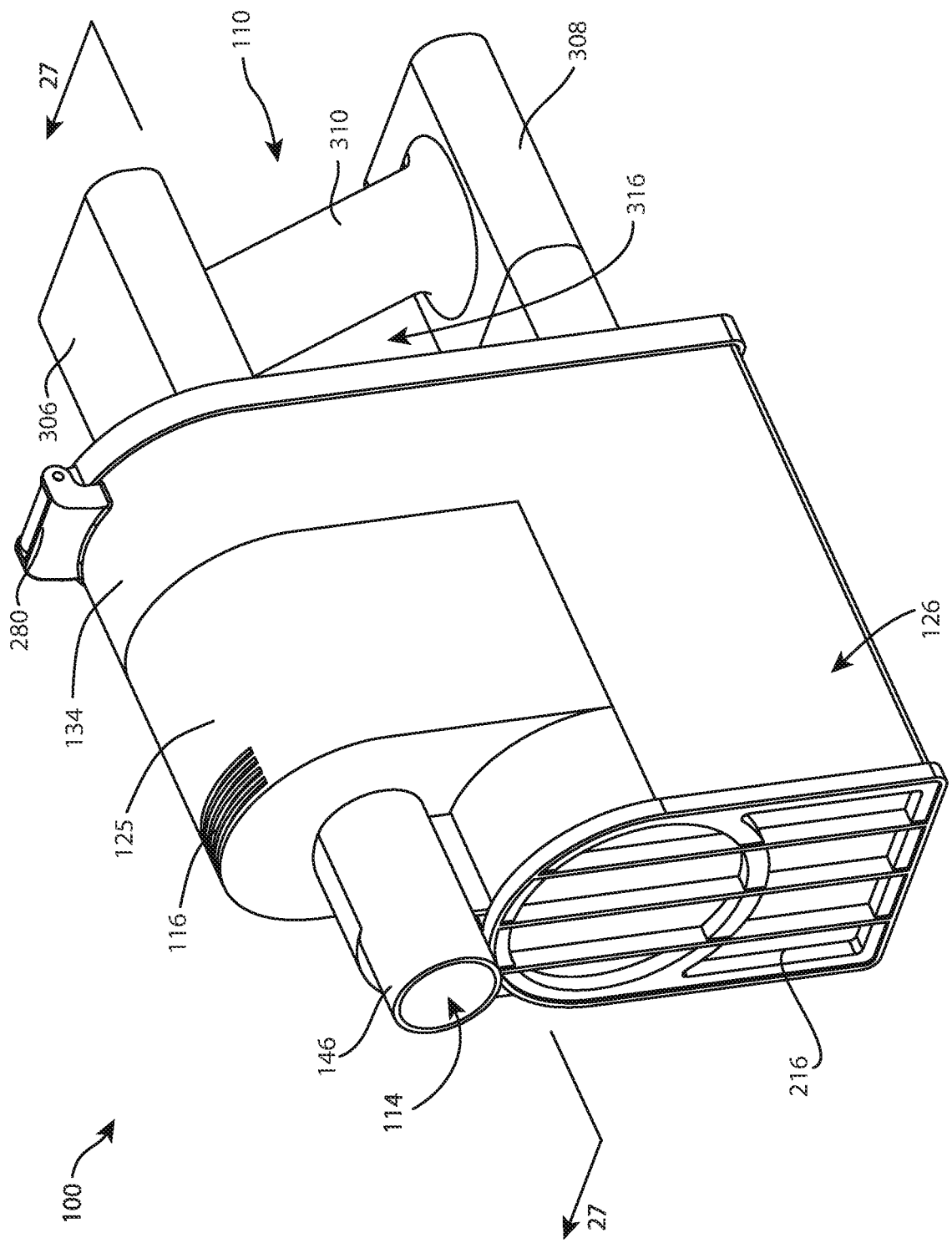
FIG. 25 is a front perspective view of another embodiment of a surface cleaning apparatus.

In the embodiment of FIGS. 25 and 27, pre-motor filter housing 134 extends over the entire rear end of the hand vacuum, and the full height from the lower end 123 to the upper end 122. In this arrangement, the pre-motor filter housing 134 and filter 136 have a height 137 (FIG. 30) in the vertical direction (i.e. a direction orthogonal to the cyclone axis 132 in this example) that is greater than the height 129 (FIG. 30) of the cyclone chamber 128, and greater than the height 127 (FIG. 30) of the entire cyclone unit 126 in the orthogonal direction. In this embodiment, the handle 110 is only connected to the rear wall 250 of the pre-motor filter housing 134. That is, both the upper and lower ends 306 and 308 are connected to the rear wall 250, and the handle 110 is not directly connected to the suction motor housing 125 or other portions of the main body 106. In this embodiment, a projection of the cyclone axis 132 intersects the pre-motor filter housing 134, filter 136, the hand grip portion 310 and finger gap 316. A projection of the motor axis 240 and the inlet conduit axis 148 both extend above the hand grip 310, and optionally one or both of the axes 148 and 240 may interest the upper end 306.

Optionally, the handle may only be connected to the main body at one of its ends, instead of both the upper and lower ends, such that there is only a single point of contact/connection between the handle and the rest of the main body. In the embodiment of FIG. 13, the handle 110 is only connected to the suction motor housing 125 at its upper end 306, and the lower end 308 is not connected to the main body 106. Alternatively, the handle may only be connected at its lower end.

On Board Power Source Arrangement

The following is a description of different on board power source configurations that can be used in a hand vacuum cleaner. These features may be used by itself in any surface cleaning apparatus or in any combination or sub-combination with any other feature or features described herein. For example, any of the on board power source configurations and features described herein may be used with any of the cyclone units, dirt collection chambers, cyclone chamber, emptying methods, pre-motor filter housings, pre-motor filters, removable component configurations, component configurations, dual mode operable door lock, handle configurations, wands, surface cleaning heads, information display devices, power switches and controls, air flow configurations, suction motors, reconfigurable vacuums, clean air outlet configurations, onboard chargers, power operating modes and other features described herein.

Optionally, the hand vacuum cleaner may be powered by an electrical cord 104, such as illustrated in FIG. 2. In such embodiments, the suction motor 124 may run on AC power supplied from a wall socket. Alternatively, or in addition to be powered by an electrical cord, the hand vacuum cleaner may include one or more onboard power sources. The power sources may be any suitable device, including, for example one or more batteries and/or battery packs 174. Optionally, the batteries and battery packs may be rechargeable or may be replaceable, non-rechargeable batteries.

In some embodiments, the battery packs 174 used in the hand vacuum may be provided at a single location, for example as one large battery pack. Alternatively, battery packs may be provided in multiple locations within the hand vacuum, and optionally within the wand 150, surface cleaning head 154 and other auxiliary tools. Positioning battery packs 174 at two or more locations may help distribute the weight of the batteries, and may affect the hand feel and/or perceived balance of the hand vacuum.

Optionally, battery packs 174 may be positioned generally opposite each other on opposite sides of a central plane or axis of the hand vacuum, for example toward the upper end 122 and lower end 123 of the hand vacuum 100. In this configuration, the weight of one battery pack 174 may at least partially offset/counterbalance the weight of the opposing battery pack 174. For example, providing upper and lower battery packs 174 may help reduce the torque experienced by the user if she rotates the hand vacuum about a longitudinal rotation axis. In such a configuration, a projection of the cyclone axis 132 may intersect the handle 110 at a location that is between the upper and lower battery packs 174.

Optionally, the handle 110 may be configured so that the upper and lower battery packs 174 are located as close as possible to the longitudinal rotation axis, which may help further reduce the torque experienced by the user. Having an unbalanced mass above the rotation axis may result in a tendency for the instability because the resulting moment force will urge the top-heavy hand vacuum to rotate about the rotation axis when in use, which may contribute to user discomfort and/or fatigue. Having an unbalanced mass below the rotation axis may have a generally stabilizing effect, but may also require additional torque input from the user if they wish to rotate the hand vacuum about the axis. Positioning the battery packs and other vacuum components to help reduce such unbalanced configurations may help improve the user experience with the hand vacuum. Optionally, the hand vacuum may be configured so that its center of gravity lies on the rotation axis, which may help reduce or even eliminate the unbalanced mass concerns.

In some embodiments, battery packs 174 may be positioned within the handle 110. Optionally, the handle 110 may include only one battery pack 174, which may be positioned in the upper end (FIG. 9), lower end (FIG. 10) or hand grip portion (FIG. 12). In other embodiments, two battery packs 174 may be positioned within the handle, and optionally may be positioned in the upper and lower ends (FIGS. 5, 13, 16, 27 and 36), or alternatively in one of the upper and lower ends and in the hand grip portion 310. In further embodiments, three battery packs 174 may be provided within the handle 110, with one battery pack 174 being positioned in each of the upper end 306, hand grip portion 310 and lower end 308 (see dashed lines in hand grip 310 FIG. 5). Positioning battery packs 174 in this manner may help reduce the forward/backward moment forces experienced by a user holding the hand grip 310, and in some configurations the weight of the battery pack 174 may help offset the weight of the suction motor 124 and cyclone unit 126 that are positioned forward of the hand grip 310. Similarly, other portions of the on board power source, such as electronics and controllers, transformers and the like may be located in any suitable location, including in at least one of the upper end, lower end and hand grip.

Each battery pack 174 may include any suitable number of cells, and may include, for example, 3 cell 18560 lithium ion batteries. If two battery packs 174 are connected in series, the may create a 6 cell 22V Li-ion power source. Any number of cells may be used to create a power source having a desired voltage and current, and any type of battery may be used, including NiMH, alkaline and the like. If only one battery pack 174 is to be used, in either the upper or lower end of the handle, a comparable counterweight may be provided in the opposing end of the handle. A non-electrical counterweight (such as a piece of metal or plastic) may help offset the weight of the battery pack 174 in much the same manner as the second battery pack illustrated in this embodiment.

In the embodiment of FIG. 5, the hand vacuum includes two battery packs 174, one positioned in the upper end 306 and one positioned in the lower end 308 of the handle 110. Both battery packs are electrically connected to the suction motor 124 and the power switch 318 that can be used to control the suction motor 124 (described in more detail herein). Optionally, internal electronics 320 may be located within the hand grip portion 310 (in addition to or as an alternative to a third battery pack 174) as shown using dashed lines, or may be located in the main body 106. The battery packs are optionally connected in series with each other, or alternatively in parallel with each other. In this embodiment, the battery packs 174 are configured to have generally the same mass, which may help provide a balanced configuration where the overall centre of mass of the batteries 322 is proximate the middle of the hand grip portion 310.

Optionally, the upper and lower ends 306 and 308 of the handle, and hand grip portion 310 if applicable, can be openable to allow access to the battery packs 174.

Power Source in Wand

The following is a description of different features of a wand with an onboard power source that can be used in a hand vacuum cleaner. These features may be used by itself in any surface cleaning apparatus or in any combination or sub-combination with any other feature or features described herein. For example, a wand with an onboard power source may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

As an alternative to providing battery packs 174 in the handle 110, or optionally in addition to the battery packs in the handle, the wand 150 that is connectable to the hand vacuum 100 may be configured to include one or more battery packs 174. Providing battery packs 174 in the wand 150 may help provide some additional power when the hand vacuum 100 is connected to the wand 150, and/or to the surface cleaning head 154 via the wand 150. For example, the extra power in wand batteries 174 may be used to help power the brush motor 172 in the surface cleaning head 154 and/or help power the suction motor 124. If the battery packs 174 are supported in the wand 150, the additional mass of the wand battery pack 174 can be left behind with the wand 150 when a user detaches the hand vacuum 100 for above floor cleaning. This may help reduce the weight of the hand vacuum 100, while still providing a desired level of power when operating in the floor cleaning mode.

Optionally, providing batteries 174 in the wand 150 and/or surface cleaning head 154 itself, may allow the floor cleaning components to be substantially self-powered, which may eliminate the need for providing an electrical connection between the hand vacuum 100 and the wand 150. Alternatively, an electrical connection can be provided between the hand vacuum 100 and the wand 150, and between the wand 150 and surface cleaning head 154, and the batteries 174 (in the wand or hand vacuum) can be connected in any suitable configuration, including in series with each other or in parallel with each other, or may be switchable from parallel to series connection to change the voltage and/or run time for different applications. Optionally, all of the batteries can provide at least some power to the suction motor 124 and at least some power to the surface cleaning head 154. This may help provide longer run times, higher suction levels or both as compared to only using the power supplied from the hand vacuum.

For example, when the wand 150 is used in floor cleaning mode to clean carpet with a brush motor 172, the batteries 174 may be switched to series to give a higher combined voltage and to provide higher suction motor power 124. Alternatively, the wand battery 174 may be switched in parallel with the hand vacuum batteries 174 when used in hard floor cleaning to provide lower suction motor power but a longer run time.

Like the battery packs 174 in the handle, the battery pack 174 in the wand may optionally be removable, for recharging or replacement, or may be rechargeable in situ.

Figure 40:
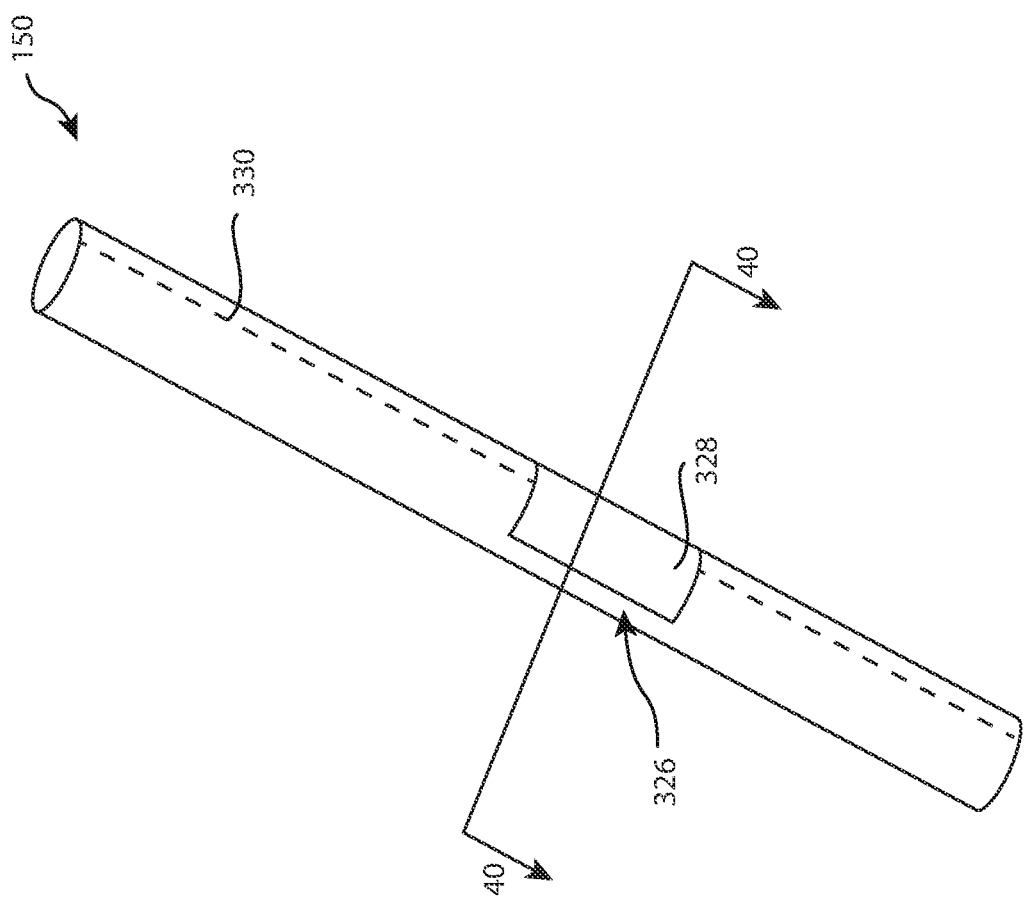
FIG. 40 is a perspective view of an above floor cleaning wand.
Figure 41:
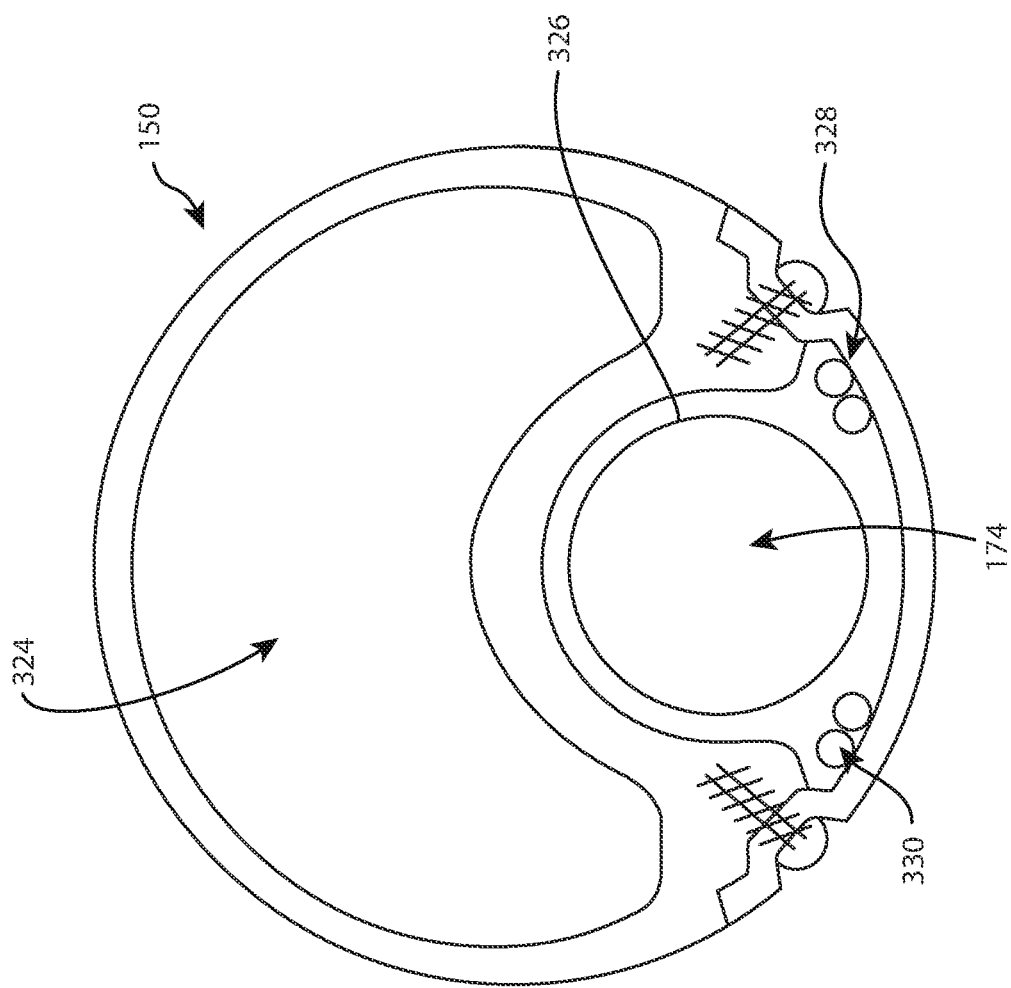
FIG. 41 is a cross-sectional view of the cleaning wand of FIG. 40, taken along line 40-40.

In FIGS. 40 and 41, one embodiment of a wand 150 with an integrated battery pack 174 is illustrated. In this example the wand 150 includes an air flow channel 324 and a battery compartment 326 that houses a rechargeable battery pack 174. The compartment is covered by a cover 328, which may be removed to access or remove the battery pack 174. Wiring 330 in the wand may extend between the electrical connectors at both ends of the wand, to connect to the hand vacuum 100 and the surface cleaning head 154. The battery pack 174 may be removed for charging, or alternatively may be charged by applying charging power to the electrical connectors at one end of the wand 150.

Removable Handle

The following is a description of different features of a removable handle that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Optionally, the handle 110 may be removable from the rest of the hand vacuum. The handle 110 can be secured to the rest of the main body 106 using any suitable attachment mechanism, including mechanical latches, retention catch or any other mechanism attachment structure capable of being released to disengage and remove the handle. the like. Optionally, the actuators for releasing the attachment mechanism may be provided on the main body 106 (and remain with the main body when the handle is removed), or alternatively may be provided on the handle 110 such that the actuator is removable with the handle. Optionally, each connection between the handle 110 and the main body 106 may be provided with a dedicated locking mechanism (for example at both the upper 306 and lower 308 ends of the handle 110). Alternatively, a single locking mechanism may be used, regardless of the number of physical connections between the handle 110 and the main body 106. Using a single locking mechanism may help simplify the unlocking and removable of the handle 110.

Optionally, the handle 110 may include one or more operating components of the hand vacuum, such as one or more battery packs, electronics, controllers, circuit boards, display members, power switches and the like. If the handle contains one or more battery packs 174, providing a removable handle may allow the handle to be connected to a charger or the like to recharge the batteries, without requiring the entire hand vacuum to be manipulated.

If the handle 110 includes electrified components, in addition to providing a mechanical connection the attachment mechanism may include at least one electrical connector to provide an electrical connection between the handle 110 and the rest of the hand vacuum 100.

Further, if a power switch 318 is provided on, and is removable with the handle 110, the same power switch 318 that is used to control the suction motor 124 (when the handle 110 is connected to the hand vacuum 100) may be used to control another device (when the handle is connected to that device—as described herein). For example, a handle 110 that contains batteries 174 and includes a power switch 318 may be used to power and control the hand vacuum 100, and may also be used to power and control a steam mop, sweeper, drill, saw, extractor and/or other devices.

Optionally, more than one handle 110 can be provided to a user, such that if the batteries of one handle run down during use, the user can simply replace the entire handle assembly 110 (and optionally the power switch 318) and continue using the apparatus, rather than having to replace the individual batteries or wait to recharge a given handle.

Figure 4:
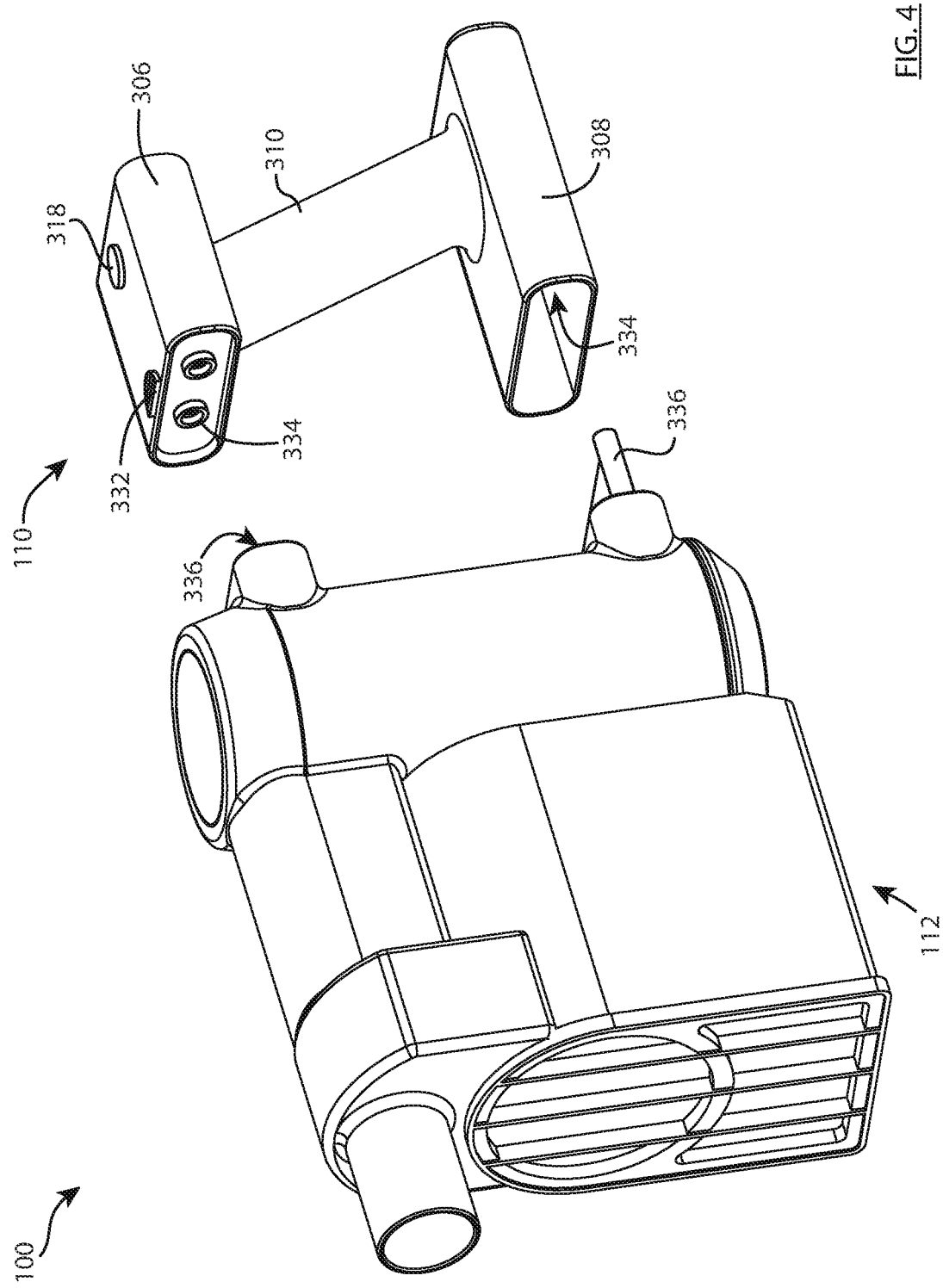
FIG. 4 is a front perspective view of the surface cleaning apparatus of FIG. 2 with the handle detached.

FIGS. 2-4, shows one embodiment of a removable handle 110. In this embodiment the handle 110 is mechanically connected to the main body 106 at the upper and lower ends of the handle, and is secured in place using a single latch at the upper end 306. The latch can be released by pressing the release actuator that is provided in the form of button 332. The button 332 is mounted to the upper end 306, and is removable with the handle 110 as illustrated. In this example, the same button 332 could be used to release the handle 110 from other devices to which it can be connected.

In this embodiment, the handle 110 includes the power switch 318 and a plurality of batteries 174 (see also FIG. 5). Therefore, in this embodiment, the upper and lower ends of the handle 306 and 308 are also provided with electrical connectors 334 that can inter-engage with compatible electrical connectors 336 on the main body 106. Engagement between the electrical connectors 334 and 336 can provide an electrical connection between the batteries 174 and power switch 318 and the suction motor 124, and optionally can help strengthen the connection. In this arrangement, detaching the handle 110 interrupts the supply of power to the suction motor 124, and the suction motor 124 is not operable with the handle 110 is detached.

Optionally, the handle 110 may be configured so that it can be connected to one or more other devices/apparatuses, in addition to the hand vacuum. For example, the same handle that is used with the hand vacuum could be connectable to another vacuum, power tool, cleaning device (such as a mop, steam cleaner, carpet extractor, etc.) or any other suitable device. If the handle includes onboard batteries, the same batteries that were used to power the hand vacuum could also be used to power the other device(s) that the handle can be connected to.

Figure 44:
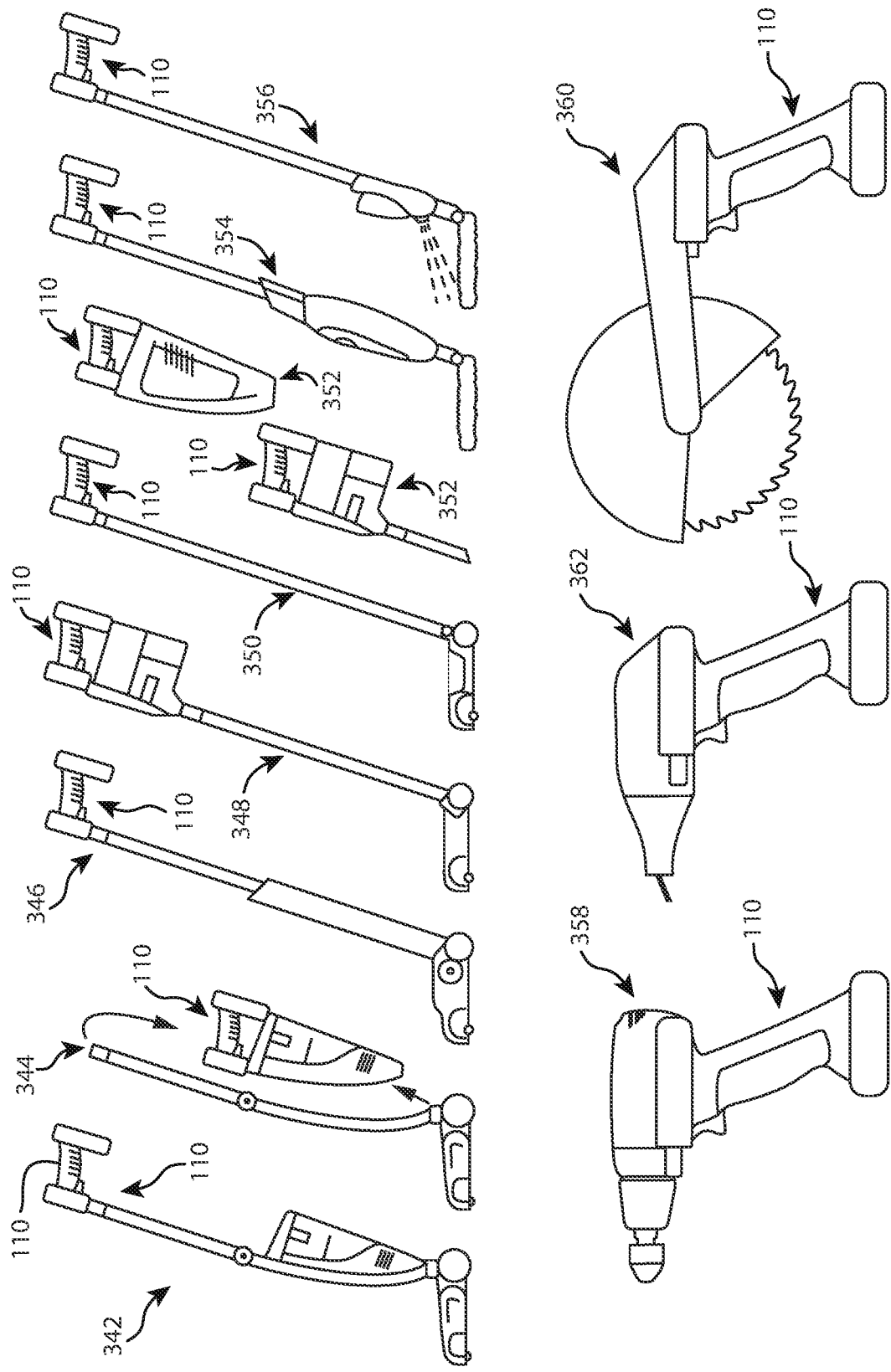
FIG. 44 illustrates a handle used in combination with a variety of different apparatuses.

For example, referring to FIG. 44 a common handle configuration could be used in combination with an upright vacuum cleaner 342, a lift away vacuum cleaner 344, a power head vacuum cleaner 346, a stick vacuum cleaner 348, a sweeper 350, alternative hand vacuums 352, a hot mop cleaning device 354, a spray mop cleaning device 356, a drill 358, a saw 360, a steam window cleaner 362. The handle 110 with onboard battery packs may provide different power profiles and/or power modes when connected to different devices. Some cleaning units and/or wands from existing products, such as some of the products available under the Shark® brand from SharkNinja Operating LLC, may be designed to connect to the handle 110.

Referring to FIGS. 15-19, another embodiment of a detachable handle 110 is illustrated. In this embodiment the handle includes two internal battery packs 174 (FIG. 16), and includes a main power switch in the form of a finger-grip trigger 318. The handle also includes the display screen 364 as described herein. This embodiment includes electrical connectors 334 and 336 to electrically connect the batteries 174 to the main body 106 (i.e. to the suction motor), and can also include data/signal type connections (integrated with the connectors 334 and 336), if needed, to receive status information from the main body that can be shown on the display screen 364. This signal connector can allow control signals to be travel between electronics in the handle 110 and electronics in other portions of the hand vacuum (if any) or other device to which the handle can be attached. Optionally, the signal connector can also be connectable to the other types of devices that the handle can be connected to, and the content of the display screen 364 can be matched to the particular device being used. For example, when connected to the hand vacuum 100, the screen 364 may show battery power levels, suction motor operating mode, surface cleaning head mode and the like. However, when connected to a drill, for example, the display screen 364 may show battery power levels, drill speed, drill operating mode and the like. If connected to a steam mop, the display screen 364 may show water level, reservoir temperature and the like.

In this embodiment, the button 332 for disengaging the locking mechanism that secures the handle 110 to the main body is provided on the lower end 308 of the handle 110. The handle 110 in the embodiment of FIGS. 37 and 38 has an analogous configuration, but the release button 332 remains on the main body 106 rather than being removable with the handle 110.

Optionally, the handle 110 may include an additional support panel that is spaced from the hand grip portion 310 and extends between the upper and lower ends 306 and 308 of the handle 110. This support panel can be positioned so that it defines part of the perimeter of the finger gap 316, and may be configured to be attachable to a variety of different devices. Providing a support panel may help strengthen the handle 110 and may help reduce the loads and stresses that are carried by the hand grip portion 310. Providing a support panel may also provide a relatively larger engagement surface on the handle 110, as compared to only having the areas of the upper and lower ends 306 and 308. This may allow the handle 110 to be connected more securely to different devices, and/or the support panel may including different mounting hardware/features for connecting to different devices.

Figure 45:
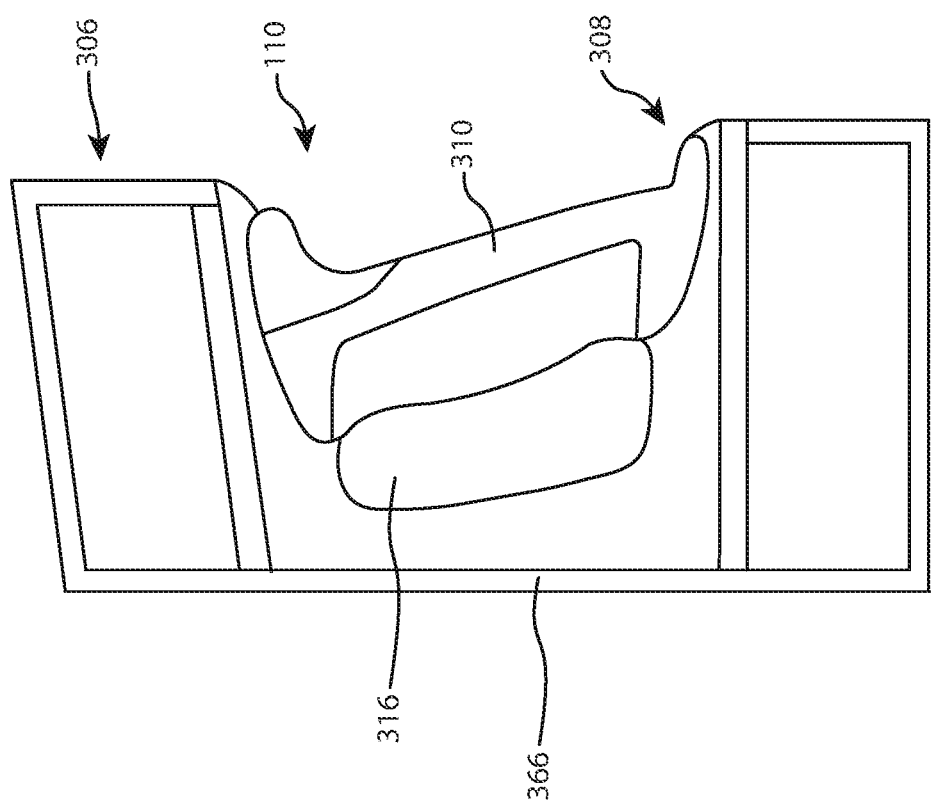
FIG. 45 is a cross-sectional view of one embodiment of a handle.

Referring to FIG. 45, one embodiment of a handle 110 that includes an additional support panel 366 forward of the hand grip portion 310 is illustrated. In this embodiment, the finger gap 316 is entirely bounded by the handle 110. This handle may be used as an alternative to any of the detachable handles described herein.

Information Display Device

The following is a description of an information display device that can be used with a hand vacuum cleaner. These features may be used by itself in any surface cleaning apparatus or in any combination or sub-combination with any other feature or features described herein. For example, an information display device may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, power switches and controls, air flow configurations, suction motors, reconfigurable vacuums, clean air outlet configurations, onboard chargers, power operating modes and other features described herein.

Optionally, the hand vacuum may include one or more information display devices to provide information to a user. For example, the hand vacuum may include one or more lights to indicate when the suction motor is on, and its current power level (if applicable), current battery charge level and the like. The hand vacuum may also include one or more display screens, such as an LCD display, LED screen, OLED screen and the like. The screen, and associated electronics, may be used to display status information. Optionally, the information display devices may be provided on detachable portions of the hand vacuum, such as the handle. Optionally, the information display device may be connectable to other apparatuses, for example if the handle is connected to a different apparatus, and the information displayed may be customized for each type of apparatus that can be connected to the handle.

Figure 15:
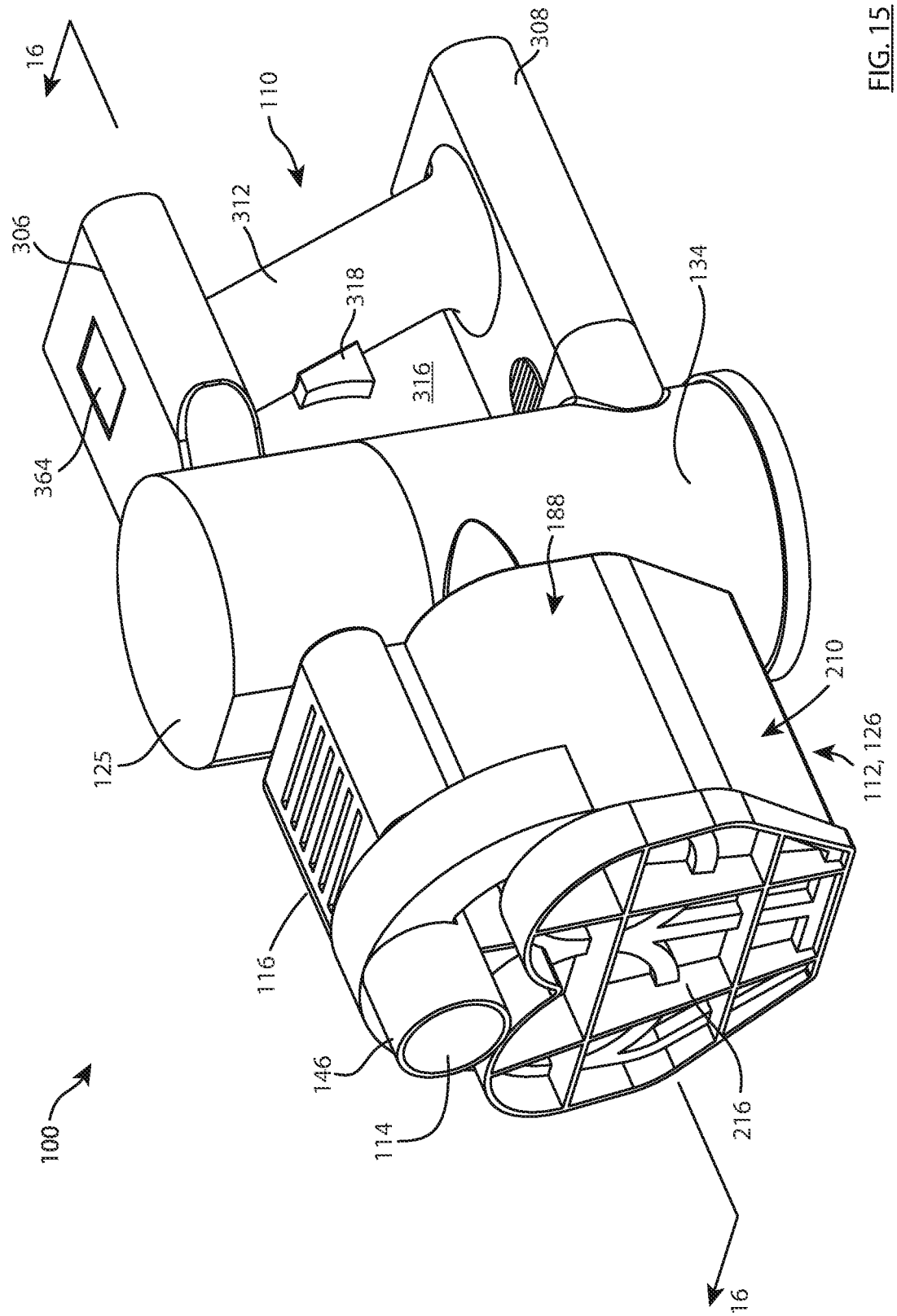
FIG. 15 is a front perspective view of another embodiment of a surface cleaning apparatus.

In the embodiment of FIG. 15, the hand vacuum includes an information display device in the form of a displace screen 364 that is provided on the upper end 306 of the handle 110. The screen 364 is configured to display the power mode and battery charge status.

If the handle 110 is removable, the screen 364 (and/or lights or other information display devices) can be removable with the handle 110. Optionally, the screen can be configured to show information about whatever apparatus is connected to the handle, so that the same screen can be used for multiple apparatuses. This may reduce the need to provide screens or the like on each separate apparatus that can be connected to the handle.

Main Power Switch

The following is a description of different features of a main power switch that can be used in a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, controls, air flow configurations, suction motors, reconfigurable vacuums, clean air outlet configurations, onboard chargers, power operating modes and other features described herein.

Optionally, the power switch that controls operation of the suction motor (either on/off or variable power levels or both) can be provided on the handle, for example by establishing a power connection between the batteries in the handle and the suction motor (or other portion of the hand vacuum). The power switch can be provided in any suitable configuration, including a button, rotary switch, sliding switch, trigger-type actuator and the like. The switch may also be configured to control other aspects of the hand vacuum (brush motor on/off, etc.) or may be configured entirely as a control switch that controls some functions of the hand vacuum but does not control the suction motor. Optionally, instead of being provided on the handle, the switch may be provided on the main body (such as on the motor housing or other suitable locations).

Referring to FIG. 2, in one embodiment the handle includes a power switch in the form of a button 318 that is located toward the rear portion of the upper surface of the upper end 306 of the handle 110. Alternatively, as shown in the embodiment of FIG. 22, the power switch 318 may be provided on the rear face of the upper end 306 of the handle. In either of these positions, a user may be able to access the button 318 while holding the hand vacuum via the hand grip.

Referring to FIG. 15, in another embodiment of the handle 110 the main power switch is provided in the form of a trigger 318 that is located on the front side of the hand grip 310, in a location that allows a finger of the user to activate the trigger 318.

Optionally, the buttons or triggers illustrated may be used to provide different functions for difference powered devices, if the handle 110 is connected to different devices. For example a button or trigger 318 may be used to select different power profiles (high power vs. low power), or other device functions. Optionally, the function of the switch 318 may be displayed on suitable display device, such as the screen 364 described herein.

Optionally, the power switch 318 for the hand vacuum 100 may be provided on the main body or other suitable location. If provided on the main body 106, the power switch may be located generally proximate to the handle 110 so that the switch can be operated using the same hand that is holding the hand grip 310.

Optionally, any of the power switches 318 described herein may also be configured to control the power supplied to the wand 150, surface cleaning head 154 and/or other device. For example, a single switch 318 may be operable to control both the suction motor 124 and the brush motor 172 (FIG. 1), along with lights and any other electrified elements provided on the wand 150, surface cleaning head 154 or any other tool or attachment. The switch 318 may optionally be a two position switch and may be configured so that all of the electrical components are switched on an off together (i.e. brush motor 172 is always on when the suction motor 124 is on). Alternatively, the switch 318 may be a multi-position switch and may be configured to provide independent control of the different electrical components (i.e. the brush motor 172 may be switched on or off while the suction motor 124 is running). Instead of controlling multiple electrical devices with a common switch 318, the hand vacuum cleaner may be provided with multiple switches 318, independent from each other and operable to control one or more electrical devices. For example, the hand vacuum may include a power switch 318 for controlling the suction motor 124 and a separate switch 318 on the surface cleaning head 154 (FIG. 1) for controlling the brush motor 172.

Airflow Through Handle

The following is a description of different features of an air flow path through a hand vacuum cleaner. These features may be used by itself in any surface cleaning apparatus or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers, power operating modes and other features described herein.

Optionally, at least a portion of the air flow path between the dirty air inlet 114 and the clean air outlet 116 may flow through the handle 110. This may help facilitate a variety of different air flow path configurations and clean air outlet 116 locations. This may also allow at least some of the air being exhausted by the suction motor 124 to flow over, and optionally help cool, operating components that are located in the handle. Examples of such components may include batteries 174, controllers, circuit boards, chargers, other internal electronics 320 and the like. Internal electronics 320 may include any combination of circuitry, electronic components, hardware (e.g. processor(s) and memory), software and/or firm ware. One example of such electronics can include a printed circuit board (PCB) FIG. 11 illustrates an embodiment of a hand vacuum in which the handle 110 is hollow and includes an internal air flow passage. The handle air flow passage has an inlet end 368 that is located toward the top 306 of the handle downstream from the suction motor 124, and an outlet end 370 that is located toward the bottom 308 of the handle. This may help channel the air through substantially the entire length of the hand grip 310.

In this embodiment, virtually all of the air exhausted from the suction motor 124 is routed through the handle, and the clean air outlet 116 is provided in the form of a plurality of holes 370 that are formed in the lower end 308 of the handle. Air entering the inlet end is directed through the handle 110 and exits via the holes 370. In this configuration, the air can flow around and cool components that are located at the upper end 306 of the handle, at the lower end 308 of the handle and/or within the hand grip portion 310. In the illustrated embodiment, some examples of such components are shown in dashed lines, and include the optional upper battery back 174, the optional lower battery pack 174 and an optional component (such as a third battery back 174 or electronics 320) that is located within the hand grip 310.

The embodiment of FIG. 39 illustrates another example of a handle 110 that is hollow such that the exhaust from the motor 124 can flow through the handle to cool the battery packs 174, and can be exhausted via holes 370 in the upper and lower ends 306 and 308 of the handle.

Suction Motor

The following is a description of different configurations and orientations of suction motors that can be used in a hand vacuum cleaner. These features may be used by itself in any surface cleaning apparatus or in any combination or sub-combination with any other feature or features described herein. For example, any of the motor configurations and orientations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, reconfigurable vacuums, clean air outlet configurations, onboard chargers, power operating modes and other features described herein.

The suction motor 124 used in the hand vacuum may be of any suitable design and configuration that is sufficient to impart a desired air flow through the hand vacuum. For example, the suction motor may include a fan and/or impeller to help generate the desired air flow.

In each of the embodiments described herein, the suction motor 124 is disposed within the motor housing 125 and rotates about the motor axis 240. In the embodiment of FIGS. 1-10, the motor 124 is arranged vertically and is located forward of the handle 110, above and overlying the pre-motor filter 136 and rearward of the cyclone unit 126. Optionally, as illustrated, the suction motor 124 and the motor housing 125 can be positioned in may be entirely forward of the handle 110, such that there is no overlap between the motor housing 125 or suction motor 124 and portions of the handle 110 (such as the upper and lower ends 306 and 308). Alternatively, in other embodiments the suction motor 124 and suction motor housing 125 may be entirely forward of the hand grip portion 310 of the handle 110, but may have some degree of vertical overlap with the upper and lower ends of the handle 306 and 308.

Positioning the motor 124 in this location may affect the location of the centre of gravity of the hand vacuum cleaner and may affect the hand feel of the hand vacuum 100. This configuration may also help reduce the overall size of the hand vacuum 100. In another embodiment, as illustrated in FIG. 12, the suction motor may be vertical and may be forward of the handle 110, but positioned beneath and underlying the pre-motor filter 136 and rearward of the cyclone unit 126.

When arranged as illustrated in FIG. 5, the inlet of the suction motor housing 125 is coincident with the outlet 256 of the pre-motor filter housing, and the inlet 242 of the suction motor therein, is located below the outlet of the suction motor housing, which includes the post-motor filter housing 140. In addition, the inlet the suction motor housing 125 is positioned vertically higher than the air outlet 180 of the cyclone chamber 128, and vertically lower than the inlet conduit 146. In this configuration, a projection of the cyclone axis 132 passes below, and does not intersect the suction motor housing 125 or the motor 124, while a projection of the inlet conduit axis 146 intersects the both the suction motor housing 125 and the motor 154 therein. While the cyclone axis 132 passes below the suction motor 124, if both the cyclone chamber 128 and suction motor 124 are positioned along a lateral centerline of the hand vacuum, a projection of the motor axis 240 may intersect with a projection of the cyclone axis 132, as is shown in the illustrated example. Locating the suction motor housing 125 in this position may help reduce the overall size of the hand vacuum 100. It may also affect the weight distribution of the hand vacuum and the resulting "hand feel" experienced by a user.

Referring to FIG. 11, in another embodiment the suction motor 124 used in combination with the cylindrical type of pre-motor filter 136 may be arranged generally horizontally, such that the motor axis 240 is generally parallel to the cyclone axis 132 and inlet conduit axis 148—and optionally the motor axis 240 may be substantially parallel to these axes. In this example, when the cyclone axis 132 and inlet conduit axis 148 are horizontally, the cyclone axis 132 is below and parallel to the suction motor axis 240, and is below the suction motor 124 itself. In this configuration the filter axis 278 is generally orthogonal to the suction motor axis 240 and the air path through the hand vacuum 100 is modified, such that air travelling through the suction motor 124 travels in a generally rearwardly direction. In the illustrated configuration, this means that air exiting the suction motor 124 travels in substantially the same direction as air entering the inlet conduit 146, and in the substantially same direction as air exiting the cyclone air outlet 180.

Referring to FIG. 27, in another embodiment the suction motor 124 is arranged generally horizontally and is oriented so that the inlet end 242 of the suction motor 124 is the rear end, and air travelling through the suction motor 124 exits in a generally forward direction. In the illustrated configuration, air flowing through the suction motor 124 travels in substantially the opposite direction as air entering the inlet conduit 146, and in the substantially opposite direction as air exiting the cyclone chamber via the air outlet 180. While illustrated in combination with a generally planar pre-motor filter, a suction motor having this orientation, such that air travels in the forward direction, may be used in combination with the cylindrical pre-motor filter, for example by reversing the orientation of the motor illustrated in FIG. 11. Alternatively, the orientation of the suction motor in FIG. 27 may be reversed, such that air flows through the suction motor in a generally rearward direction.

When oriented as shown in FIG. 27, the suction motor axis 240 is parallel to the cyclone axis 132 and the inlet conduit axis 148, and both the cyclone axis 132 and inlet conduit axis 148 are positioned below the motor axis 240 when the axes are horizontally disposed. Optionally, the suction motor 124 used in combination with the flat-type pre-motor filter 136 may be oriented vertically, as shown in the embodiment of FIG. 34.

While illustrated as being either vertical (FIGS. 1-10, 12-21, 34 and 37-38) or horizontal (11, 25-33, 35 and 36), in other examples the motor may be oriented in an inclined position such that the motor axis is inclined (either forwardly or rearwardly) relative to the cyclone axis and/or inlet conduit axis (forwardly in FIGS. 22-24 and 39). Alternatively, the suction motor could be inclined rearwardly in a similar manner.

Reconfigurable Stick Vac Configurations

The following is a description of different configurations of stick vacuum with different upright configurations that can be used in combination with a hand vacuum cleaner. These features may be used by itself in any surface cleaning apparatus or in any combination or sub-combination with any other feature or features described herein. For example, any configurations and orientations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, clean air outlet configurations, onboard chargers, power operating modes and other features described herein.

Optionally, a hand vacuum 100 may be connectable to a wand 150 and surface cleaning head 154 in two or more different, functional configurations. For example, a given hand vacuum may be connectable with the wand and surface cleaning head to provide two different stick vacuum configurations, each of which is operable in a floor cleaning mode. In one embodiment, the handle may be detached from the main body of the hand vacuum and connected directly connected to the wand in one of the stick vacuum configurations.

Figure 42:
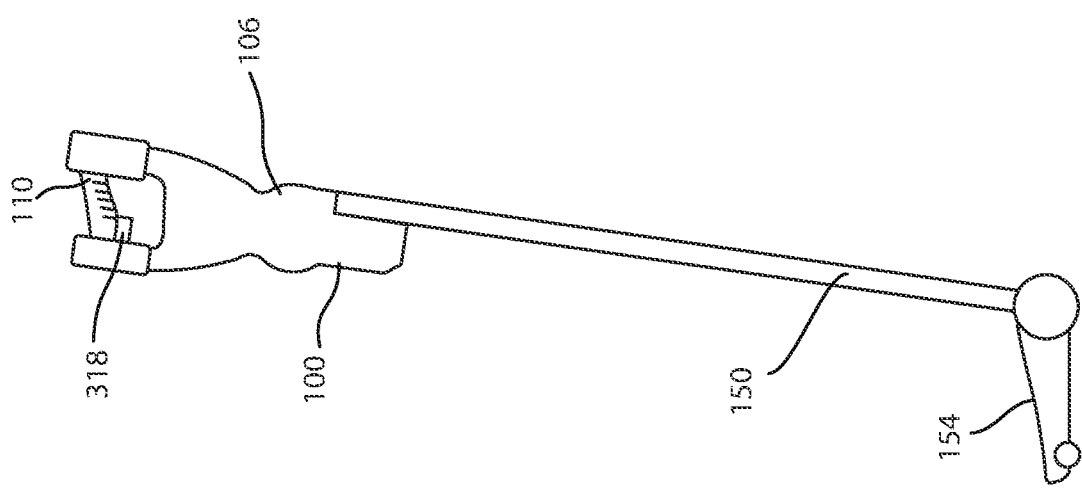
FIG. 42 is a side view of another embodiment of a surface cleaning apparatus mounted to a wand and surface cleaning head in a stickvac configuration.
Figure 43:
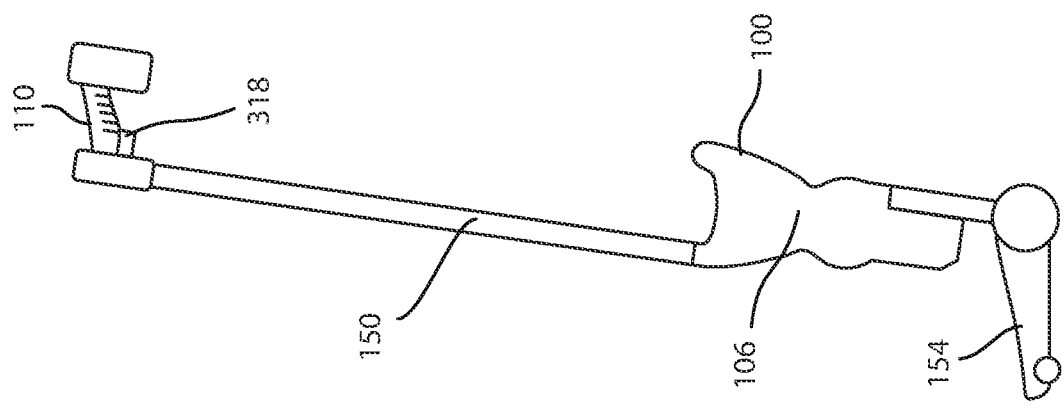
FIG. 43 is a side view of the surface cleaning apparatus of FIG. 42 in an alternate configuration.

Referring to FIGS. 42 and 43, an embodiment of a reconfigurable stick vac apparatus includes a hand vacuum 100 with a main body 106 and a detachable handle 110. The main body 106 may be of any suitable configuration, and may include a suction motor and air treatment member. The handle 110 may be any suitable handle, including those described herein, and preferably includes the power switch 318 for the hand vacuum 100. The apparatus also includes a wand 150 and surface cleaning head 154. In this embodiment, the wand 150 includes mechanical and electrical connectors at its ends, which are adapted to connect to the main body 160 (i.e. to the inlet conduit 146), the handle 110 and/or the surface cleaning head 154. Optionally, the handle 110 can include the battery packs 174 as described herein, or may not include batteries. Similarly, the wand 150 may include a battery pack 174 as described herein, or not.

In one configuration (FIG. 42), the handle 110 is connected to the main body 106 of the hand vacuum 100, and the hand vacuum 100 is fluidly and electrically connected to the upper end of the wand 150. The wand 150 provides air flow communication and electrical connections to the surface cleaning head 154 that is connected to the lower end of the wand 150 and the apparatus can be used in this configuration to clean the surface.

In another configuration (FIG. 43), the fluid inlet of the hand vacuum 100 cleaner can be connected directly to the surface cleaning head 154. This connection can also include electrical connectors. The lower end of the wand 150 can then be connected to the rear end of the hand vacuum 100, and the handle 110 can be connected to the upper end of the wand 150. In this arrangement, the wand 150 provides a structural and electrical connection between the handle 110 and the main body 106 of the hand vacuum 100, but does not form part of the air flow path when the vacuum is in use. In this embodiment weight of the hand vacuum 100 is located closer to the surface cleaning head 154, which may affect the weight and hand feel experienced by the user.

Clean Air Outlet

The following is a description of different configurations and orientations of a clean air outlet that can be used in a hand vacuum cleaner. These features may be used by itself in any surface cleaning apparatus or in any combination or sub-combination with any other feature or features described herein. For example, any of the clean air outlet configurations and orientations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, onboard chargers, power operating modes and other features described herein.

The clean air outlet of the hand vacuum may be provided in any desired and suitable location, including on the main body and the handle. The clean air outlet is optionally positioned downstream from the post-motor filter housing 140 and post motor filter 142 therein. In the embodiments illustrated, the post-motor filter is foam filter, but may be any suitable physical porous filter media, including, for example, a HEPA filter, paper filter, felt filter and the like.

In the embodiment of FIG. 5, a grill 138, which is optionally removable, covers the upper end of the post-motor filter housing 140 and provides the clean air outlet 116. In this embodiment, the clean air outlet 116 is provided at the upper end 122 of the hand vacuum, such that air exiting through the clean air outlet travels in substantially the same direction as air exiting the suction motor 124—in a direction parallel to the suction motor axis 240. In this embodiment, the clean air outlet 116 overlies the upper end of the suction motor 124, and air exiting the suction motor 124 can flow substantially linearly, directly to the post-motor filter housing 140 and out the clean air outlet 116 without changing direction. This may help reduce backpressure downstream from the suction motor. In this arrangement, a projection of the suction motor axis 240 extends through both the pre-motor filter housing 136 and the post-motor filter housing 140, and also extends through the clean air outlet 116.

In this configuration, when the hand vacuum is in use, air exiting the clear air outlet 116 will be directed generally upwardly, and possible forwardly if the hand vacuum 100 is inclined forwardly when in use. This may help prevent the air exiting the clean air outlet from blowing on the user and/or from blowing onto the surface to be cleaned (which may blow around dust and dirt on the surface before it can be drawn into the surface cleaning head).

Optionally, one or both of the post-motor filter and clean air outlet need not overlie the suction motor. For example, referring to the embodiment of FIG. 13, the clean air outlet 116 can be provided at the upper end 122 of the hand vacuum but can be offset forwardly from the suction motor 124 (or alternatively rearwardly or to the side). In this embodiment, the removable grill 138 is still provided in the upper surface of the hand vacuum, but the post-motor filter housing 140 and post-motor filter 142 are positioned forward of the suction motor 124, and are at a lower elevation than the upper end of the suction motor 124. Also, in this embodiment, the post-motor filter housing 140 and post-motor filter 142 overlie portions of the cyclone unit 126 (and as illustrated overlie portions of both the cyclone chamber 128 and the dirt collection chamber 130). Further, in this embodiment, the post-motor filter housing 140 is positioned between the dirty air inlet 114 and the suction motor 124, in the front/back direction, and a projection of the inlet conduit axis 148 extends through the post-motor filter chamber 140 and the suction motor 124. Nesting the post-motor filter chamber 140 and clean air outlet 116 in this manner may help reduce the overall size of the hand vacuum.

Optionally, the clean air outlet can be provided toward the upper end of the hand vacuum, but need not direct the exiting air upwardly. Instead, the clean air outlet may be configured so that air exiting via the clean air outlet is directed sideways, at an inclined angle forwardly or rearwardly, substantially rearwardly or substantially forwardly. In the embodiment of FIG. 27, the hand vacuum 100 is configured so that its clear air outlet 116 is provided toward the upper end 122 of the main body 160 and exhausts air generally upwardly. Optionally, the post-motor filter housing 140 could be configured with holes in the front portion of the housing sidewall, so that some or all of the air exiting the post-motor filter housing 140 is directed forwardly, as shown using dashed air flow arrows.

In the embodiment of FIG. 39, the clean air outlet includes two spaced apart outlet ports that are provided at the upper and lower ends 306 and 308 of the handle 110. In this configuration, the air exiting the clean air outlet travels generally rearwardly.

In the embodiments of FIGS. 22 and 38, the clean air outlet is located at the lower end of the main body.

Onboard Charger

The following is a description of different features of a charger that can be provided in a hand vacuum cleaner. These features may be used by itself in any surface cleaning apparatus that includes batteries or other onboard power sources or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, power operating modes and other features described herein.

Optionally, the hand vacuum may 100 include an onboard charging system for charging any batteries or other such onboard power sources. For example, the internal electronics 320 onboard the hand vacuum 100 optionally may include charge management electronics that are electrically connected to the batteries 174, for managing the charging of the batteries and/or power supply from the batteries 174. Optionally, the charging system may be configured to be cooled while in use to help improve performance. The charging system may be positioned in the air flow path, such that air being drawn into, or preferably air being exhausted from, the suction motor can flow over the charging system. Alternatively, the charging system may be provided with a separate air flow mechanism, such as a fan, for generating a cooling flow of air regardless of whether the suction motor is on or off.

Referring to FIG. 39, the illustrated hand vacuum 100 includes one embodiment of an air cooled battery charging system 372, that may be used with any of the hand vacuum embodiments described herein. The air cooled battery charging system includes a battery charging unit 374 configured to be mechanically attached and electrically connected to a removable handle 110 with an integrated battery back 174, such as those described herein. In this embodiment, the removable handle 110 defines an air flow path that allows air to flow across the batteries 174 for temperature regulation. In this embodiment, the batter charging unit 374 is electrically connectable to the top and bottom battery housing portions 306 and 308 of the handle. The charger unit 374 contains charging electronics such as those known for charging rechargeable batteries, such as Li-Ion batteries. The charger unit 374 also contains an air flow device in the form of a fan 376 that provides air flow to push or pull air through the handle 110 via the air flow path. The air flow across the batteries 174 in the handle may help maintain a desired temperature during charging, which may help improve charging times and may help reduce damage to the batteries 174 caused by excessive temperatures in the cells caused by the charging process or by overcharging. Although air flow is shown in one direction into one end of the handle, the air flow may be provided in either direction and through either end of the handle, or via both ends.

In this embodiment, the battery packs 174 in the handle 110 are exposed to the exhaust from the suction motor 124 for cooling when the vacuum is in use, and can be cooled via air supplied by the fan 376 (which is in communication with the same air flow path) when the suction motor 124 is not in use.

Power Operating Modes

The following is a description of different power operating modes that can be used in combination with a removable handle as described herein. These features may be used by itself with any handle that includes that includes batteries or other onboard power sources or in any combination or sub-combination with any other feature or features described herein. For example, any of the removable assembly configurations described herein may be used with any of the cyclone units, dirt collection chambers, cyclone chamber, emptying methods, pre-motor filter housings, pre-motor filters, removable component configurations, component configurations, dual mode operable door lock, handle configurations, on-board power source arrangements, wands, surface cleaning heads, information display devices, power switches and controls, air flow configurations, suction motors, reconfigurable vacuums, clean air outlet configurations, onboard chargers and other features described herein.

Optionally, the hand vacuum cleaner may be configurable in two or more different operating modes, having different power profiles. For example, the suction motor 124 in the hand vacuum 100 may be operable at a low power mode and a high power mode, each providing different levels of suction and air flow through the hand vacuum 100. Switching between such power modes may be done manually by a user in some embodiments, or may be done automatically based on the configuration or operation of the hand vacuum in other embodiments. In some embodiments, the apparatus may be operable to automatically change power modes, but may also include a manual option for a user to override the automatic changes.

In embodiments with automatic switching of power modes, the hand vacuum 100 may include any suitable mechanism for detecting an operating mode or condition of the hand vacuum 100, and then adjusting the power mode based on the operating mode. For example, the hand vacuum may include electrical circuits and other electronic components 320 that can sense/determine the operating mode of the vacuum. Alternatively, or in addition to electrical components 320, the hand vacuum may include any suitable mechanical mechanism for detecting the operating mode of the hand vacuum. For example, one of the wand 150 and the hand vacuum 100 may include a prong that can engage with a corresponding mechanical member (such as a linkage or switch) when the hand vacuum 100 is connected/disconnected from the wand 150. The power mode of the hand vacuum can then be changed based on the configuration of the mechanical linkage, for example.

Optionally, in some embodiments the internal electronics 320 provided in the handle may define different power profiles for different powered devices that may be coupled to and used with the removable handle 110, and/or in response to different operating modes of those devices that are selected by a user. The electronics may recognize, for example, different power modes such as low power mode and high power mode. The internal electronics 320 may recognize the type of powered device by receiving a device identification signal from the powered device. The powered device may include, for example, a radio frequency identification (RFID) chip that provides the device identification signal. The internal electronics 320 may also include a wireless communication system, component or device for communicating wirelessly with electronics in the hand vacuum. In other embodiments, the internal electronics may simply provide a power connection between the batteries and the powered device.

Optionally, the internal electronics 320 may sense the nature of the powered device connected to the handle 110 by measuring the resistance or impedance across the circuit, and/or detecting changes thereto. This may also be used to sense changes in the condition of the device, such as turning a powered brush roll motor 172 on or off while the hand vacuum 100 is in use, and/or switching from a high suction mode to a low suction mode. The internal electronics 320 may also optionally sense when a device is connected or disconnected in a similar way. For example, the internal electronics may be configured to detect when the hand vacuum 100 is connected to the cleaning wand 150 and surface cleaning head 154 (such that it can be used to power the brush motor 172), and when the hand vacuum 100 is detached from the wand 150. Optionally, the internal electronics 320 can be configured to automatically adjust the power levels and operating mode of the suction motor based on such a change in condition.

For example, when the wand 150 and surface cleaning head 154 are connected to the hand vacuum 100, the hand vacuum can be operated at a floor cleaning mode power level. When the hand vacuum 100 is detached from the wand 150, the internal electronics 320 can automatically adjust the hand vacuum power management so that the suction motor is operated at a different, above floor cleaning power level. Optionally, the above floor cleaning power level can be higher than the floor cleaning mode power level (i.e. the suction motor 124 generates more suction in the above floor cleaning mode). Operating the suction motor 124 at a lower power level when the hand vacuum is connected to the wand 150 and surface cleaning head 154 may allow a greater portion of the battery power to be directed to the brush motor 172. When the powered brush is rotating and agitating the surface it may help mechanically dislodge dirt, hair and debris. When the dirt, hair and debris have been mechanically loosened in this manner, they may be sucked up using relatively less suction power (i.e. a lower power mode for the suction motor) than would be required in the absence of the mechanical agitation. This may allow a lower suction motor power level to be used in floor cleaning mode, while still achieving a desired cleaning of the surface. Alternatively, the floor cleaning power mode may be higher than the above floor cleaning mode power level.

Optionally, in addition to, or as an alternative to automatically sensing and adjusting the power mode, the apparatus may include a manual power selection mechanism, such as a switch, where a user can manually select a power mode for a given apparatus. Optionally, the power mode switch may be provided on the handle, and/or may be associated with the primary power switch 318. Alternatively, the power mode switch may be provided on the hand vacuum body, or the body of a different apparatus. In this configuration, each individual apparatus may include a suitable power mode switch (or may not include any power mode switch) that can be used with a common handle. For example, the hand vacuum 100 may include a suction motor power level switch, while a drill may have a high/low setting and a steam mop may have controls to modify the heating or boiling cycle. Providing device-specific switches on a given device may help reduce the complexity of the handle design, while still helping to facilitate that use of a common handle with multiple devices.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:
1. A surface cleaning apparatus comprising:
(a) an air flow path extending from a dirty air inlet to a clean air outlet;
(b) a suction motor provided in the air flow path; and,
(c) a cyclone chamber provided in the air flow path, the cyclone chamber having a cyclone air inlet, a cyclone air outlet, an outlet end, an opposed end that is spaced apart in a longitudinal direction and a screen assembly, the cyclone air inlet having an outlet port that extends a cyclone outlet port length in the longitudinal direction, wherein the cyclone air inlet terminates at the outlet port that is provided in a peripheral sidewall of the cyclone chamber, the cyclone sidewall is parallel to the longitudinal direction whereby air enters the cyclone chamber at the peripheral sidewall of the cyclone chamber and is directed to flow though the cyclone air inlet in a tangential direction that is substantially perpendicular to the longitudinal direction, the cyclone air outlet is provided at the outlet end of the cyclone chamber, the outlet port having a first outlet port side and a longitudinally spaced apart second outlet port side located longitudinally inwardly from the first outlet port side,
wherein the screen assembly comprises an outlet section, a longitudinally spaced apart distal section and a longitudinally extending porous section and the distal section is non-porous,
and wherein the outlet section comprises a non-porous member extending longitudinally inwardly an outlet section length from an outlet end of the outlet section, which is located at the outlet end of the cyclone chamber, to a longitudinally inwardly positioned inlet end of the outlet section,
and wherein the outlet end of the outlet section overlies the cyclone air outlet, the porous section extends longitudinally inwardly from an outlet end of the porous section that is located at the inlet end of the outlet section to the second outlet port side,
and wherein the distal section has a distal section length in the longitudinal direction that is greater than the cyclone outlet port length.
2. The surface cleaning apparatus of claim 1 wherein the porous section extends between the distal section and the outlet section.
3. The surface cleaning apparatus of claim 1 wherein the distal section of the screen assembly is located at the opposed end of the cyclone chamber.
4. The surface cleaning apparatus of claim 3 wherein the cyclone air inlet is located at the opposed end of the cyclone chamber.

5. The surface cleaning apparatus of claim 4 wherein the outlet section length is at least as long as the cyclone outlet port length.

6. The surface cleaning apparatus of claim 4 wherein the outlet port is spaced from and aligned with the distal section.

7. The surface cleaning apparatus of claim 6 wherein the outlet port has first and second longitudinally spaced apart sides, the second side located inwardly from the opposed end of the cyclone chamber and the first side of the outlet port, and a projection of the second side in a direction transverse to the longitudinal direction intersects the distal section.

8. The surface cleaning apparatus of claim 6 wherein the outlet port has first and second longitudinally spaced apart sides and a projection of each of the first and second sides in a direction transverse to the longitudinal direction intersects the distal section.

9. The surface cleaning apparatus of claim 1 wherein the cyclone air inlet is located at the opposed end of the cyclone chamber.

10. The surface cleaning apparatus of claim 1 wherein the distal section of the screen assembly and the cyclone air inlet are each located spaced from the outlet end of the cyclone chamber, the outlet port is spaced from and faces towards the distal section, the outlet port has first and second longitudinally spaced apart sides, the second side located inwardly from the opposed end of the cyclone chamber and the first side of the outlet port, and a projection of the second side in a direction transverse to the longitudinal direction intersects the distal section.

11. The surface cleaning apparatus of claim 1 wherein the distal section of the screen assembly and the cyclone air inlet are each located spaced from the outlet end of the cyclone chamber and each extends longitudinally towards the outlet end of the cyclone chamber wherein the distal section extends further towards the outlet end of the cyclone chamber than the outlet port of the cyclone air inlet.

12. The surface cleaning apparatus of claim 1 further comprising a dirt collection chamber exterior to the cyclone chamber, the cyclone chamber has a dirt outlet in communication with the dirt collection chamber wherein the dirt outlet is located at the outlet end of the cyclone chamber.

13. The surface cleaning apparatus of claim 12 wherein the dirt outlet has a dirt outlet length in the longitudinal direction that is less than the outlet section length.

14. The surface cleaning apparatus of claim 13 wherein the distal section of the screen assembly and the cyclone air inlet are each located spaced from the outlet end of the cyclone chamber and each extends longitudinally towards the outlet end of the cyclone chamber wherein the distal section extends further towards the outlet end of the cyclone chamber than the outlet port of the cyclone air inlet.

15. The surface cleaning apparatus of claim 14 wherein the distal section length is greater than the dirt outlet length.

16. The surface cleaning apparatus of claim 13 wherein the distal section of the screen assembly and the cyclone air inlet are each located at the opposed end of the cyclone chamber and the outlet section length is at least as long as the cyclone outlet port length.

17. The surface cleaning apparatus of claim 16 wherein the distal section length is greater than the dirt outlet length.

18. The surface cleaning apparatus of claim 17 wherein the outlet section length is at least as long as the cyclone outlet port length.

* * * * *